April 14, 1936.　　　F. X. MALOCSAY　　　2,037,080
WRAPPING AND BANDING MACHINE
Filed Jan. 23, 1933　　　18 Sheets-Sheet 5

INVENTOR
Francis X. Malocsay
BY
ATTORNEYS

April 14, 1936.　　　　F. X. MALOCSAY　　　　2,037,080
WRAPPING AND BANDING MACHINE
Filed Jan. 26, 1933　　　18 Sheets-Sheet 6
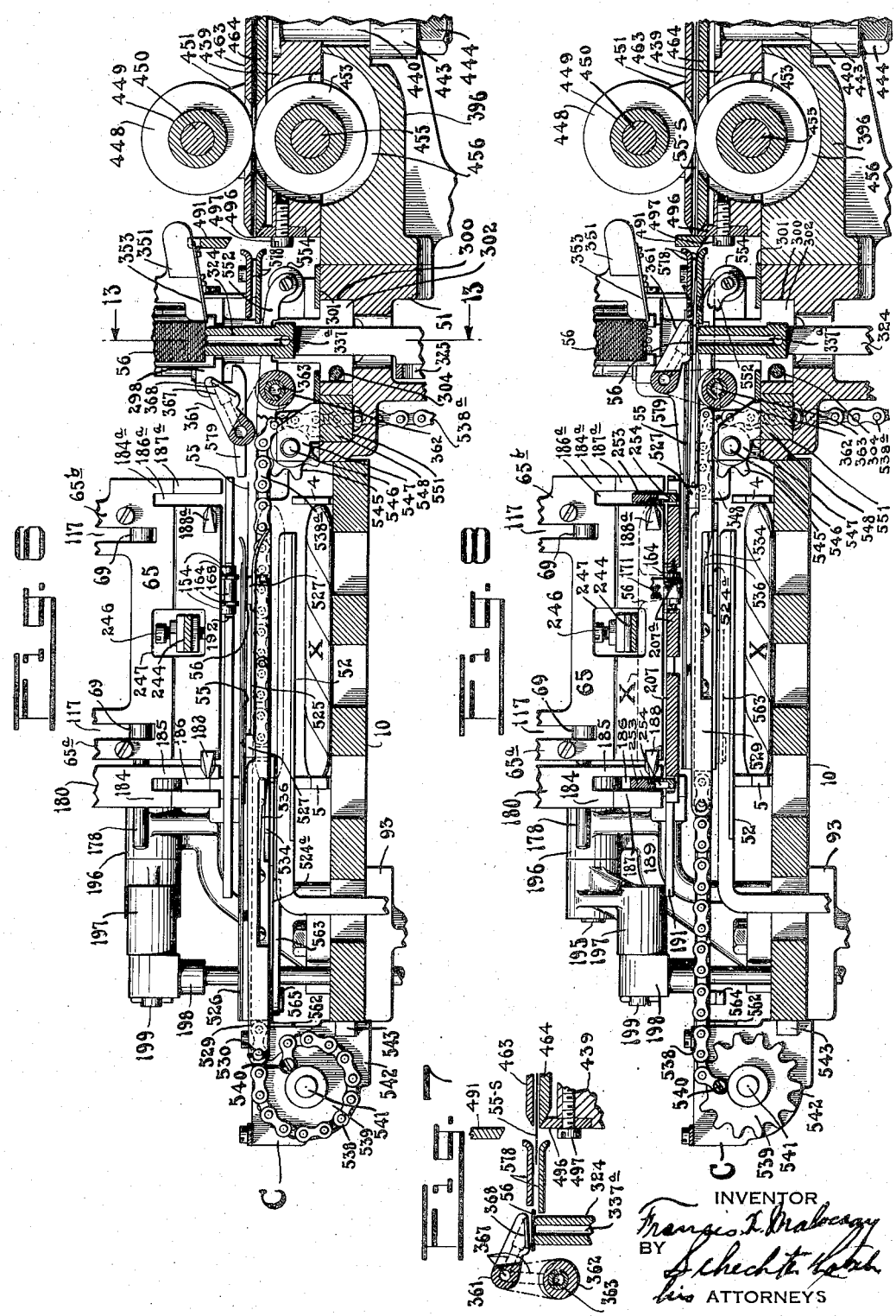
INVENTOR
Francis X. Malocsay
BY
his ATTORNEYS April 14, 1936. F. X. MALOCSAY 2,037,080
WRAPPING AND BANDING MACHINE
Filed Jan. 26, 1933 18 Sheets-Sheet 7
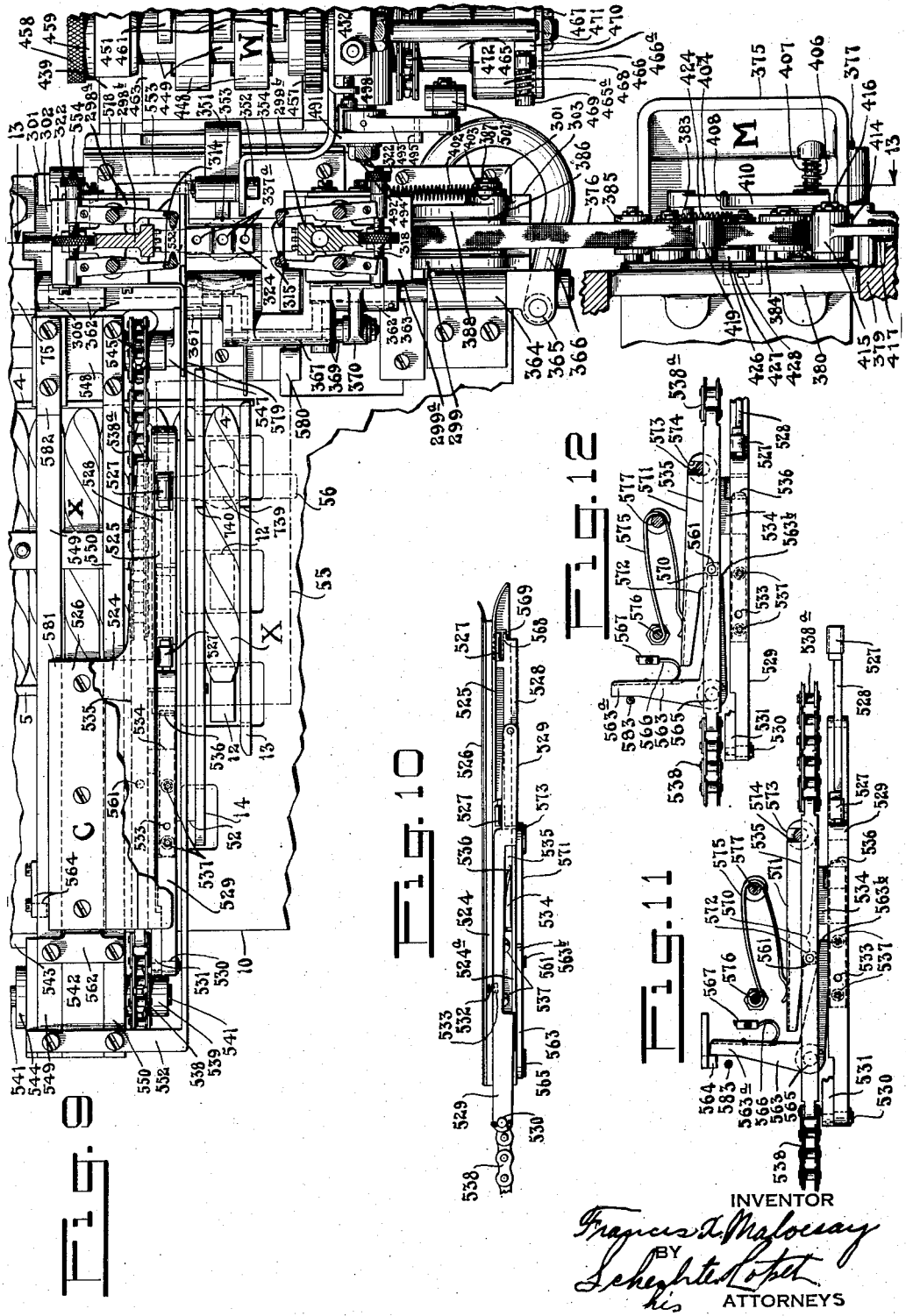

April 14, 1936.  F. X. MALOCSAY  2,037,080
WRAPPING AND BANDING MACHINE
Filed Jan. 26, 1933    18 Sheets-Sheet 8
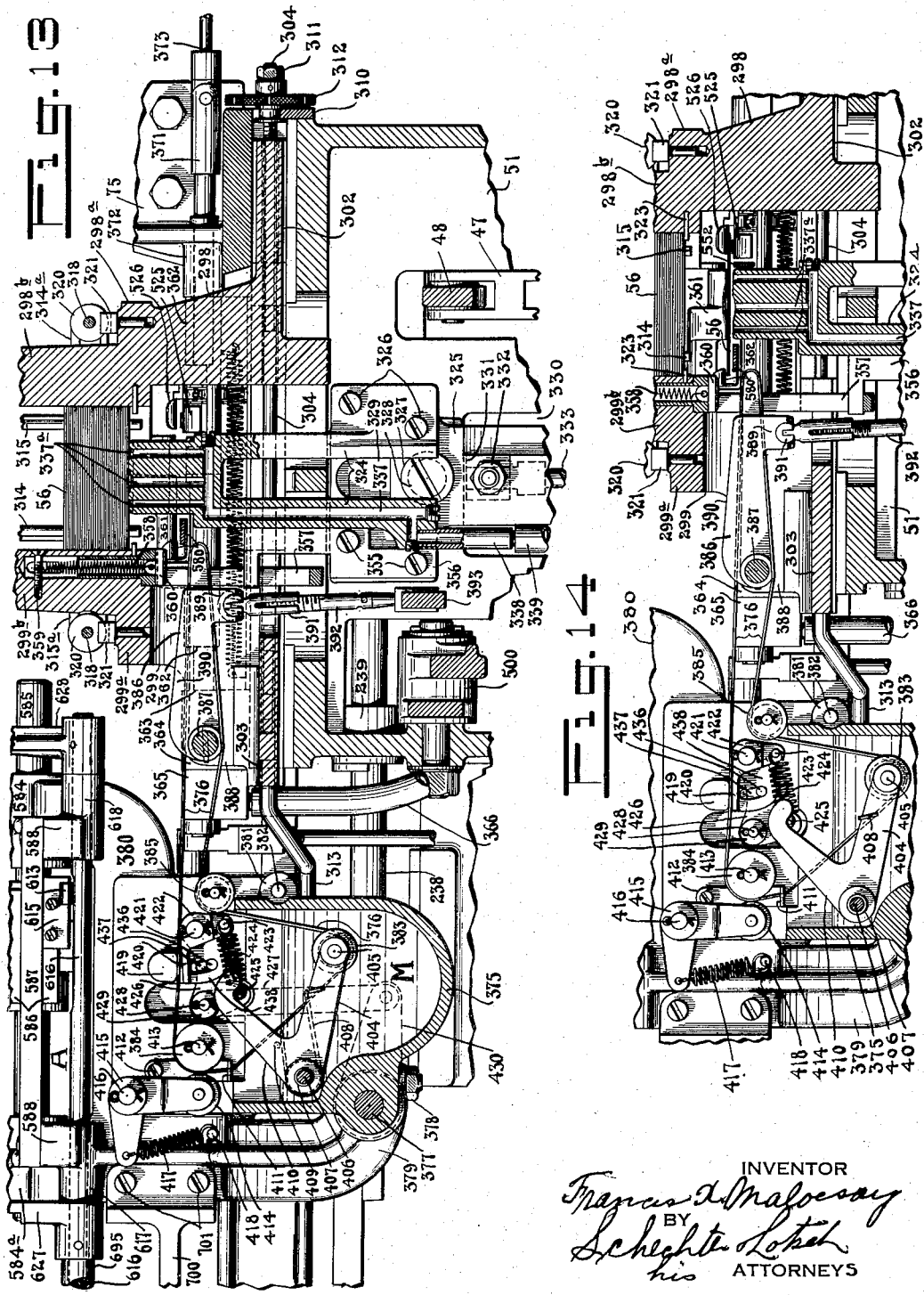

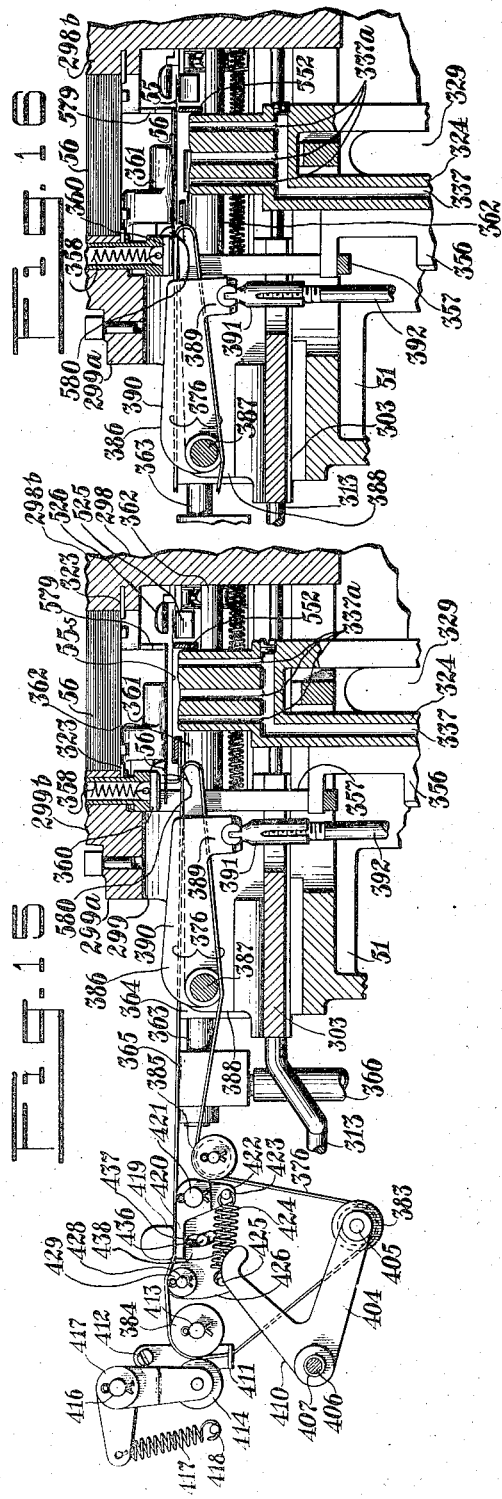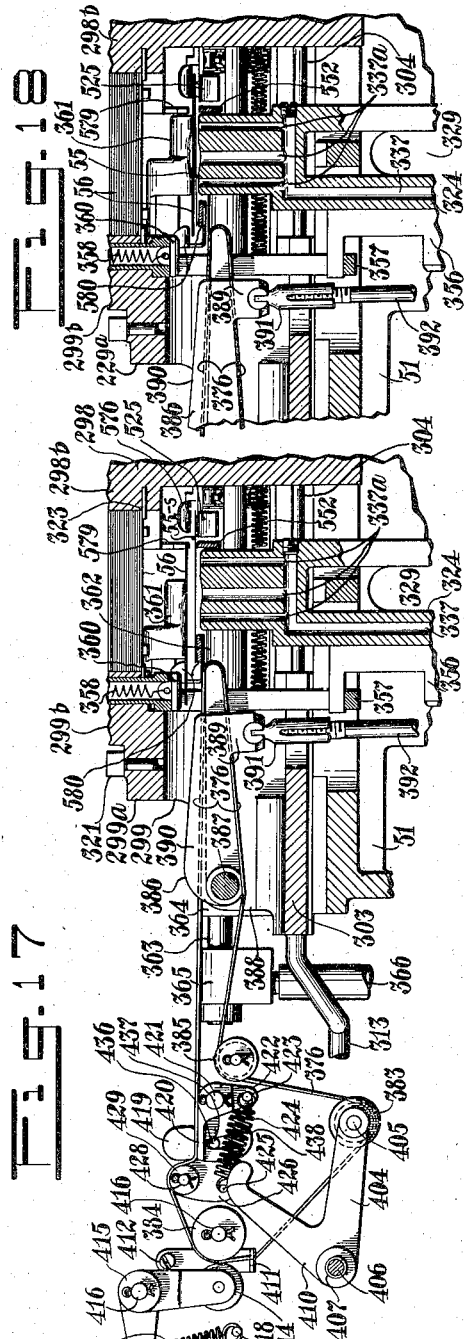

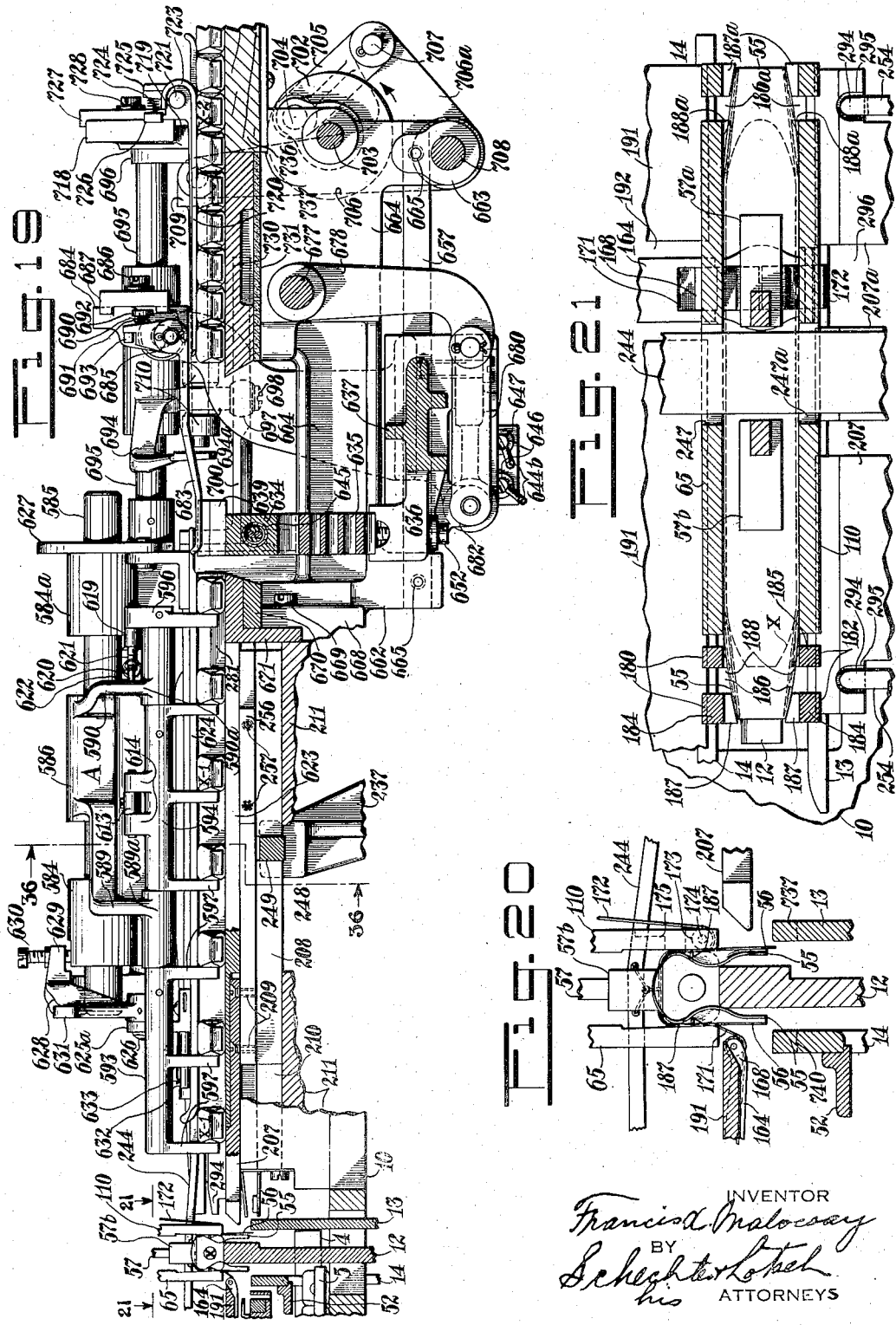

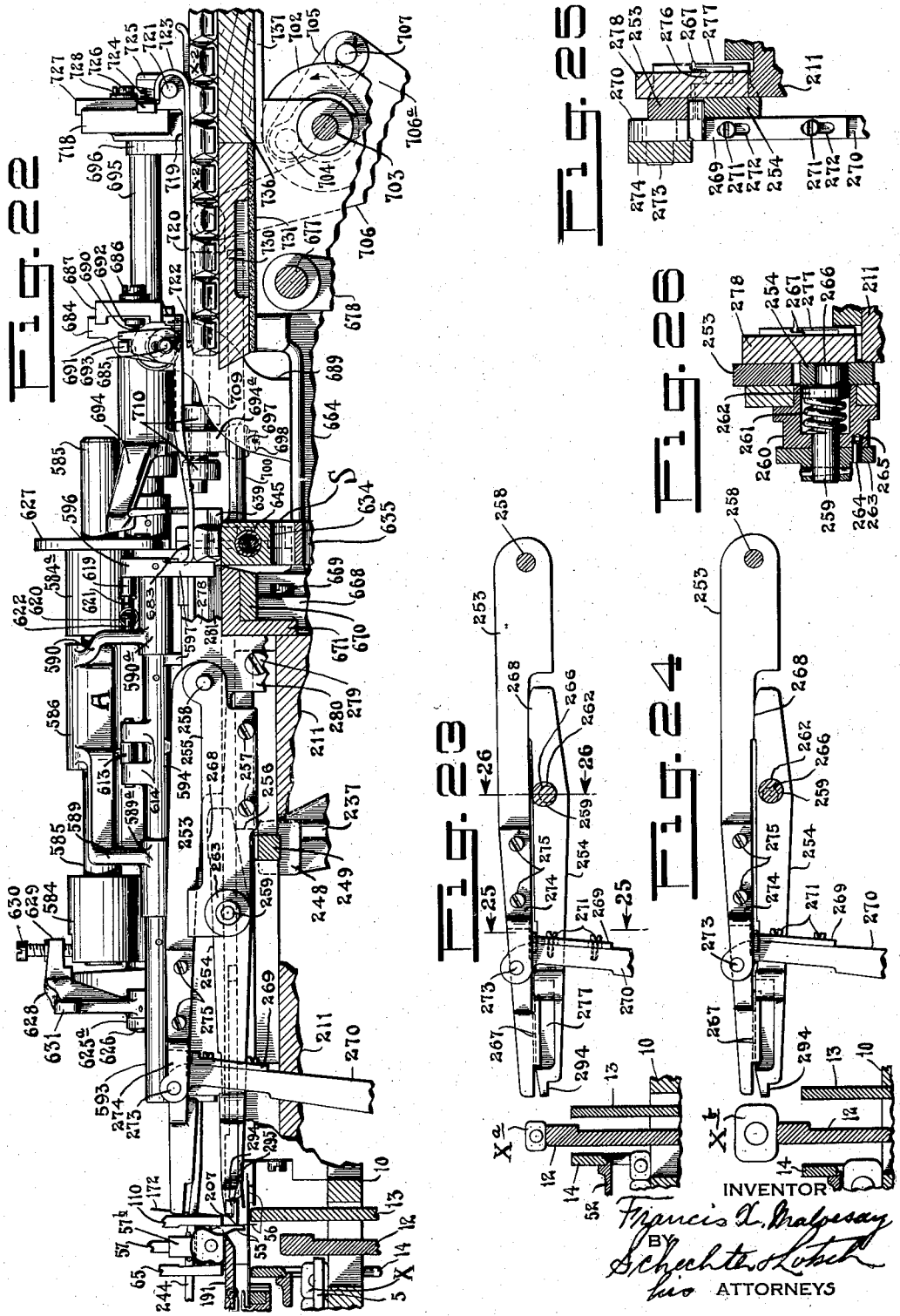

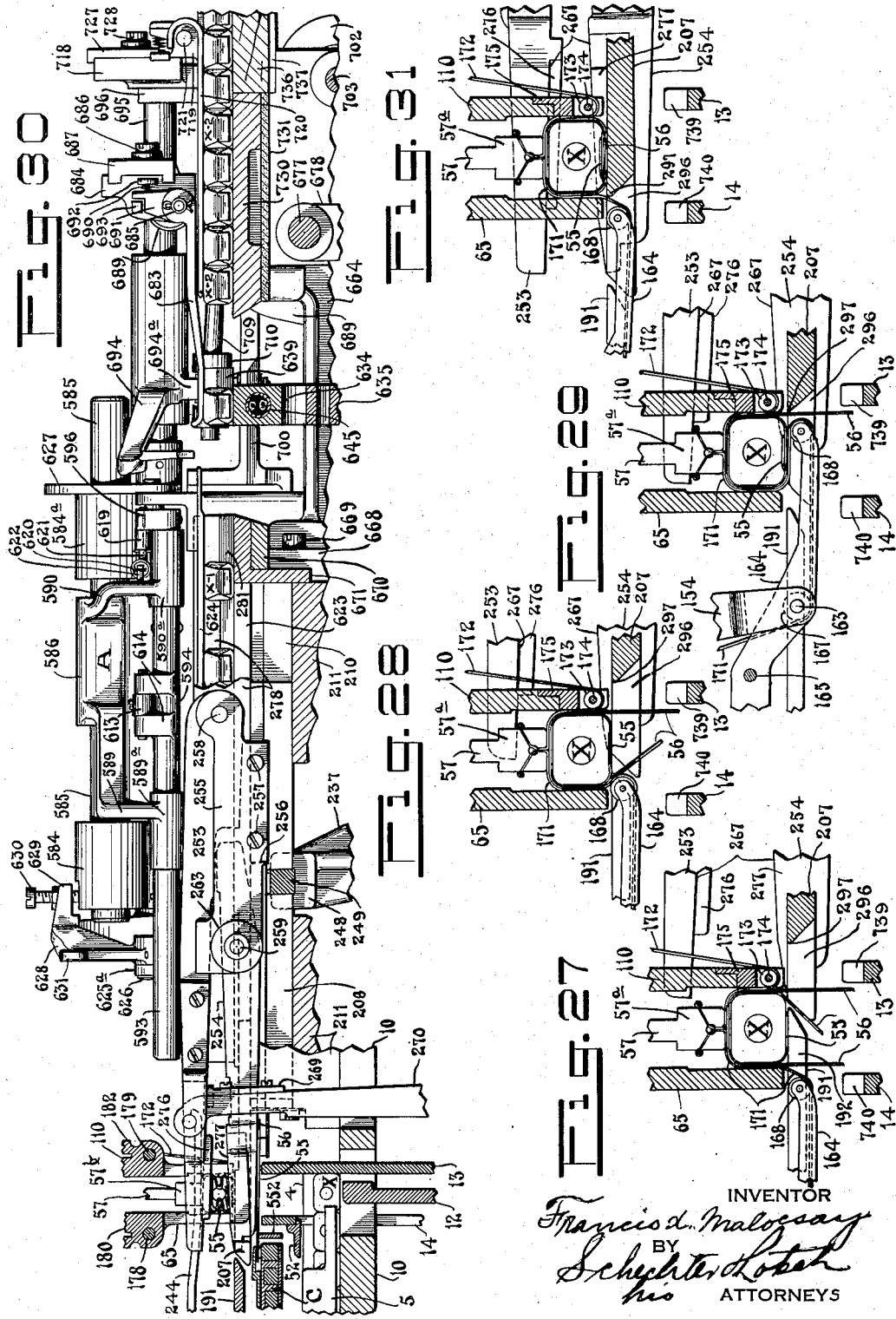

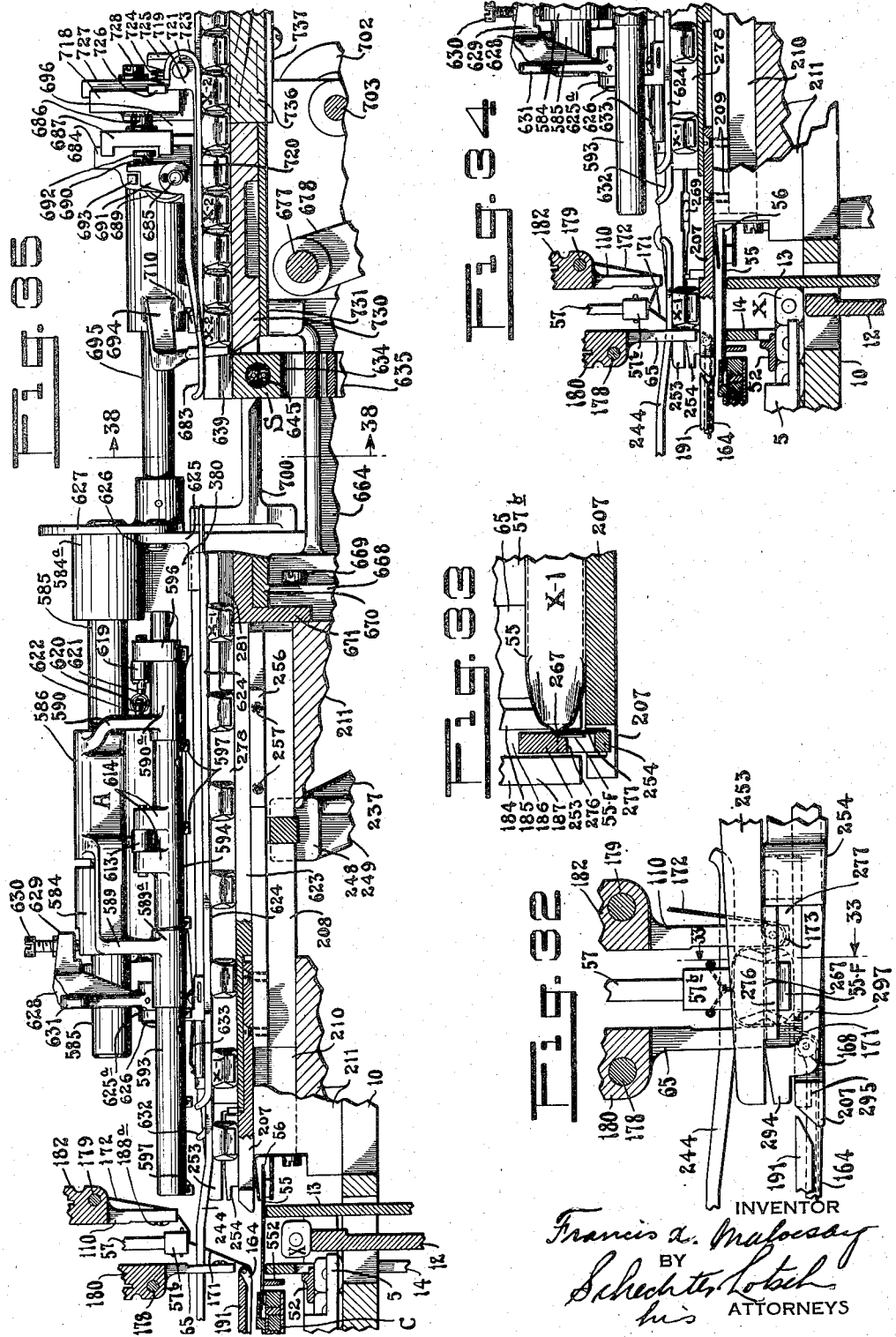

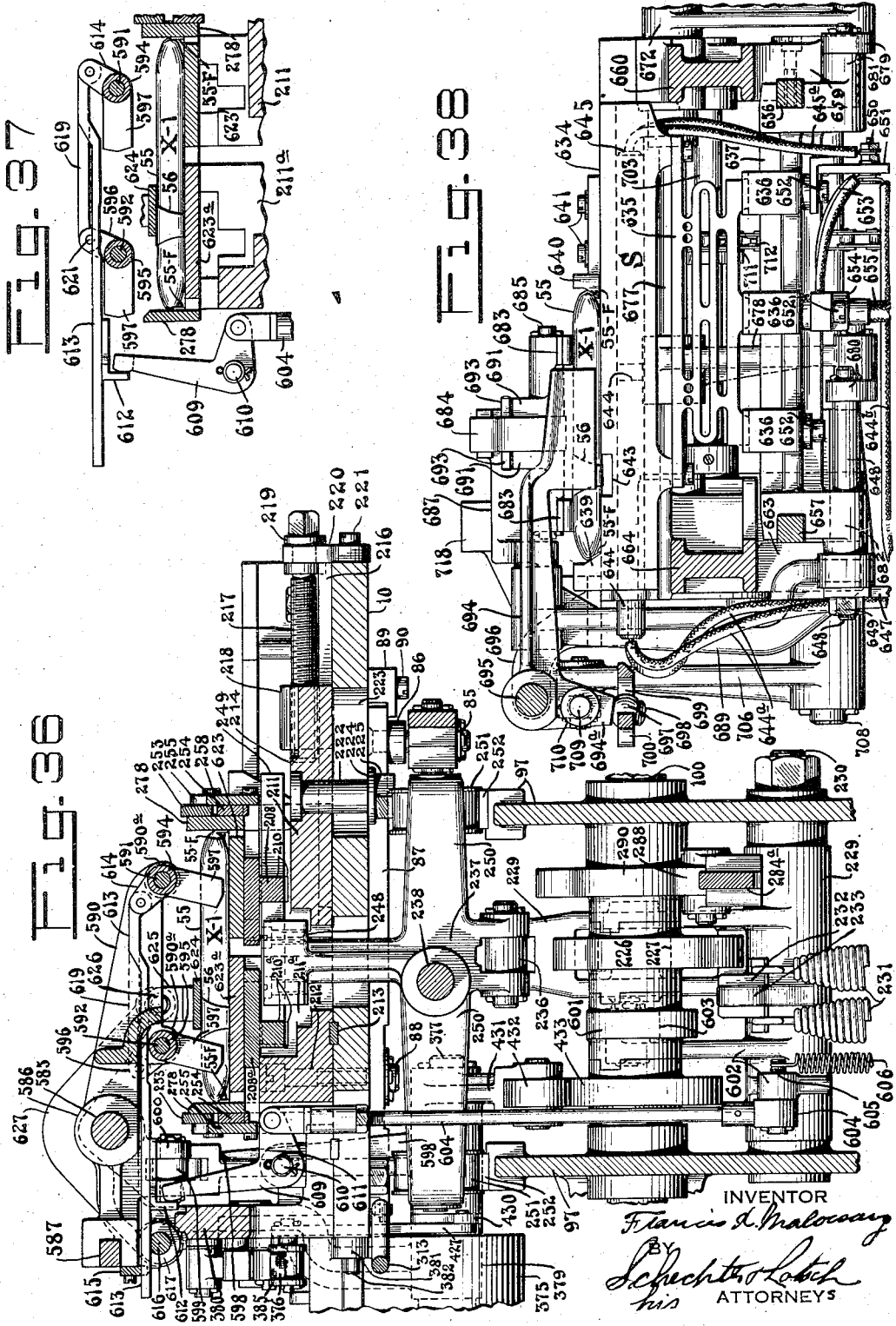

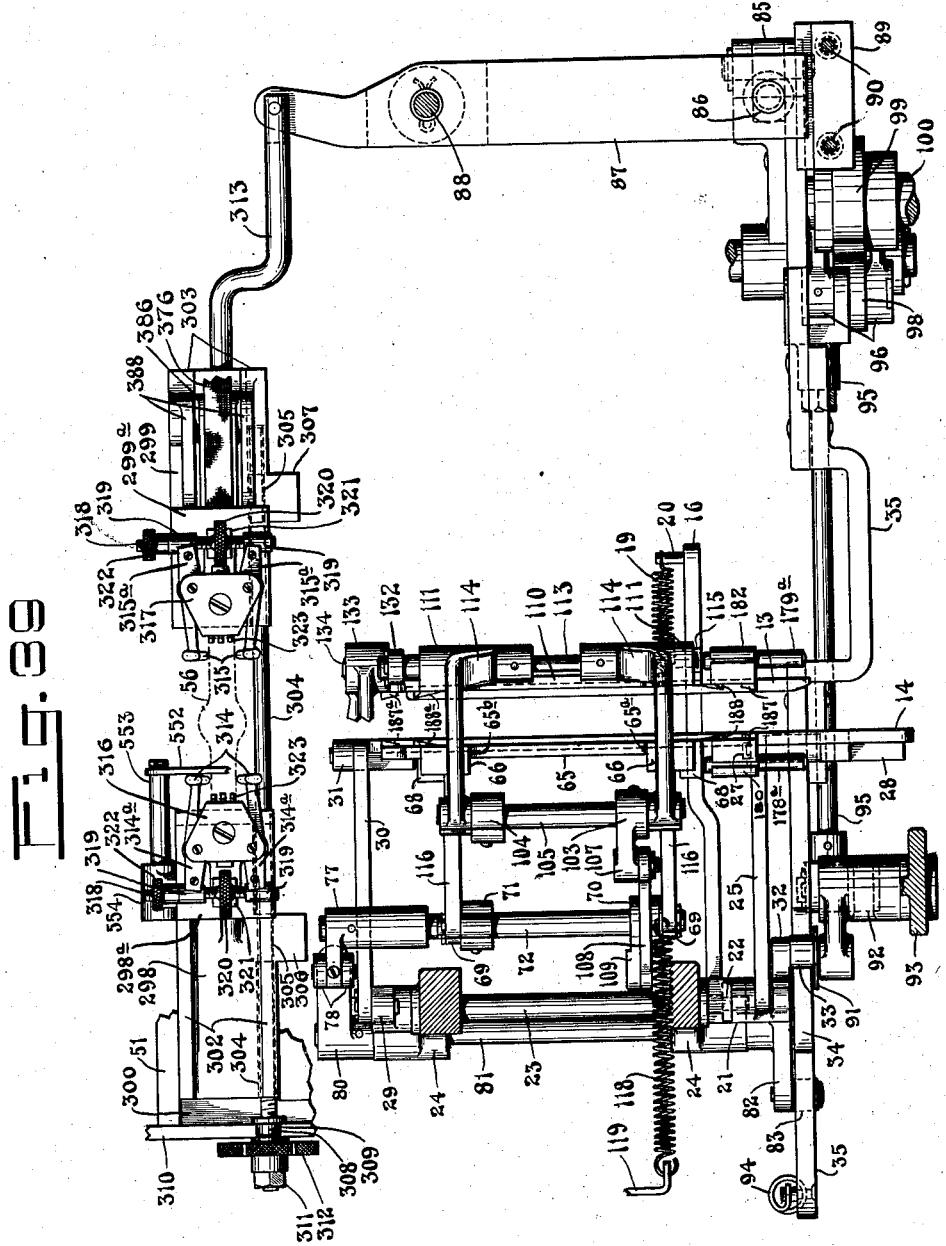

April 14, 1936.  F. X. MALOCSAY  2,037,080
WRAPPING AND BANDING MACHINE
Filed Jan. 26, 1933   18 Sheets-Sheet 16
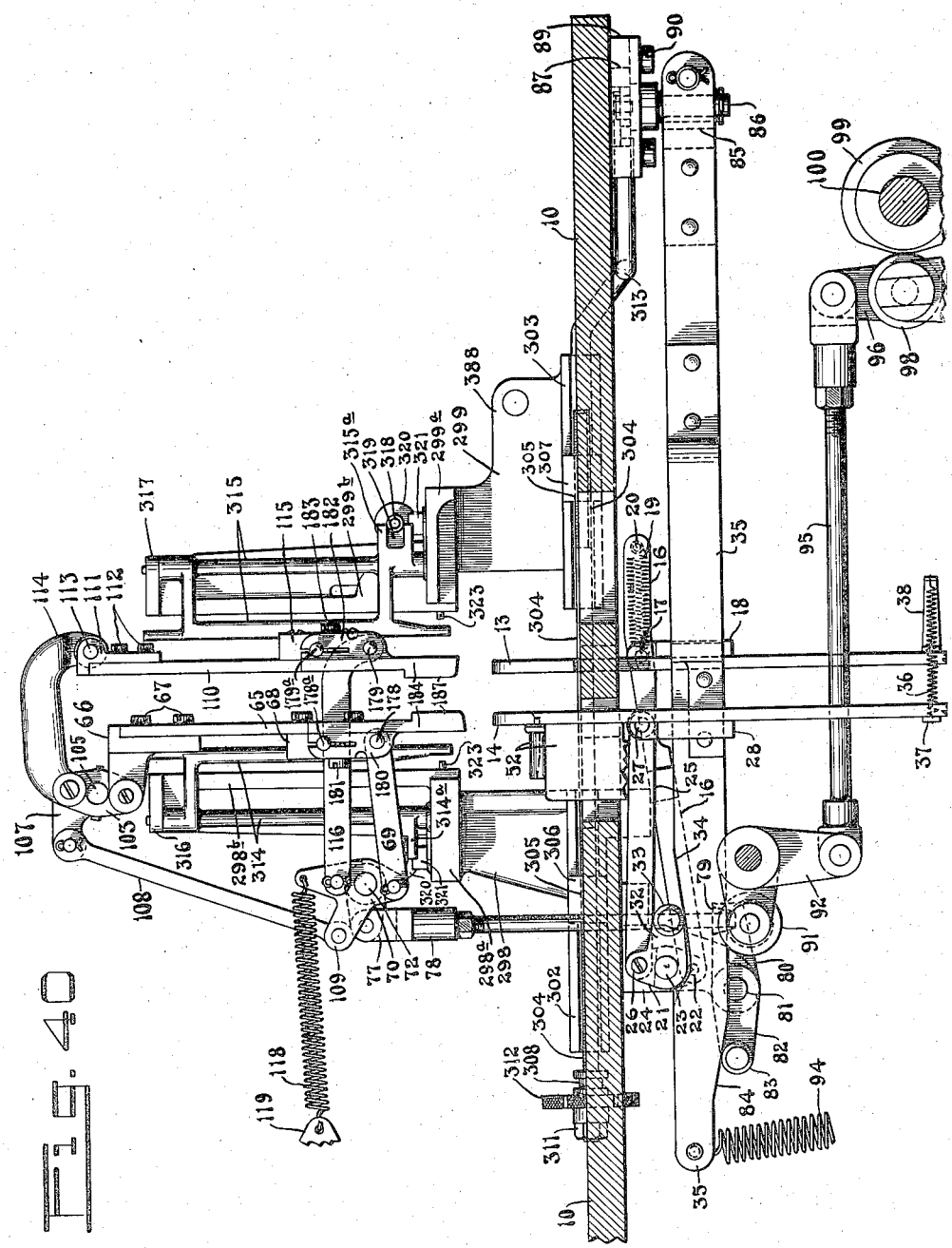
INVENTOR
Francis X. Malocsay
BY
Schechter Lotsch
his ATTORNEYS April 14, 1936.  F. X. MALOCSAY  2,037,080
WRAPPING AND BANDING MACHINE
Filed Jan. 26, 1933   18 Sheets-Sheet 17
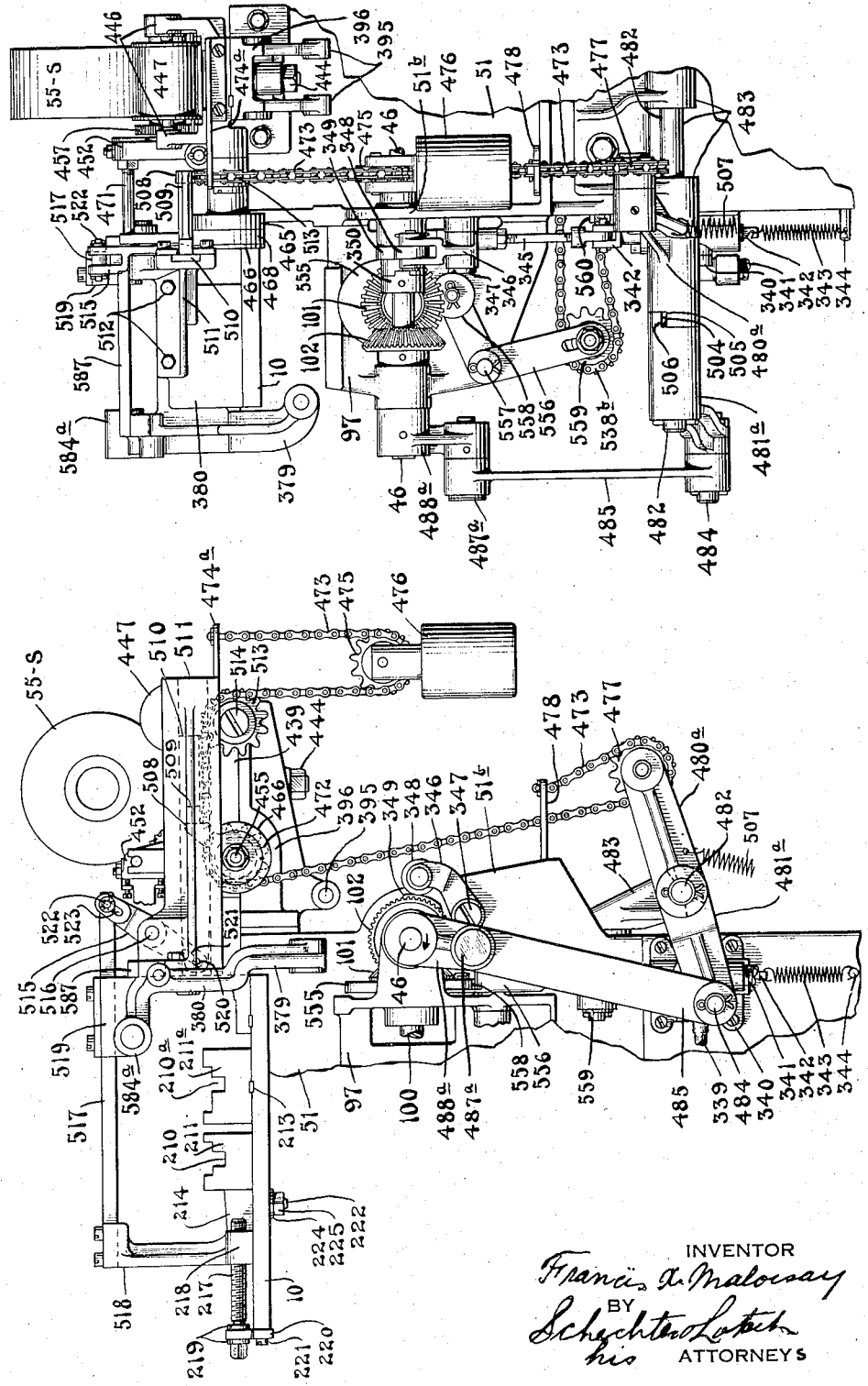
INVENTOR
Francis X. Malocsay
BY
Schechter Lotsch
his ATTORNEYS

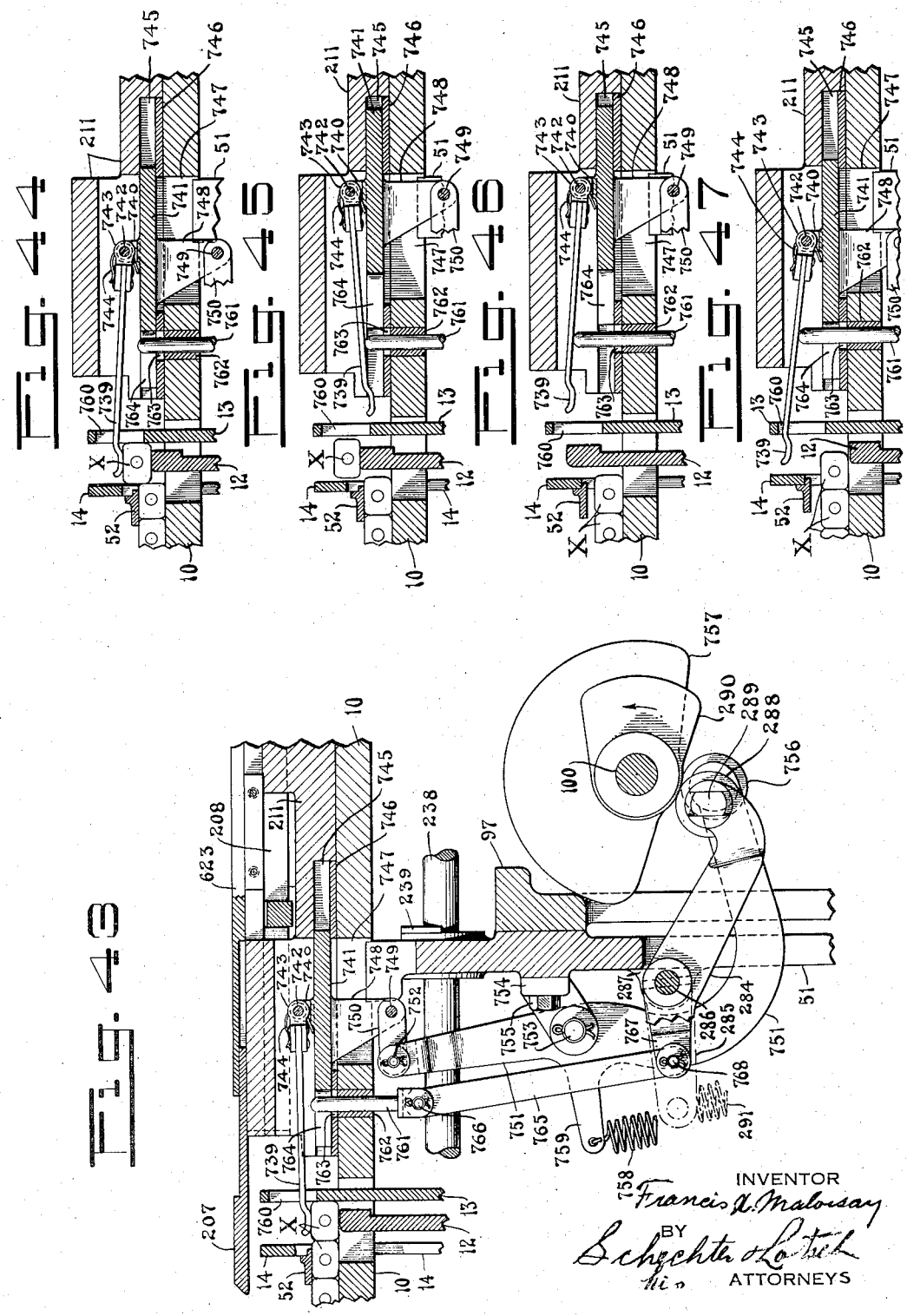

Patented Apr. 14, 1936

2,037,080

UNITED STATES PATENT OFFICE 2,037,080

WRAPPING AND BANDING MACHINE

Francis X. Malocsay, Upper Saddle River, N. J., assignor, by mesne assignments, to Consolidated International Corporation, a corporation of New York Application January 26, 1933, Serial No. 653,609

29 Claims. (Cl. 93—2)

This invention relates generally to article wrapping and banding machines, and while broadly applicable, is particularly concerned with the wrapping of cigars in transparent wrappers and the banding of said cigars.

While this invention is broadly adaptable to any kind of transparent or non-transparent wrapping materials, the one under special consideration and for which the present wrapping and banding machine has been specifically constructed, consists of transparent regenerated cellulose, commonly known under the trade name "Cellophane", and in particular it is the moisture-proof fusible kind of this wrapping material which can be sealed by the application of heat. The cigar band of course can be of common paper to which a common adhesive is applied for uniting it together.

It is among the general objects of the present invention to provide an improved wrapping and banding mechanism which will be entirely automatic in its operation.

It is a further object of the present invention to provide a wrapping and banding machine which will automatically deliver an article to wrapping and banding position and automatically wrap and band said article and then discharge said article.

It is among the further objects of this invention to provide an automatic wrapping and banding machine which will automatically deliver an article to a wrapping and banding position where it will be wrapped and banded, and, from which position it will be automatically removed, and advanced to a heat-sealing position, and from said position the article will be moved to the delivery or discharge end of the machine for packing.

Another object of the invention is to provide mechanism for automatic and simultaneous adjustment between the various devices to accommodate widths of wrapper strips and lengths of bands required for various shapes and/or sizes of cigars.

Another object of the invention is to provide a mechanism for feeding, wrapping and banding in which a hopper, conveyor, wrapping and banding devices are coordinated for synchronous operation so that as cigars are fed from the hopper to a conveyor, the conveyor moves the cigars forward with an intermittent movement, so that the periods of rest between the forward movement of the cigars is equal to one complete cycle of operation to complete the wrapping and banding of a cigar.

Another object of this invention is to provide a combination wrapping and banding machine in which, by means of a simple reciprocating unit, the overlapping edges of the wrapper will be heated and caused to adhere to each other without the use of glue or other sealing material.

Another object of this invention is to provide a combination which can be quickly and easily adjusted to accommodate cigars of various shapes and sizes, and which will be particularly adapted for synchronous cooperation with any of the various conventional cigar feeding devices commonly known as hoppers.

Another object of this invention is to provide an automatic combination wrapping and banding machine having a simple means for supplying individual wrapping sheets from a continuous roll of wrapping material to a conveyor, said individual wrapping sheet being of proper width and length to accommodate the particular size of the article to be wrapped, and fed from said means of supply in synchronism with the rate of the article feed.

A further object of this invention is to provide a combination cigar wrapping and banding machine having a band magazine mounted above the plane of travel of a wrapper material strip, having automatic means for stripping a band from said magazine to place it upon said wrapper material after the gummed end of the band has been moistened, and in proper relation to the position the band must assume when secured around the wrapped cigar; and a conveyor for gripping the wrapper strip and band to hold them in position before a knife cuts an individual wrapper from the strip, the wrapper and band conveyor being automatically adjusted to accommodate the widths of wrapper strip and length of bands required for various shapes and sizes of cigars.

Another object of this invention is to provide a combination cigar wrapping and banding machine in which a transparent wrapper is folded around a cigar whereupon the band is applied without moving the cigar to perform both operations.

Another object of this invention is to provide a combination cigar wrapping and banding machine having means automatically adjusted to guide cigars into the wrapping and banding position, and means automatically adjustable in combination with the cigar guiding means for folding the wrapper and band around three sides of the cigar; both of said means being simultaneously adjusted when the band hopper is adjusted to accommodate the length of band required for the particular cigar to be banded.

Another object of this invention is the provision of a coordinated mechanism for moving a plurality of articles one at a time to a feeding, wrapping, banding and delivery or discharge position respectively.

Another object of this invention is to provide a wholly coordinated and combined assembly by which the foregoing objects are carried out in a novel and improved manner and thereby increase the production and reduce the cost of wrapping and banding of cigars.

A further object of this invention is to provide a wrapping and banding machine in which the entire operation is automatic and does not require human handling of the articles, which thus greatly reduces the amount of manual labor or supervision required.

A further object of the invention is to provide an improved cigar wrapping and banding machine which is automatic in operation and in which the various parts are coordinated and cooperated in such manner as to eliminate the necessity of manual manipulation of the machine during the complete wrapping and banding operations.

Other more specific objects and advantages of the apparatus will appear as the nature of the improvements are better understood, the invention consisting substantially in the novel arrangement and corelation of instrumentalities herein fully described and illustrated in the accompanying drawings wherein similar reference characters are used to describe corresponding parts throughout the several views and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore is to be understood from an illustrative, rather than a restrictive standpoint. It will be understood that the various features of the invention may be separately applicable despite their cooperation herein shown.

While the above statements set forth a few of the more general objects of the invention, it will be understood that the invention concerns itself with other objects and advantages too numerous to mention relating to structural detail and interrelation and cooperation of parts, by means of which the advantageous functions are achieved; a major object being to provide an efficient, rugged and durable automatic machine which is particularly adapted to meet the demands of economic manufacture and operation.

In this specification no detailed description of the operation of the cigar feed hopper mechanism will be made, nor is it illustrated in the accompanying drawings, as this type of mechanism is fully described and illustrated in my Patent No. 1,653,641, dated December 27, 1927; and in my application, Serial Number 492,437, filed October 31, 1930, on Cigar banding machines; and Serial Number 519,347, filed March 2, 1931 on Cigar handling machines.

In the embodiment of the invention as herein disclosed there is provided a table, upon the top of which the cigars are fed in rows from a hopper which is not shown in the drawings, but is located at the left hand side of Fig. 1 and operated in a synchronous manner with the wrapping and banding operation. The cigars are fed from the hopper in rows to a belt feed, part of which is illustrated at the left hand side of Fig. 1. This belt feed moves the cigars forward with an intermittent movement, the rest periods between the forward movements of the cigars being equal to one complete cycle of operation necessary to complete the wrapping and banding of a cigar by the machine. As the cigars move forward and leave the hopper belt feed, they are pushed upon the table of the wrapping and banding mechanism which has mounted upon it suitable adjustable end guides. These guides insure perfect alignment of the cigars when each successive one is brought into contact with an adjustable stop located directly under the wrapping and banding position of the machine. This adjustable stop is one of two plates which act as centralizing guides for each individual cigar as it is moved upward to the wrapping and banding position by an elevating plunger located between them.

Located on both sides of these guide plates and slightly above their top surfaces are guide rails for the wrapper and band. A carrier mechanism for the wrapper and band, having automatic gripping members, is located at one side of these plates and operates parallel to the center line of the cigars. This carrier mechanism receives the wrapper and band from a wrapper feed and a band magazine located directly behind the wrapping and banding position; and both the wrapper and band are securely held by the gripping members of the carrier before the wrapper is cut from a continuous strip fed from a roll which is supported by the wrapper feed mechanism. The band magazine is positioned between the wrapper feed mechanism and the wrapping and banding mechanism, and the stack of bands in the magazine is supported above the line of travel of the wrapper. The carrier brings the wrapper and band under the wrapping and banding position, and as a cigar is moved upward between the guide plates it carries the wrapper and band with it into the folding and banding position between two automatically adjustable side folding plates. With the cigar in this position, the complete folding of the wrapper is accomplished and the band secured around the wrapper.

When the wrapping and banding of the cigar has been completed, one of the side folding plates moves upward and the cigar is moved out of the wrapping and banding position to an advancing mechanism. This mechanism advances the wrapped and banded cigars with an intermittent movement equal to the rate of speed the cigars are being fed into the wrapping and banding position. From this advancing mechanism the wrapped and banded cigars are placed upon a heat sealing unit where the seam created by the overlapping edges of the wrapper, and its folded down ends are fused together. The cigars are then passed over a cooling plate at the delivery end of the machine to cool the fused portion of the wrapper quickly to prevent the seam from parting.

All of the moving parts of the machine are operated either directly or indirectly from a single drive shaft. The cigar hopper and belt feed are also driven from this same shaft. In addition to many unique and improved structural combinations and interrelations, the invention is broadly directed to the composite assembly and cooperative drive of parts by which a proper sequence of operation is maintained and a wholly automatic continuously operating device results. It will be understood that while the invention is illustratively disclosed as a cigar wrapping machine embodying specific novel combinations, the invention is in no wise limited to the use or structure herein shown, and thus numerous changes, modifications and the full use of equivalents may be resorted to without departing from the spirit or scope of the invention.

The inventive idea involved is capable of receiving a variety of mechanical expressions, one of which for the purpose of illustration is shown in the drawings.

The invention may be more fully understood from the following description in connection with the accompanying drawings, in which—

Fig. 6 is a sectional detail view illustrating the stop or normal positions of the wrapper and band carrier with a wrapper and band in the wrapping and banding position, the band stripper in contact under the stack of bands in the magazine, the suction finger that removes the band from the band stripper swung outward to allow the stripper to be moved upward, and the wrapper strip feed at rest;

Fig. 7 is a sectional detail view illustrating the relative positions of the band stripper and the suction finger at the moment of transfer of the band from the band stripper to the suction finger to allow the wrapper strip, which is just starting to be fed forward as illustrated, to pass underneath the band;

Fig. 8 is a sectional detail view similar to Fig. 6, but illustrates the relative positions of the wrapper and band feed mechanisms at the completion of the wrapping and banding operation; the wrapper and band carrier having moved over and gripped the band which is supported by the suction finger and the wrapper sheet, which at this time has just been severed from the wrapper strip;

Fig. 9 is a detail plan view illustrating the relation of the wrapper and band feed mechanisms as illustrated in Fig. 6 and also shows a plan view of the mechanism for moistening the gummed end of the band;

Fig. 10 is a detail side view, in the open position, of gripping members of the wrapper and band carrier;

Fig. 11 is a detail plan view of wrapper and band gripping members as illustrated in Fig. 10 with the top portion of the carrier cut away to show the relative position of the parts which constitute a lock for said gripping members;

Fig. 12 is a view similar to Fig. 11 illustrating the positions taken by the parts of the lock when the gripping members are engaging the wrapper and band as illustrated in Figs. 6 and 7;

Fig. 13 is sectional detail elevation taken on the lines 13—13 of Figs. 6 and 9 and illustrates the normal or stop position of the moistening mechanism elements in relation to the band stripper and the suction finger for supporting the band;

Fig. 14 is a view similar to Fig. 13 and illustrates the first step toward moistening the gummed end of the band;

Fig. 15 is a view illustrating the second step of the band moistening operation, showing the gummed end of the band over the moistening tape where it has been carried by the suction finger and the start of the moistening tape shift by its operating mechanism;

Fig. 16 illustrates the third step of the band moistening operation, and shows the moistening tape in contact with the gummed end of the band;

Fig. 17 illustrates the fourth step of the band moistening operation, showing the moistening tape in its non-moistening position, and the completion of the preparation for the shift of the tape by its operating mechanism;

Fig. 18 illustrates the fifth step of the band moistening in which the moistened band has been moved back to its original position by the suction finger and its ungummed end and an edge of the wrapper has been gripped by the wrapper and band carrier;

Fig. 19 is a detail sectional view similar to Fig. 4 but partly broken away and illustrates the first step of the wrapping and banding operation, and the previously wrapped and banded cigars being advanced toward the heat sealing unit and the delivery or discharge end of the machine;

Fig. 20 is a full size sectional view illustrating more clearly the first wrapping step as shown at the left hand side of Fig. 19, showing the band and wrapper folded around three sides of the cigar;

Fig. 21 is a full size detail sectional view taken on the line 21—21 of Fig. 19, which clearly illustrates the start of the bellows fold at the ends of the wrapper by stationary means located at the extremities of the side folder plates;

Figure 2:
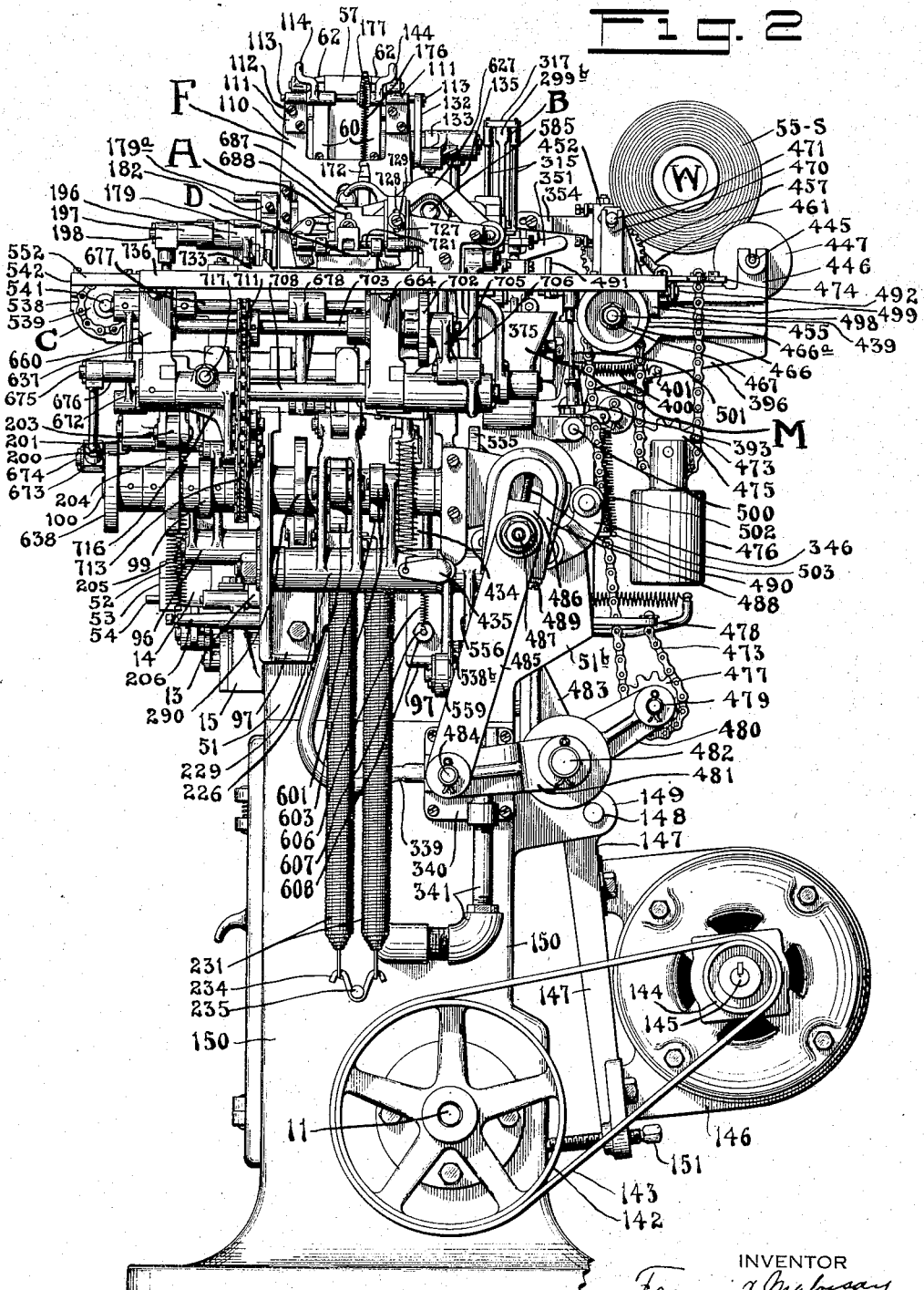
Fig. 2 is a side elevation of the machine looking at it from the cigar delivery or discharge end as seen from the right hand side of Fig. 1.
Figure 4:
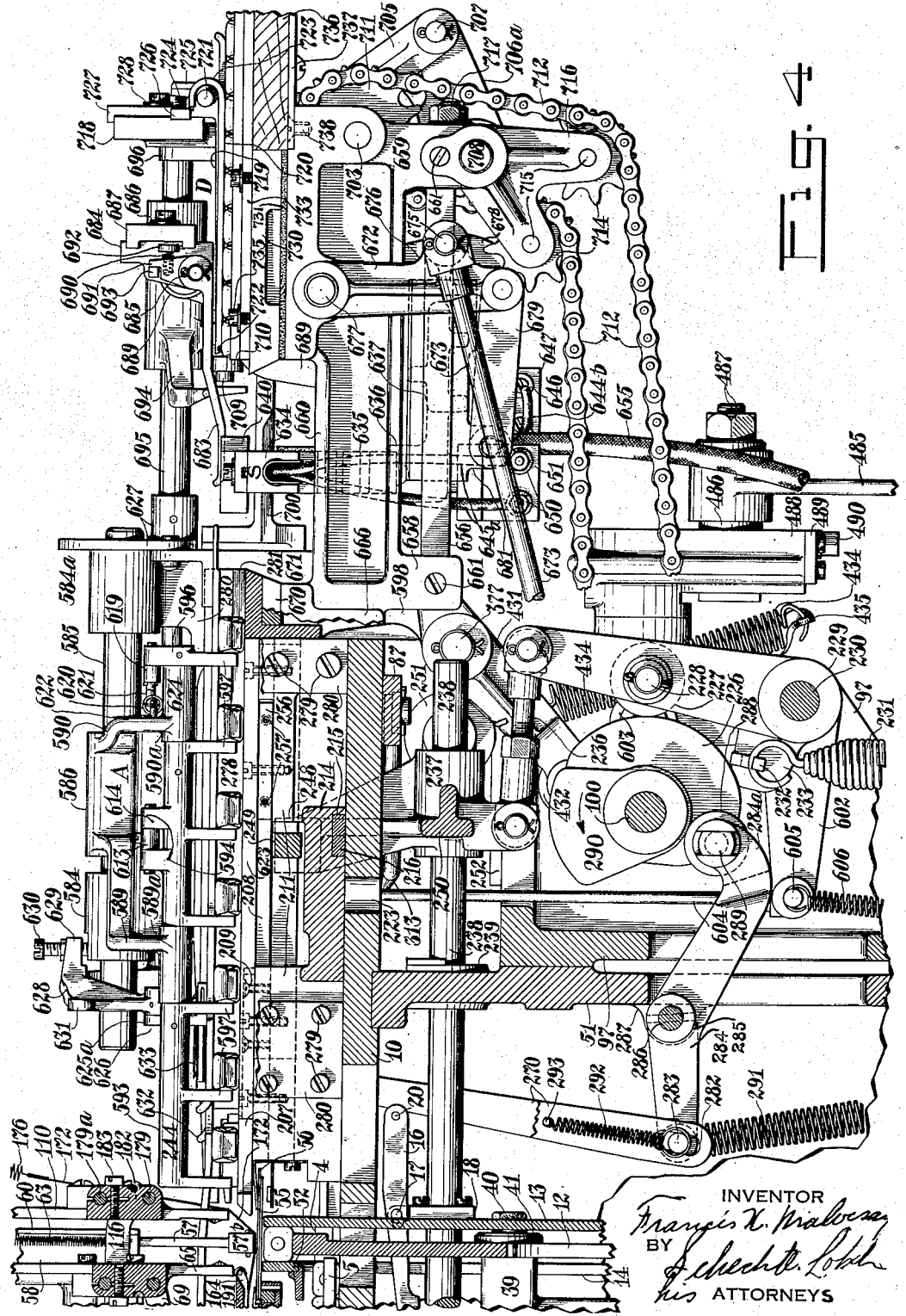
Fig. 4 is a sectional view of part of the cigar wrapping and banding mechanism, the cigar advancing mechanism, the heat sealing unit and the means for discharging the wrapped, banded and sealed cigars to the delivery or discharge table; this view being taken on the line 4—4 of Fig. 1, and looking in the direction of the arrows.

Fig. 22 is a detail view similar to Figs. 4 and 19 illustrating the second step of the wrapping operation showing one edge of the wrapper folded under the cigar, the ungummed end of the band adjacent to said folded under edge of the wrapper remaining in its downwardly projecting position, the wrapper end folder jaws slightly advanced and open, and the cigar advancing mechanism having just completed its operation of sliding a wrapped and banded cigar upon the heat sealing unit;

Figs. 23 and 24 are detail views illustrating the setting of the wrapper end folder jaws and adjustable guide plates when cigars of very small and large cross sections are to be wrapped and banded; the horizontal folding edge of the folder jaws being adjusted to be on the center line of the cigars;

Fig 25 is a cross sectional detail view taken on the line 25—25 of Fig. 23, illustrating the self-aligning stop for the wrapper end folder jaws which is carried by their actuating rods;

Fig. 26 is a cross-sectional detail view taken on the line 26—26 of Figs. 2 and 23 to illustrate the construction of the adjustment mechanism for the wrapper end folder jaws;

Fig. 27 is a detail view illustrating the third step of the wrapping operation which shows the start of folding the second edge of the wrapper under the cigar, the gummed end of the band adjacent to this edge of the wrapper remaining in its downwardly projecting position;

Fig. 28 is a similar view illustrating the completion of the third step of the wrapping operation and the start of the second banding operation which is the folding under of the ungummed end of the band, and also shows the advancing of the wrapper end folders;

Fig. 29 is a view similar to Figs. 27 and 28 illustrating the completion of the second band folding operation and also shows the right hand wrapper edge folder moved up into position to start the third band folding operation;

Fig. 30 is a view similar to Figs. 19 and 22 illustrating the start of the second step of the bellows fold of the wrapper at ends of the cigar by the wrapper end folder jaws, the start of the return stroke of the cigar advancing mechanism, and the heat sealing unit moving toward the delivery end of the machine with the wrapped and banded cigar placed upon it by the advancing mechanism as illustrated in Fig. 22;

Fig. 31 is a full size detail view similar to Figs. 27, 28 and 29 illustrating the completion of the third band folding operation; the right hand wrapper edge folder and the wrapper end folding jaws being in the exact position illustrated in Fig. 30;

Fig. 32 is a full size detail view illustrating the completed bellows fold;

Fig. 33 is a cross sectional view taken on the line 33—33 of Fig. 32 illustrating how the bellows fold at the ends of the wrapper are bent downward and squeezed by the folding jaws to prepare them for sealing against the under side of the wrapper by the heat sealing unit;

Fig. 34 is a detail sectional view illustrating the position of the wrapping and banding elements prior to the ejection of the completed wrapped and banded cigar from the wrapping and banding position, and also shows another cigar in position on the plunger for raising it into the wrapping and banding position;

Fig. 35 is a view similar to Figs. 19, 22 and 30 illustrating the position of the wrapping and banding elements when the wrapped and banded cigar has been ejected from the wrapping and banding position with the advancing fingers of the cigar advancing mechanism starting to swing downward into their advancing position behind the cigars as shown in Fig. 4, and the delivery of a wrapped, banded and sealed cigar from the heat sealing unit to the delivery or discharge mechanism;

Fig. 36 is a cross-sectional view taken on the line 36—36 of Fig. 19 illustrating the wrapped and banded cigar advancing mechanism and its operating elements in the advancing position;

Fig. 37 is a cross sectional detail view of the advancing fingers of the cigar advancing mechanism in their raised position as illustrated in Fig. 30;

Fig. 38 is a cross sectional detail view taken on the line 38—38 of Fig. 35 illustrating the heat sealing unit and its operating parts, and the means for sliding the wrapped, banded and sealed cigars from the sealing unit into the delivery or discharge mechanism;

Fig. 39 is a plan view in detail of the automatic adjustment between the cigar band magazine and the guide plates between which the cigars are brought into the wrapping and banding position and the side folder plates of the wrapping and banding mechanism;

Fig. 40 is a front elevation of Fig. 39, but which also clearly illustrates the mechanical elements which spread the guide and side folder plates apart to release the pressure on the sides of the cigars;

Fig. 41 is a detail side elevation of a modified form of the wrapper strip feed adjustment which is controlled by the setting of the wrapper end folding jaws to the length of the cigar to be wrapped and banded;

Fig. 42 is a rear elevation of the parts illustrated in Fig. 41;

Fig. 43 is a detail sectional view of a mechanical means to assist in the raising of the cigars from the feed table; the timing of elements being in the same sequence of operation as that illustrated in Fig. 30; and Figs. 44, 45, 46 and 47 are sectional detail views illustrating the various stages of the operation of the parts illustrated in Fig. 43.

Figure 1:
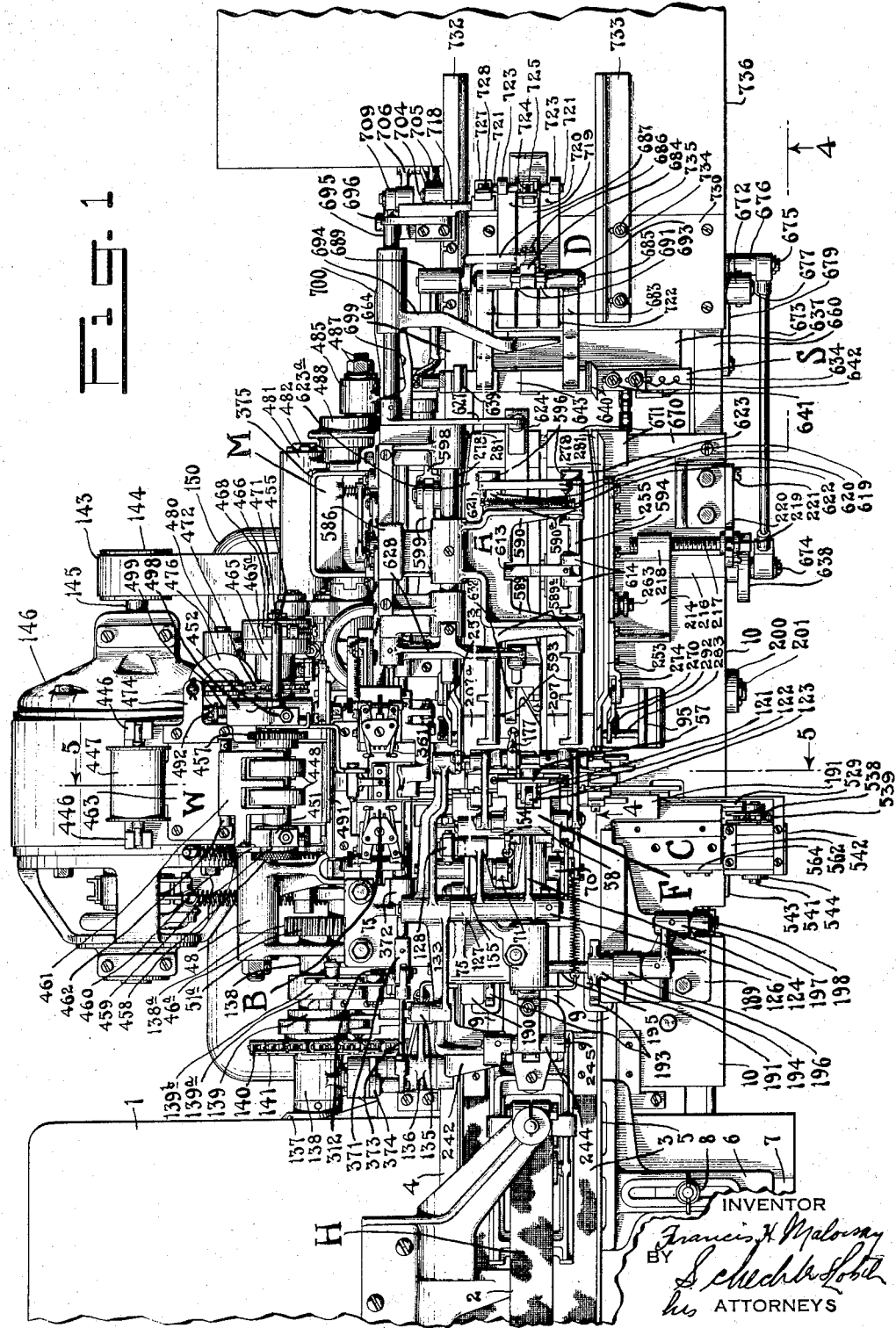
Fig. 1 is a top plan view of my improved wrapping and banding machine with the cigar hopper and part of the belt feed broken away at the left hand side of the drawing, and part of the delivery or discharge table broken away at the right hand side.
Figure 3:
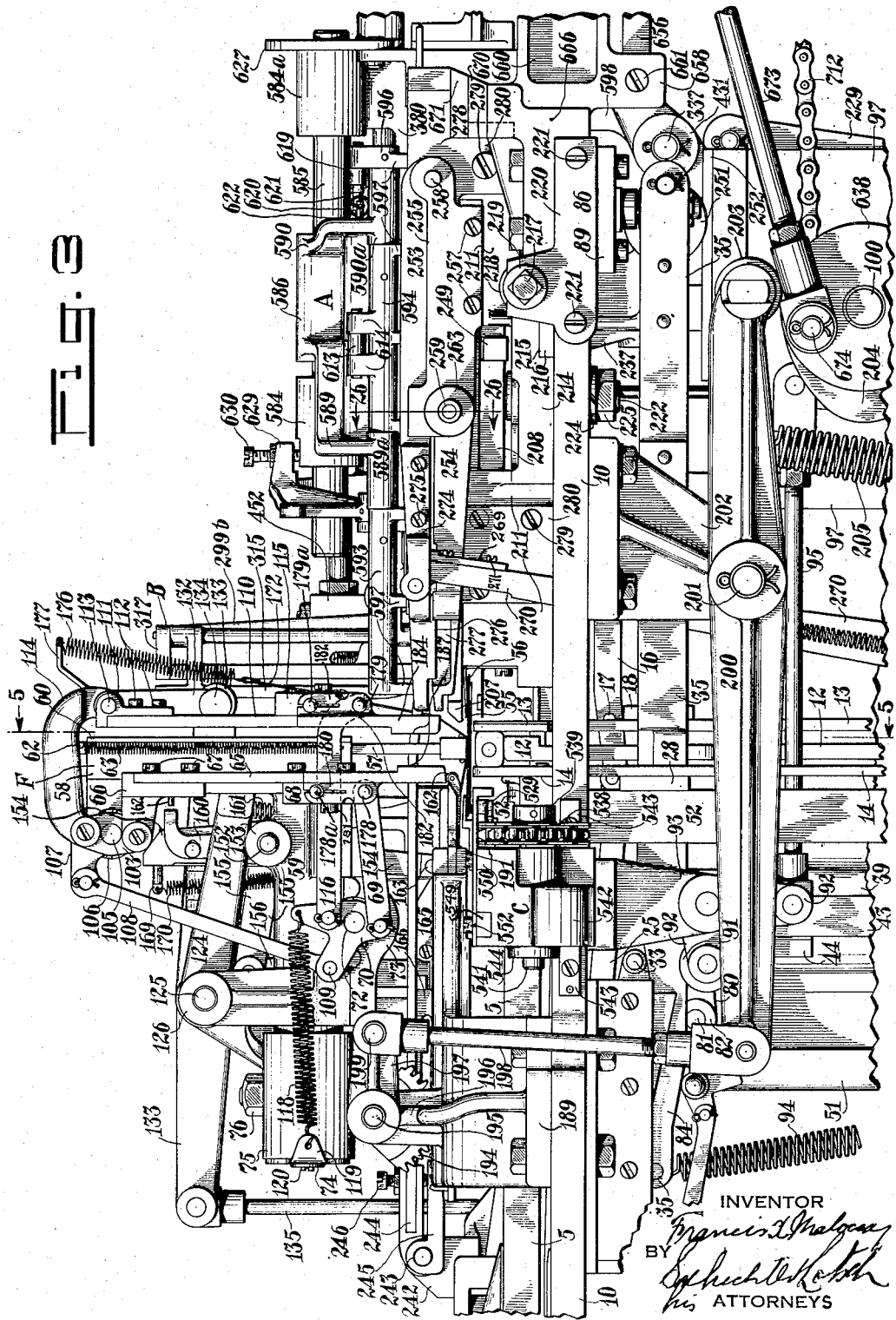
Fig. 3 is a front elevation of the cigar wrapping and banding, and advancing mechanisms.

With particular reference to Figs. 1, 2 and 3, the following are the essential groups of mechanisms constituting my wrapping and banding machine and which operate coordinately and in full automatic sequence with one another to the end that these various mechanisms function as one complete unit. The belt feed that conveys the cigars from an automatic hopper, which is not shown in the drawings, is designated by the letter H, the wrapping and banding mechanism by the letter F, the band magazine stripper mechanism by the letter B, the wrapper strip feed by the letter W, the carrier for the wrapper sheet and band by the letter C, the mechanism for moistening the gummed end of the band by the letter M, the wrapped and banded cigar advancing mechanism by the letter A, the heat sealing mechanism by the letter S and the wrapped, banded and sealed cigar discharge or delivery mechanism by the letter D.

Cigar hopper belt feed "H"

No detail description of the cigar hopper, which is not shown in the drawings, will be given, as this type of mechanism is fully described and illustrated in my Patent No. 1,653,641, dated December 27, 1927, and in my applications, Serial Number 492,437, filed October 31, 1930, on Cigar banding machines and Serial Number 519,347, filed March 2, 1931, on Cigar handling machines. This combination wrapping and banding machine will cooperate with any one of the cigar hoppers described in the above granted patent or the pending applications, but is particularly adapted to cooperate with the hopper described and illustrated in the application, Serial Number 492,437, as one of the types used to feed cigars to the model machine from which these drawings were made. The hopper is mounted upon the table 1 and ejects the lowermost row of cigars which are fed between the belts 2 and 3 of the conveyor H, shown at left hand side of Fig. 1. The conveyor moves the cigars forward with an intermittent movement; the surface speed of which is slightly greater than is necessary to feed the cigars up to the wrapping and banding position, and it is because of this slightly greater surface speed, that any space between the individual cigars or between the ends of the rows of cigars as they are moved away from the hopper, is gradually eliminated. The cigars are guided at their ends by the guide rails 4 and 5 (see Figs. 1, 4 and 6), which extend up to the wrapping and banding position. The rail 5 is supported slightly above the belt 3 by its adjustable supporting member 6 which is slidably mounted on the slide rail 7 secured to the top of the table 1, and which is retained in its adjusted position by the wing nut 8. The adjustability of this guide rail is provided for the purpose of accommodating cigars of various lengths which this machine may be required to wrap and band; and it is so supported to allow its being moved inward over the belt 3 for short length cigars or away from the belt for longer ones.

As the cigars are moved forward toward the wrapping and banding position, they pass from between the conveyor belts upon three reciprocating members 9 (see Figs. 1 and 3) which slide in grooves machined in the bed plate 10, upon which all the various mechanisms comprising this machine are mounted. These reciprocating members make one complete forward and backward movement to one cycle of operation of the machine, and though they help slightly to move the cigars up to the wrapping and banding position, their main purpose is to relieve the great amount of friction, which would be created if the cigars were allowed to slide along the surface of the bed plate. The reciprocating members receive their motion from mechanical means connected to a cross shaft which is part of the cigar hopper drive, and it is because of this, that this mechanical means is not shown in the drawings. The main drive for the cigar hopper is connected to the far end of the shaft 11, Fig. 2, by a pair of grooved pulleys and a belt which are not shown in the accompanying drawings, but which are illustrated and described in my application, Serial No. 492,437, already referred to herein.

*Wrapping and banding mechanism "F"*

Figure 5:
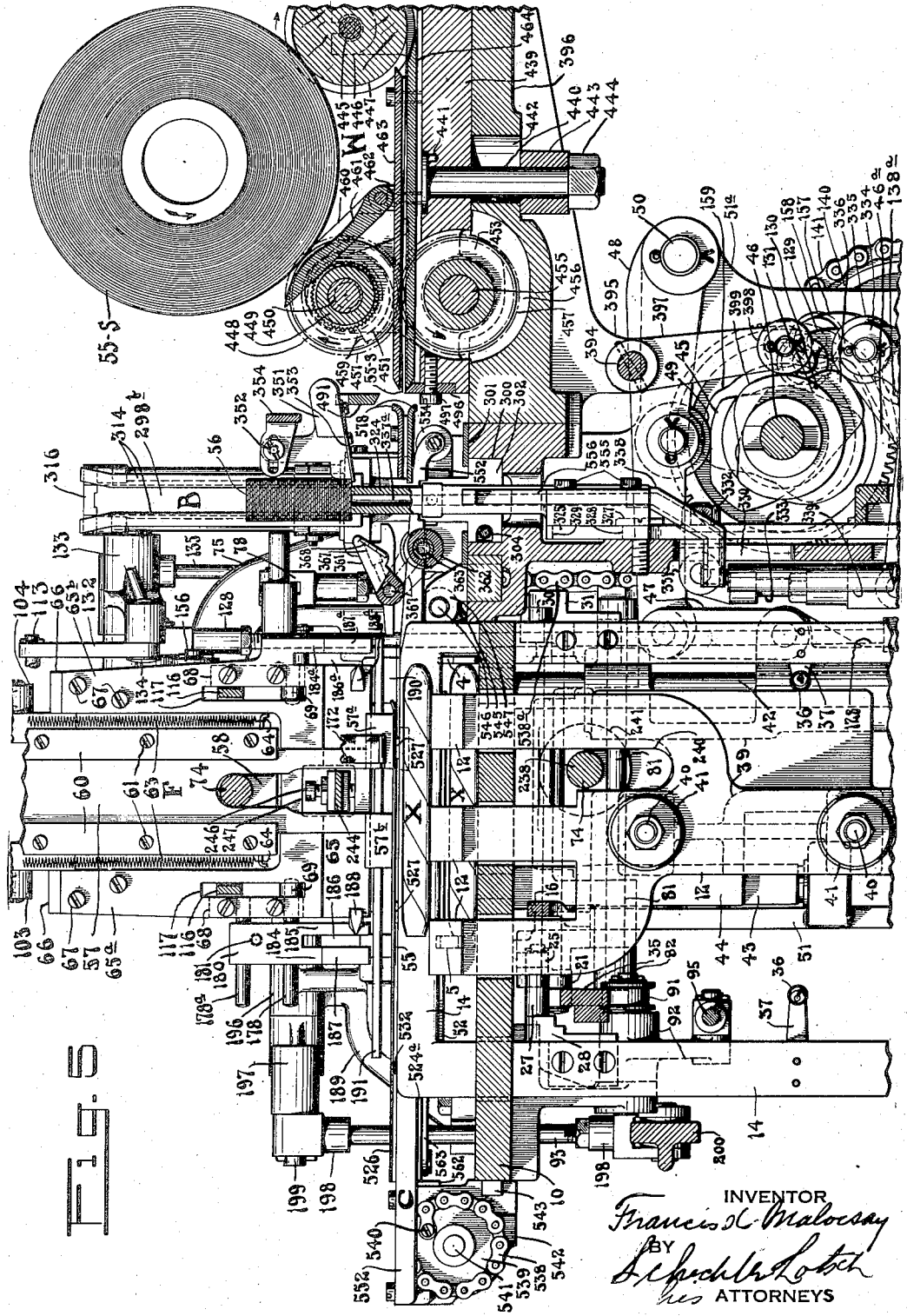
Fig. 5 is a sectional view taken on the lines 5—5 of Figs. 1 and 3 and looking in the direction of the arrows and illustrates the relative positions of the wrapper feed, the band magazine and the wrapper and band carrier to the wrapping and banding mechanisms.

Referring to Figs. 1 and 2, and more particularly to Figs. 3, 4 and 5, it will be seen that a cigar X has been raised upward from the bed plate 10 by the cigar elevator plunger 12, and is centralized by the cigar stop and guide plate 13 and the guide plate 14. This position is the normal or stop position of the machine at the completion of one complete cycle of operation. The plates 13 and 14 are hinged to the hinge block 15 shown only in Fig. 2, their downwardly extending legs passing through suitable openings in the bed plate 10. The plates are also connected by parallel link movements near their upper extremities, but located below the bed plate. These parallel link movements (see Figs. 39 and 40) comprise the link 16, which is pivotally connected to the stop and guide plate 13 by engaging the pin 17 carried by the block 18 secured to the leg of the plate. The pin 17 passes through a slot cut in the link 16 to allow for a movement of the plate 13 toward the plate 14, the purpose of which will be described hereinafter. The plate 13 is retained in its normal position by the coil spring 19, one end of which engages the extended end of the pin 17; the other end of which is anchored on the pin 20 carried in the extended end of the link 16 provided for this purpose. The opposite end of this link is pivotally connected to the toggle lever 21 by the pin 22. The toggle lever 21 is secured upon the shaft 23 which is mounted in the bearing blocks 24 fastened to the underside of the bed plate 10. The top portion of the toggle lever 21 is offset toward the front of the machine, and it is to this part of the lever that the connecting link 25 is pivotally connected by the screw 26. The opposite end of the link is connected to the end of pin 27 carried in the block 28 secured to one of the legs of the guide plate 14; which is most clearly shown in Figs. 5 and 40. Secured upon the opposite end of the shaft 23, and in the same relative position as that part of toggle lever 21 to which the connecting link 25 is connected, is the toggle lever 29 which is shown most clearly in Fig. 39. This toggle lever is connected to the other end of the guide plate 14 by the connecting link 30 and the block 31. Integral with the toggle lever 21 is the arm 32 which carries the cam roller 33. This roller is in contact with a cam surface 34 cut in the upper edge of the folder and guide plate adjustment bar 35; the purpose of the cam surface being to give the guide plates 13 and 14 an initial setting for the size of cigar to be wrapped and banded. This adjustment of the plates is accomplished automatically and will be fully described hereinafter. The guide plates 13 and 14 are pulled toward each other and the roller 33 is held in contact with its cam surface 34 by very light coil springs 36 which are anchored to the legs of the plates by means of the anchor lugs 37 and 38. These springs are not strong enough to overcome the pull of the spring 19 but are just strong enough to centralize the cigars moved up by the cigar elevator plunger 12, and at the same time they automatically allow for the unavoidable variation in the width of the cigars.

Referring more in particular to Fig. 5, it will be seen that the upper portion of the cigar elevator plunger 12 is trifurcated and its branches pass upward through suitable openings in the bed plate 10. The body or stem of the plunger is secured to the sliding block 39 by the bolts 40 and the washers 41. The block 39 is slidably mounted on the vertical shaft 42 and is retained in perfect alignment by the engagement of the square guide shaft 43 by a bifurcated portion 44 integral with said block. The plunger and block receive their intermittent vertical reciprocating motion from the cam 45 mounted on the cam shaft 46, the motion being imparted to them by the connecting link 47 and the rocker arm 48 carrying the cam roller 49; the rocker arm being mounted on the pivot pin 50, fixed in an extended side portion or bearing flange 51a of the body casting 51, upon the top of which is fastened the bed plate 10.

To facilitate the raising of the cigars X by their elevator plunger 12, I have provided a cigar retaining finger 52. (See Figs. 3 and 6.) This retaining finger is supported upon one of the legs of the guide plate 14 at its lower extremities in such a manner that it will move horizontally with the plate and also be moved vertically to it. The mechanism for moving this retaining finger vertically is not shown because it is mainly part of the cigar hopper feed, which, as already mentioned herein, is not illustrated in the drawings, although the point of support of the finger which is a forked bearing 53, and its bearing pin 54, also the bearing pin for the plate 14 are shown in Fig. 2. The finger is moved vertically by a lever connected to a rocker arm actuated by a cam which is part of the cigar hopper feed mechanism. The main object of this finger is to exert a light pressure upon the second cigar of the row at the wrapping and banding position to prevent it from being forced upward by the friction between it and the first cigar when said first cigar is to be moved upward by the elevator plunger 12 as illustrated in Figs. 35, 43 and 44.

With the cigar X in the normal or stop position as illustrated in Fig. 3, a wrapper 55 and band 56 have been brought into the wrapping and banding position by their carrier C, the operation of which will be more fully described hereinafter. Directly above the wrapper and band, and on the center line between the two guide plates 13 and 14, is located a presser plunger comprising the slide plate 57 and the feet 57a and 57b, which are clearly illustrated in Fig. 5. The presser plunger is slidably mounted in a guide comprising the upwardly extending bracket 58 integral with the bearing block 59, and it is retained in position by the retaining plates 60 which are secured in position by the screws 61. Extending outward from the sides of the plunger slide plate 57 and located at its uppermost extremity are the spring supporting arms 62. (See Figs. 2 and 3.) Hooked in suitable openings at the ends of these arms are the ends of light coil springs 63, the lower ends of which are screwed into the lower portion of the bracket 58. The purpose of these springs is to pull the presser plunger downward with just enough force to prevent the wrapper and band from slipping when a cigar is being pushed upward into the position illustrated in Fig. 19 which is the first step of the wrapping and banding operation. Secured to the plunger slide plate 57 of the presser plunger is the bracket 121, which is shown only in Fig. 1 of the drawings. This bracket carries a pin 122 which engages in a slot cut in the pusher link 123; the lower end of which is connected to one branch of the bifurcated lever 124. (See Figs. 1 and 3.) This lever 124 is pivotally mounted on the stationary pin 125 which is carried by the support 126 integral with the bearing block 59 and the support 127 which is integral with the bracket 75. Connected to the second branch of the bifurcated lever 124 is the push rod 128 which passes downward through the bed plate 10; its lower end being connected to the rocker arm 129 which is partly shown in Fig. 5. This rocker arm carries the cam roller 130 which engages the presser plunger cam 131 mounted on the cam shaft 46. The purpose of the pusher link 123 and the bifurcated lever 124 is to move the presser plunger, comprising the plunger slide plate 57 and the feet 57a and 57b upward to allow the completely wrapped and banded cigar to be removed as illustrated in Figs. 34 and 35.

Located at the left side of the presser plunger 57 (see Figs. 3, 5, 39 and 40) is the left hand side folder plate 65 which is supported at its upper extremity by the bearing brackets 66, secured to it by the screws 67. The portion of the plate between the bearing brackets is cut away, leaving the upwardly extending legs 65a and 65b (as illustrated most clearly in Fig. 5) in order that it may be moved toward and away from the presser plunger. Secured to the rear surface of the folder plate 65 and located near its end are the bearing blocks 68, to the lower ends of which are hinged with one end the connecting links 69 (see Figs. 3, 5, 39 and 40). The opposite ends of these links are hinged to one side of the toggle levers 70 and 71 which is clearly illustrated in Fig. 39. The toggle levers are pinned securely upon the shaft 72 journaled in the bearing 73, as illustrated in Fig. 3. The bearing 73 fastened to the underside of the bearing block 59 which is mounted on the pin 74 (see Figs. 3 and 5) one end of which is secured in position in the bracket 75 by the bolt 76. The shaft 72 extends beyond the rear toggle lever 71 as illustrated most clearly in Fig. 39, and upon this extension of the shaft is secured the lever 77. Fastened to the end of this lever is the adjustable push rod 78, the lower end of which engages in a countersunk seat 79 machined in the rocker arm 80 fastened on the shaft 81 mounted in suitable bearings at the lower ends of the bearing blocks 24 as shown in Figs. 39 and 40. Fastened on the forward end of the shaft 81 is the rocker arm 82 which carries the cam roller 83. This roller is in contact with a cam surface 84 cut in the under surface of the folder and guide plate adjustment bar 35. This cam surface is identical with the cam surface 34 but for their being machined in opposite directions, the purpose of which will be more fully described hereinafter. The adjustment bar 35 is hinged to the universal joint 85 suspended on the bearing pin 86 which is riveted into the compensating bar 87. This compensating bar is pivotally mounted against the underside of the bed plate 10 on the pin 88 which is driven into position (see Figs. 36, 39 and 40). The front end of the compensating bar 87 is supported by a step machined in the slide block 89 which is secured to the underside of the bed plate by the screws 90. This slide block is provided for the purpose of overcoming the weight of the adjustment bar 35 and its universal joint 85 to prevent the compensating bar 87 from sagging. The adjustment bar 35 is engaged at its lower edge by the grooved roller 91 mounted on one arm of the bell crank 92 which is pivotally supported by the bracket 93 secured to the underside of the bed plate 10, as illustrated most clearly in Figs. 3, 5, 39 and 40, and it is retained in engagement with the roller by the coil spring 94. The second arm of the bell crank 92 is hinged to the adjustable connecting rod 95, which in turn is hinged to the rocker lever 96 pivotally supported on a bearing pin fastened in one of the bearing brackets 97 (see Fig. 2) which are bolted to the side of the body casting 51. Suitably mounted between the arms of the rocker lever 96 is the cam roller 98 engaging the cam 99 mounted on the cam shaft 100 which is most clearly illustrated in Fig. 40. The downward pull of the spring 94 holding the cam and roller in contact. The cam shaft 100 is journaled in the bearing brackets 97 as illustrated in Fig. 2, and is driven at its rear end by a pair of bevel gears 101 and 102, the gear 102 transmitting the power due to its being pinned on the cam shaft 46 which is illustrated in Figs. 41 and 42.

Referring more in particular to Figs. 3, 39 and 40, it will be seen that the bearing brackets 66 which are secured to the upper extremities of the left hand side folder plate 65 are hinged to the lower ends of the toggle levers 103 and 104 which are pinned upon the shaft 105 carried in the bearing 106 integral with the top of the bracket 58. (See Fig. 3.) Integral with the top of toggle lever 103 is the arm 107 to which is hinged one end of the connecting link 108, the other or lower end of said link being hinged to the integral arm 109 of the toggle lever 70.

Located at the right of the presser plunger 57 is the right hand side folder plate 110 which is supported at its upper extremities by the bearing blocks 111 secured to it by the screws 112. These blocks 111 engage the shaft 113, upon which one end of the connecting links 114 are hingedly mounted, as illustrated in Figs. 2, 3, 39 and 40. The other ends of the connecting links 114 are hinged to the top of the toggle levers 103 and 104. Secured to the outer surface of the right hand folder plate 110 and located near its ends are the bearing blocks 115, to the lower ends of which are hinged with one end the connecting links 116. These links 116 extend backward and pass through suitable openings 117 cut in the left hand side folder plate 65 as illustrated in Figs. 3 and 5, and are hinged to upper part of the toggle lever 70. Also connected to this part of the toggle lever is the coil spring 118 (see Figs. 3, 39 and 40), which is anchored to the anchor plate 119; said plate engaging the end of the pin 74 and it is held in position against the end of the bracket 75 by the screw 120. Referring more in particular to Fig. 40, it will be readily seen that the coil spring 118 is provided to create a counter-clockwise pull on the toggle 70 which in turn transmits this pull to the toggle 103 by means of the connecting link 108. This counter-clockwise pull causes the connecting links 69 and 116, and the bearing brackets 66 and connecting links 114 to pull the side folder plates 65 and 110 toward one another, and any upward movement of the push rod 78 will cause the folder plates to move away from each other with a parallel movement.

Referring more in particular to Figs. 2, 3 and 5 it will be seen that the bearing blocks 68 and 115 located at the front end of the side folder plates 65 and 110 respectively have the forwardly extending pins 178 and 179 secured in their lower extremities. These pins extend backward through the bearing blocks and the connecting link 69 is hinged on the pin 178, and the connecting link 116 is hinged on the pin 179. Near the tops of the bearing blocks 68 and 115 are the forwardly extending pins 178a and 179a. Upon the pins 178 and 178a is slidably mounted the left hand side folder plate extension 180 which is retained in its adjusted position by the clamping screw 181; and upon the pins 179 and 179a is slidably mounted the right hand side folder plate extension 182 which is retained in its adjusted position by the clamping screw 183. These adjustable side folder plate extensions are provided to accommodate cigars of various lengths at the wrapping and banding position. The rear ends of the side folder plates are not provided with adjustable extensions because the position of this end of the cigars remains the same regardless of the length of the cigars to be wrapped and banded. The size and shape of the folder extensions 180 and 182 are identical but for their being machined left and right hand. The lower portion of the extensions are machined to form the downwardly projecting legs 184 and 185 with the slot 186 between them, which is most clearly shown in Figs. 5, 6 and 8. The rear ends of the side folder plates are also provided with the downwardly projecting legs 184a and the slots 186a, which are similar to the legs 184 and grooves 186 of the adjustable extensions. The legs 184 and 184a have beveled inner surfaces 187 and 187a respectively, which are most clearly shown in Fig. 21. Attached to the legs 185 of the extensions are the bellows fold starting wedges 188 and attached to the rear ends of the side folder plates 65 and 110 are the bellows fold starting wedges 188a, which are clearly illustrated in Figs. 5, 6, 8 and 21, and in which figures it will also be seen that the high points of the wedges 188 and 188a are in line with the sides nearest the center of the machine, of the slots 186 and 186a. The distance between these sides of the slots must be equal to the overall length of the cigar to be wrapped and banded.

The right hand side folder plate 110 is also movable in a vertical direction; the movement being provided for the purpose of raising the folder plate upward as illustrated in Figs. 34 and 35 to allow for the removal of the wrapped and banded cigar. This vertical movement is transmitted to the folder plate by means of a combination of rocker arms and connecting links which are operated by a cam mounted on a cross shaft not shown in the drawings. Referring to Figs. 1, 2, 3 and 5, it will be seen that the combination of rocker arms and connecting links comprises the link 132, the upper end of which is connected to an extension of the shaft 113 and its lower end connected to one end of the rocker arm 133 by the pin 134. The rocker arm 133 is loosely mounted on an extension of the stationary pin 125 and to the rear of the support 127 which is most clearly illustrated in Fig. 1. To the other end of the rocker arm 133, is hinged one end of the connecting link 135 (see Figs. 3 and 5) which extends downward and has its other end connected to the rocker arm 136 which is only shown in Fig. 1. One end of this rocker arm extends under the cigar hopper table 1 and carries a cam roller which rides in contact with the face of a cam mounted on the cross shaft which has already been referred to herein as not being shown in the drawings because they are located under the hopper table 1. This cam shaft is driven by a pair of bevel gears 137, one of which (partly shown in Fig. 1) is pinned on a clutch shaft which is not shown but which is carried in the bearings 138. Also secured upon this shaft is the driven side 139a of the drive clutch 139. This clutch is manually operated by the lever 139b which is mechanically connected to the clutch locking pin. The clutch is of the single revolution type, but which, by means of the lever 139b, can be made to drive continuously. The driving side of the clutch runs free on the shaft and has the driven sprocket 140 mounted on its hub. Secured on the end of the clutch shaft on the inside of the bearing flange 51a (see Fig. 1) is the driving pinion 138a, which meshes with and drives the spur gear 46a secured on the cam shaft 46 which is most clearly shown in Fig. 5. This sprocket is driven by the chain 141 which extends downward to engage a driving sprocket (not shown) mounted on the far end of the drive shaft 11 shown only in Fig. 2, said shaft being driven by the belt drive comprising the large pulley 142, the belt 143 and the small drive pulley 144 keyed on the armature shaft 145 of the electric motor 146. The motor is mounted on the adjustment plate 147 hinged on the pin 148 supported by the lugs 149 integral with the base 150, near the bottom of which is journaled the drive shaft 11. Sufficient tension is applied upon the belt 143 to prevent it from slipping by means of the adjusting screw 151 threaded into the lower extremity of the adjustment plate 147, the rounded end of the screw bearing against the rear of the base.

Mounted upon the pin 152 secured in the boss 153 integral with the top of the bearing block 59 is the rocker arm 154 as shown in Fig. 3. Integral with a rearwardly extending portion of the rocker arm, and located under the rear branch of the bifurcated lever 124 is the arm 155 to which is connected the push rod 156 which passes down through the bed plate 10 and is connected at its lower end to the rocker arm 157 which is partly shown in Fig. 5. This rocker arm carries the cam roller 158 which rides in contact with the face of the cam 159 mounted on the cam shaft 46 as illustrated in Fig. 5. The upper end of the rocker arm 154 has mounted on one of its faces the pressure shoe 160 which is retained in position by the coil spring 161 partly shown in Fig. 3. The purpose of this pressure shoe 160 is to exert a pressure upon the presser plunger retaining pin 162 which is slidably mounted in the upwardly extending bracket 58 when the rocker arm 154 is swung slightly in a clockwise direction. This pressure against the pin forces it against the slide plate 57 of the presser plunger and frictionally holds it in the position illustrated in Figs. 34 and 35 after the plunger has been raised by the bifurcated lever 124 and the slotted pusher link 123. Hinged between the branches of the bifurcated lower end of the rocker arm 154, by means of the pin 163, is the band folding finger 164 which is most clearly illustrated in Fig. 29. Pivotally connected to the rear end of the folding finger, by means of the shouldered screw 165, is the slotted band folding finger guide 166 shown only in Fig. 3, the purpose of which is to hold the front end of the finger on practically a straight line as it is moved forward by its rocker arm. Referring more in particular to Fig. 29 it will be seen that a roller 167 is also mounted on the pin 163 and is located between the sides of the folding finger. The front end of the folding finger is bifurcated and a roller 168 is suspended between the extending branches on a suitable pin which is most clearly illustrated in Figs. 21 and 29. The purpose of this roller 168 will be fully described hereinafter. Driven into the upper end of the rocker arm 154 is the anchor pin 169 to which is hooked one end of the light coil spring 170. (See Figure 3.) To the lower end of this coil spring is hooked a looped end of the fabric tape 171 which passes downward and around the roller 167, and between the side flanges of the folding finger to the under side of the presser plunger foot 57a where it passes upward and out through one branch of a Y slot where it is anchored by means of its rolled and sewed end which is clearly illustrated in Fig. 29. Also anchored in this same Y slotted hole is the rolled and sewed end of the fabric tape 172 which passes out from under the presser plunger foot in the opposite direction to that of tape 171. This tape engages the roller 173 mounted on the pin 174 carried by the block 175 fitted into the bottom edge of the right hand side folder plate 110 which is most clearly shown in Figs. 27 to 31. The upper end of this tape 172 is hooked on the end of the light coil spring 176; the other end of which is anchored to the extending arm 177 clamped around the hub of one of the connecting links 114 as shown in Figs. 2 and 3. The purpose of these fabric tapes and coil springs will be fully described hereinafter.

Slidably mounted in the guide bracket 189 bolted to the bed plate 10, and in the guide 190 integral with the bracket 75, is the left hand seam folder plate 191, which is most clearly illustrated in Figs. 1, 3, 5, 6 and 8. The front of the seam folder plate is cut away as at 192 (Figs. 6 and 21) to a sufficient depth to allow for its free forward movement past the band folding finger 164 when taking the position illustrated in Fig. 27; and the width of this opening 192 is sufficiently wide enough to allow the ungummed end of the cigar band 56 to remain in its downwardly extending position as shown. Fastened to the extended rear ends of the left hand seam folder plate 191 are the gear racks 193 (see Fig. 1) which engage a pair of gear sectors 194 pinned on the shaft 195. This shaft is mounted in the bearing 196 integral with the guide bracket 189, and a bearing integral with the bracket 75 which is not shown in the drawings. Upon an end of the shaft 195 extending beyond the bearing 196 is pinned the bellcrank 197 as shown in Figs. 1 and 3. Connected to the bellcrank 197, by means of the pin 199, is the adjustable push rod 198, the lower end of which is connected to one end of the rocker arm 200 pivotally mounted on the pin 201 which is pressed into a boss of the bracket 202 secured to the underside of the bed plate 10 as illustrated in Fig. 3. The other end of the rocker arm 200 is bifurcated as shown in Fig. 2 and carries the cam roller 203 which is held in contact with the face of the cam 204 mounted on the cam shaft 100 by means of the coil spring 205, one end of which is secured to the rocker arm 200. The bottom end of the coil spring being anchored to the anchor pin 206 driven into the front face of the body casting 51 which is shown only in Fig. 2.

The right hand wrapper seam folder comprises the two plates 207 and 207a, (see Figs. 1, 8 and 21) which are fastened to the slide members 208 and 208a (Fig. 36) by the countersunk head screws 209 as shown in Fig. 19. These sliding members are guided in grooves 210 and 210a machined in the top surfaces of the guide rails 211 and 211a respectively as illustrated in Figs. 36 and 41. The front edge of the seam folder plate 207a is cut away as at 296 which is shown in Figs. 21, 27, 28, 29 and 31. The width of this opening is sufficient to allow the gummed ends of the cigar bands 56 to remain in its downwardly extending position as shown. The rear edge of this opening is undercut to form the band folding edge 297 which, when the seam folder plate takes the position illustrated in Fig. 31, bends the gummed end of the band upward into contact with the ungummed end which has already been brought into position by the band holding finger 164. The guide rail 211a is fastened to the bed plate 10 by the screws 212 and is held in proper alignment by the key 213 as shown in Figs. 36 and 41. The guide rail 211 is adjustably mounted on the bed plate in such a manner as to allow for its being moved toward or away from the front of the machine, the purpose of which will be more fully described hereinafter. Integral with the side of the guide rail 211 is the adjustment extension 214; the bottom surface of which is flush with the surface of the bed plate 10 as illustrated in Figs. 1, 3, 4 and 36. Machined in the bottom of the extension 214 is a groove 215 which engages the guide block 216 secured to the top of the bed plate. The lengths of the groove and guide block are such as to insure a parallel movement of the guide rail 211 to the center line of the machine when the adjustment screw 217 is turned in either a clockwise or counter-clockwise direction. The threaded end of the screw 217 engages in the internally threaded boss 218 integral with the adjustment extension 214. The head of this screw is provided with a grooved collar 219 which engages the upwardly extending yoke portion of the adjustment screw retaining plate 220 which is held in position against the edge of the bed plate by the screws 221. When the guide rail 211 has been adjusted, it is retained in its adjusted position by the clamping bolt 222. The head of the clamping bolt is flat and it is countersunk in the adjustment extension as shown in Fig. 36. The shank of the bolt passes through a slot 223 cut in the bed plate 10; said shank carrying a washer 224 which is clamped against the underside of the bed plate by the nut 225 threaded on the end of the bolt.

The right hand seam folder plates 207 and 207a are given their intermittent reciprocating motion by the cam 226 mounted on the cam shaft 100 as illustrated in Figs. 4 and 36. The action of the cam 226 is transmitted to the right hand seam folder plates by means of the cam roller 227 mounted on the bearing pin 228 carried by the lever 229 pivotly mounted on the shaft 230 secured in the flanges of the bearing bracket 97. The cam roller is retained in contact with the face of the cam by the twin coil springs 231 which, at their upper ends, are hooked to the yoke 232 which is supported in a groove at the end of the stub lever 233 integral with the lever 229. The lower ends of these two springs (see Fig. 2) are anchored to the ends of the yoke 234 which is hooked under the anchor pin 235 secured in the side of the base 150. The yoke 234 is retained in position under the anchor pin by the tension of the springs. Hinged to the upper end of the lever 229 is the adjustable push rod 236; the other end of which is hinged to bifurcated portion integral with the bottom of the right hand seam folder plate reciprocator 237. This reciprocator, see Figs. 4 and 36, is adjustably secured upon the slidably mounted shaft 238 by means of a set screw which is not shown in the drawings. The upper portion of reciprocator has integral therewith the crosshead 248 in which is secured the pusher bar 249 which slidably engages the guides integral with the bottom of seam folder slide members 208 and 208a which is illustrated most clearly in Fig. 36. Integral with the sides of the reciprocator are the aligning arms 250 which carry the aligning rollers 251 in their bent back bifurcated ends. The aligning rollers have flanged sides which engage the aligning tracks 252 fastened to the top surfaces of the bearing brackets 97 as shown in Figs. 3, 4 and 36. The shaft 238 extends toward the left hand side of the machine through the bearing 239 in the wall of the body casting 51, (Fig. 4) and then passes between two of the upwardly extending branches in the slot 240 of the trifurcated cigar elevator plunger 12 to a bearing 241 in the opposite wall of the body casting as illustrated in Fig. 5. The slot 240 is provided to allow the cigar elevator plunger to move upward. Mounted on the left hand end of the sliding shaft 238 is the pressure bar support 242 which is shown in Figs. 1 and 3; the actual connection between the support and the shaft not being shown in the drawings. Driven in the overhanging boss of the support is the pin 243 upon which is pivotly mounted the pressure bar 244; said bar being retained in position on the pin 243 by the stop 245 which extends under the bar to a point directly under the adjustment screw 246. The length of this pressure bar is such that it passes through suitable apertures 247 and 247a cut in the side folder plate 65 and 110 respectively as shown in Figs. 6, 8 and 21, and also passes between the legs of the presser plunger 12 as illustrated in Fig. 5. The purpose of this pressure bar is to hold the completely wrapped and banded cigar in position when it is being removed from the wrapping and banding position as illustrated in Figs. 34 and 35, and the adjustment screw 246 is provided to set the pressure end of the bar at such a height above the right hand seam folder plates 207 and 207a to exert just enough pressure upon the cigars being wrapped and banded to prevent their slipping when being removed.

The foregoing describes the mechanical parts required to fold the wrapper and band around a cigar, and now I will describe the parts provided for the purpose of folding down the ends 55F of the wrapper which extend beyond the ends of the cigar as illustrated in Figs. 30, 32 and 33. There is provided for this purpose, two pairs of jaws which I prefer to call the wrapper end folding jaws. Each pair of jaws comprises the upper jaw 253 and the lower jaw 254. One pair of jaws is supported on the slide member 208 and the other pair is supported on the slide member 208a as illustrated in Fig. 36 by means of the jaw pivot plates 255 which are secured to pads 256 integral with the sides of the slide members by the screws 257. With the wrapper end folding jaws supported in this manner, their forward and backward movements are identical with the right hand seam folder plates 207 and 207a; the purpose of which will be fully described hereinafter. Both pairs of the wrapper end folding jaws are identical in shape but for the necessity of making their folding or front ends of right and left hand construction, the purpose of which will be fully described hereinafter, and due to this similarity I will describe the construction and operation of the jaws in singular form for one pair of jaws instead of in the plural for both pairs. The upper jaw 253 has the pin 258 driven in its end which engages in a suitable bearing of the jaw pivot plate 253 as illustrated most clearly in Figs. 3, 22 and 30. The lower jaw 254 is pivotly mounted on the eccentric bearing pin 259 (see Figs. 22, 23, 24 and 26). This eccentric pin is mounted in a shouldered bushing 260 having a hub pressed into the pivot plate 255, as shown in Fig. 26. The interior of the bushing is machined out to form a housing for the coil spring 261 which is slipped over the pin. One end of the spring presses against the end of the bushing and its other end presses against the flange 262 of the pin which is provided for this purpose and also to provide a bearing for the pin in the spring housing. The outwardly extending end of the eccentric pin has its bearing in the end of the bushing. Secured on the end of the eccentric pin is the adjusting disc 263 which has pressed in it, the index pin 264 which is provided to engage any one of a series of blind index holes 265 machined in the face of the bushings, only one of which is shown in Fig. 26 of the drawings. The purpose of these holes 265 is to retain both the upper and lower folding jaws in their adjusted position. To adjust the jaws, the disc 263 is pulled outward against the pressure of the coil spring 261 until the index pin 264 is clear of the index hole 265 with which it was engaging, and then turning the disc in a predetermined direction until the index pin reaches the desired position. The pull on the disk is then released and the expansion of the coil spring will cause the index pin to engage the index hole opposite this position. When pulling the disc 263 outward, the eccentric end 266 of the pin 259 slides in its bearing in the jaw 254, but it cannot be pulled out far enough to allow the jaw to drop away, this being prevented by allowing just enough clearance between the coils of the spring so that when it is completely compressed it will just allow the index pin to clear the tops of the index holes. The two extreme settings of the eccentric pin 259 are illustrated in Figs. 23 and 24, the former representing the setting for the smallest cigar $X^a$ to be wrapped and banded and the latter represents the setting for the largest cigar $X^b$, the bottom surfaces of each cigar being in the same plane which is due to fixed upward movement of the cigar elevator plunger 12. By referring again to Figs. 23 and 24, it will be readily seen that the point of contact between the biting edges 267 of the jaws is substantially on the center line of the cigars, which is very important to perfectly form the bellows fold of the wrapper at the ends of the cigars as illustrated in Figs. 30, 32 and 33. Although the two end folding jaws are mounted on separate pivots, they are held in alignment with one another as shown in Figs. 3, 23 and 24 by the heel 268 of the lower jaw which contacts with the bottom edge of the upper jaw and the top of the floating jaw separator 269 which is slidably supported on the push rod 270 by the screws 271 which engage in the slots 272 machined in the floating jaw separator which is clearly shown in Fig. 25. When the jaws take the position shown in the above mentioned figures, the top of the jaw separator, which is machined to be at right angles to the edge of the push rod 270 has been tilted to an angle equal to that of the push rod. This tilting of the top of the jaw separator forces the jaws apart slightly, causing their biting edges 267 to release their grip upon the bellows folded ends 55F of the wrapper to allow the advancing mechanism A to advance the last wrapped and banded cigar from the position shown in Fig. 35 without disturbing or damaging the said bellows folded ends of the wrapper. When the end folding jaws are in the closed position shown in Figs. 32 and 34, the top of the jaw separator does not affect the position of the jaws and allow their biting edges 267 to squeeze the bellows folded ends 55F of the wrapper as shown in Fig. 33. The push rod 270 is connected to the upper end folding jaw by the pin 273 carried in the end of the bracket 274 secured to the outside face of the jaw by means of the screws 275. Located near the front end of the upper end folding jaw, and integral with it, is the downwardly extending blade 276 which bends the bellows folded ends 55F of the wrapper downward against the face of the folding blade 277 integral with the front end of the lower end folding jaw 254 as illustrated in Figs. 32 and 33. As already mentioned in the first part of this paragraph, the folding or front ends of both pairs of jaws comprising the blades 276 and 277, and their biting edges 267 are machined right and left hand. This difference of the front ends of both pairs of jaws is in the form of an offset toward the center of the machine which is only shown in Fig. 1. This offset of the jaws brings the folding blades 276 and 277, and their biting edges 267 inside of the cigar aligning rails 278 as shown in Figs. 25 and 26; which, with the bellows folded ends 55F of the wrapper folded down as illustrated in Figs. 32 and 33, allows the wrapped and banded cigar to be advanced by the advancing mechanism A with the folded ends 55F of the wrapper held in their downwardly bent position against the inside faces of the cigar guide rails as shown in Figs. 36 and 37. One of the cigar aligning rails 278 is rigidly supported on the outside surface of the adjustable guide rail 211 by means of the screws 279, the heads of which engage the downwardly extending legs 280 of the cigar aligning rail, and the second cigar aligning rail is rigidly supported on the fixed guide rail 211a in a similar manner. Referring to Figs. 1 and 4 in particular, it will be seen that the cigar aligning rails 278 have integral with their lower right hand ends the tuckers 281 which bend the folded wrapper end flaps 55F under the ends of the cigar in preparation for the advancing of the cigar to the heat sealing mechanism S as illustrated in Fig. 38. Again referring to Fig. 4, and particularly to the wrapper end folding jaw push rods 270, it will be seen that their lower ends have floating bearings in the form of the slots 282 which engage the rod 283 supported in the ends of the rocker arm 284 and the lever 285 which are pinned on the shaft 286 supported in bearings 287 integral with the body casting 51; only one of said bearings being shown in the figure referred to. The rocker arm 284 has the bifurcated end 284a in which the cam roller 288 is mounted on the pin 289. This cam roller is held in contact with the face of the cam 290, on the cam shaft 100, by the coil spring 291, the upper end of which is hooked over the rod 283 and its lower end, which is not shown in the drawings is anchored to an anchor pin driven in the body casting 51. Referring again to the lower ends of the push rods 270, it will be noted that they have secured to them the small coil springs 292 which are hooked over the pins 293; only one of said springs being shown in the drawings. The lower end of the springs are anchored to the rod 283. When the wrapper end folding jaws are opened up as illustrated in Fig. 22, the rod 283 first moves upward until it contacts with the top of the slot 282, the initial tension on small coil springs holding the push rods 270 in their original positions during this movement. When rod 283 moves the push rods upward, the folding jaws take the position illustrated in Fig. 22, the lower jaws being prevented from going below the right hand seam folder plates 207 and 207a by means of the tip 294 of the jaws entering the grooves 295 cut in the extending ends of the folder plates as illustrated in Figs. 21 and 22. The small coil springs 292 bring the jaws into their closed position, shown in Figs. 3, 23 and 24. When the cam 290 causes the push rods 270 to move down, they maintain this position against the increased pull of the springs as the rod 283 moves downward in the slots 282 which is due to the balanced pressures of the jaws upon one another at the points of contact at the heel 268 and the top floating jaw separator 269. The slots 282 in the lower ends of the push rods and the springs 292 automatically compensate for any change in the setting of the wrapper and folding jaws as illustrated in Figs. 23 and 24. With the jaws in the position shown in Fig. 23, the rod 283 would take a position higher than that shown in Fig. 4, and with the jaws in the position shown in Fig. 24, the rod 283 would be lower in the slot; Fig. 4 illustrating the position of the rod 283 in the slot when the wrapper end folding jaws are set for the wrapping of the average size cigar.

Referring to Figs. 43 to 47 inclusive of the drawings, which illustrate a modified form of the method of raising the cigars X upward into the wrapping and banding position as already described herein,—the object of this modification is to assist the cigar elevator plunger 12 in neutralizing the difference of friction at both sides of the cigar when starting to raise it as illustrated in Fig. 44 and thereby entirely eliminate any tendency of the cigar to tilt during this part of the operation. To accomplish this object I have provided the finger 739, which when brought into its functioning position, bears lightly upon the top of the cigars as illustrated in Fig. 43. This finger is hinged to the lugs 740 integral with the top of the sliding block 741 by means of the pintle 742. Also located on the pintle and between the butts 743, which form the bearing for the finger, is the light coil spring 744. One end of this spring is anchored against the top surface of the sliding block 741 and its other end presses against the top surface of the finger. The block 741 is slidably mounted in the guide groove 745 machined in the bottom of the guide bracket 211 and it is retained in the groove by the plate 746 fastened to the bottom of the guide bracket by screws not shown in the drawings. Integral with the bottom of the sliding block 741 and extending downward through a suitable aperture 747 machined in the bed plate 10 and the plate 746 are the lugs 748; only one of which is shown because the drawings are in section. Connected between the ends of these lugs 748 on the pin 749 is one end of the link 750. The other end of this link is connected to the upper end of the rocker arm 751 by the pin 752. The rocker arm is pivotly mounted on the pin 753 carried in the ends of the bearing bracket 754 which is held in position on the side wall of the body casting 51 by cap screws 755. The lower end of the rocker arm 751 is bent backward and slightly upward, and passes through an aperture in the wall of the body casting as illustrated in Fig. 43. This end of the rocker arm carries the cam roller 756 which rides in contact with the face of the cam 757 mounted on the cam shaft 100. The cam 757 which revolves in the direction of the arrow, moves the sliding block and the finger back into the position illustrated in Figs. 45 and 46, and the pull of the coil spring 758 integral with the rocker arm 751 moves the block and finger forward when the roller 756 rides on the low part of the cam 757 as illustrated in Fig. 43. The lower end of the coil spring 758, which is not shown in the drawings, is anchored to a pin driven in the wall of the body casting 51. The forward end of the finger 739 passes through an aperture 760 cut in the upper end of the stop and guide plate 13 when it is reciprocated as shown in the various figures illustrating this modification.

Referring to Fig. 46, which illustrates the finger 739 in a raised position just prior to its being moved forward to take the position illustrated in Fig. 47, it will be seen that the finger has been swung upward by the plunger 761 which is slidably mounted in the bushing 762 driven in the bed plate 10. The plate 746 is provided with an aperture 763, through which the plunger passes, and cut in the front end of the sliding block 741 is the clearance slot 764 which is provided to allow the block to move forward without jamming against the plunger. The bottom of the plunger is connected to the upper end of the push rod 765 by the pin 766 and the lower end of the push rod is connected to the lever 767 by the pin 768. The lever 767 is pinned on the shaft 286 which also has pinned on it the rocker arm 284. This rocker arm 284, as already referred to herein, is actuated by the cam 290. The operation of the finger and its cooperating mechanism is as follows: Referring to Fig. 43, the cigar elevator plunger 12 is ready to start its upward movement and the plunger 762 is in its lowermost position thereby allowing the finger 739 to press upon the top of the cigar X. As the elevator starts its upward movement as illustrated in Fig. 44, the plunger 762 remains in its lowered position and the finger 739 continues to press upon the cigars holding it firmly and squarely in position on the elevator plunger against the uneven friction at the sides of the cigar; it being readily seen and understood that the friction created between the side of the cigar and the smooth face of the stop and guide plate 13 will be greatly less than that created by the contacting sides of the cigar on the elevator and the one next in line. As the cigar elevator plunger continues to move upward, and just as it has reached the position illustrated in Fig. 45, the sliding block 741 is quickly moved backward by its cam 757. This action of the sliding block causes the finger to slip off the cigar and withdraws it from the aperture 760, allowing it to swing downward until it rests upon the top of the plunger. Just after the finger 739 has been pulled back clear of the cigar, the stop and guide plate 13 and the guide plate 14 move away from the raised cigar leaving it perfectly centered on the elevator plunger 12 which is also illustrated in Fig. 45. After the elevator plunger has delivered the cigar to the wrapping and banding mechanism as already described herein, and it starts its downward movement as illustrated in Fig. 46, the plunger 761 is moved upward by its cam 290 which raises the finger upward while the sliding block 764 remains stationary. Just after the elevator plunger goes below the position illustrated in Fig. 46, the cam 757 starts to move the sliding block forward while the plunger remains in its raised position. The forward movement of the sliding block raises the free end of the finger to a greater height as it passes through the aperture 760 which is obtained by the shortening of the distance between the centers of the plunger and the pintle 742 upon which the finger swings as illustrated in Fig. 47. Shortly after the sliding block has reached the position illustrated in Fig. 47, the first cigar X has been moved halfway into position upon the elevator as shown, and the stop and guide plate 13 has been moved slightly toward the elevator to arrest the forward movement of the cigars. As the first cigar contacts with the stop and guide as shown in Fig. 43, the plunger is lowered and the finger is again brought into contact, the cigar thereby completing its cycle.

*Cigar band magazine "B"*

The cigar band magazine "B" comprises two vertically disposed upright end guide brackets 298 and 299 which are slidably mounted at their lowermost ends in the guide groove 300 machined in the top surface of the body casting 51, and they are retained in the groove by the retaining plates 301 secured to the body casting and having sufficient width to overlap the bases 302 and 303 which form the lower ends of the upright end guide brackets 298 and 299 respectively as illustrated most clearly in Figs. 5, 6 and 8. The upright end guide brackets are adjustable toward and away from each other by means of the adjustment screw 304, having right and left hand threaded portions which engage the tapped holes 305 located at the point of integration between the bases of the guide brackets 298 and 299, and their spurs 306 and 307 respectively which is best illustrated in Figs. 39 and 40. The purpose of these spurs will be fully described hereinafter. Located near the left hand end of the adjustment screw 304 (see Fig. 39), and pinned in position, is the grooved collar 308 which engages in a bearing slot 309 machined in the plate 310 secured to the outside edge of the body casting 51 as shown in Fig. 3.. Screwed on the end of the adjustment screw and retained in position by the check nut 311 is the knurled adjustment wheel 312. Secured in the base portion 303 of the upright end guide bracket 299 is the push rod 313 which is bent downward and under the bed plate 10 where it is hinged to the compensating bar 87 as shown most clearly in Figs. 39 and 40. Each of the upright end guide brackets 298 and 299 carry a pair of pivoted side guide bars 314 and 315 respectively, which are supported at their bases in suitable bearings machined in the shoulder portions 298a and 299a and which are supported at their upper ends in suitable bearings in the bearing plates 316 and 317 secured to the tops of the cigar band end guides 298b and 299b respectively which are integral with shoulder portions 298a and 299a of the guide brackets. The pivoted side guide bars 314 and 315 are adjustable, each pair of bars being provided with a right and left hand threaded screw 318. These screws engage the swivel bushings 319 which are supported in the bifurcated bushing supports 314a and 315a which are located at the lower supports of the side guide bars and which is most clearly shown in Figs. 39 and 40. The right and left hand screws 318 have the knurled thumb wheels 320 secured on them in such a position that they are centered between the inside edges of the swivel bushings, and they are retained in this centered position when rotated by engagement with the bifurcated heads of the pins 321; the shanks of which are driven into the shoulder portions 298a and 299a as illustrated in Figs. 13 and 39. Screwed on the rearward extensions of the right and left hand screws 318 are the knurled check nuts 322 which, when jammed against the outside faces of the rear swivel bushings 319, (see Figs. 9 and 39) prevent the screws 318 from being turned accidentally. The cigar bands 56 are supported by the supporting pins 323 driven into the cigar band end guides near their lower extremities which is most clearly shown in Figs. 14 and 40.

When the upright cigar band end guides are adjusted to accommodate the length of the bands necessary for banding, the movement of the cigar band end guide bracket 299, either toward the right or left, referring to Figs. 39 and 40, will swing the compensating lever 87 because of their being connected by the push rod 313. This movement of the compensating lever automatically adjusts the guide plates 13 and 14; and the left and right hand side folder plates 65 and 110 respectively; said adjustment being accomplished in the following manner. Let us consider the band magazine being adjusted for bands long enough to band the larger size cigar $X^b$ illustrated in Fig. 24. This means that the cigar band end guides will have to be moved further apart than the position illustrated in Fig. 39, and when they are moved, the cigar band end guide bracket 299 will swing the compensating bar 87 in a clockwise direction. This movement of the compensating bar will move the side folder and guide plate adjustment bar 35 toward the left, (referring to Fig. 40) which will cause the roller 33 to ride upward on the cam surface 34. This change in position of the roller 33 will swing the toggle lever 21 in a counter-clockwise direction, which, by means of the connecting links 16 and 25, will spread the guide plates 13 and 14 further apart. The movement of the adjustment bar 35 will also cause the roller 83 to ride downward on the cam surface 84 which will swing the rocker arm 82, shaft 81 and rocker arm 80 in a counter-clockwise direction, pushing the rod 78 upward. This movement will swing the lever 77, shaft 72, toggle 70, and lever 109 in a clockwise direction, which by means of the connecting links 69, 116, 108, the lever 107, shaft 105, toggles 103, 104, and the connecting links 114 will spread the left and right hand side folder plates 65 and 110 further apart. With the guide and side folder plates adjusted, the distance between the guide plates will be slightly less than the width of the cigars $X^b$ to allow for a variation in their widths, and the distance between the side folding plates will be approximately one eighth of an inch greater than the normal width of the cigars. The purpose of this difference in spacing between the guide plates and the side folder plates is to exert a slight pressure upon the cigar to center it when it is being raised upward toward the wrapping and banding position by the elevator plunger 12, as shown in Fig. 12, and then when the cigar is brought up into position between the side folder plates with the wrapper and band folded around three of its sides, the side folder plates then move toward one another to exert a slight pressure upon the cigar to retain it in position just before the elevator plunger 12 starts to move downward from the position illustrated in Fig. 20. In other words, the pressing action of the guides takes place when the side folder plates are spread apart, and when the side folder plates are exerting their pressure upon the cigar, the guide plates are spread apart approximately one eighth of an inch greater than normal width of the cigars to allow for any variation in their widths to prevent their tobacco wrapper from being broken when they are starting to be raised by the elevator 12 as illustrated in Figs. 30 and 35. The alternating spreading and drawing together of the guide plates and side folder plates is accomplished by the raising or lowering of the grooved roller 91 by the cam 99 which is illustrated in Fig. 40 in the lowered position with the guide plates 13 and 14 brought toward each other and the side folder plates 65 and 110 spread apart.

Located between the cigar band end guide brackets, and movable in a vertical direction, is the band stripper 324 which is secured to vertical reciprocator plate 325 by the screws 326 (see Figs. 5 and 13). The reciprocator plate 325 is retained in its slidable position against machined surfaces of the rear wall of the body casting 51 by the shouldered screws 327, only one of which is shown in Figs. 5 and 13. These screws are threaded into the rear wall of the body casting 51 and their shoulder portions 328 engage in the guide slots 329 cut in the reciprocator plate. Secured to the rear surface of the reciprocator plate, and extending through an aperture 330 located in the rear wall of the body casting 51, is the hinge 331, the threaded shank of which is engaged by the nut 332. Connected to the hinge 331 is the adjustable push rod 333, the lower end of which is connected to the rocker arm 334 which is partly shown in Fig. 5. This rocker arm carries the cam roller 335 which contacts with the face of the cam 336 mounted on the cam shaft 46. The band stripper 324 is provided with a main air suction hole 337, (see Fig. 13 in particular) from the horizontal upper end of which branch three vertical suction holes 337a. Screwed into the lower end of the band stripper is the nipple 338, which extends downward and is bent toward the front of the machine, passing through the aperture 330 in the rear wall of the body casting 51 as shown most clearly in Fig. 5. To this lower end of the nipple is secured the flexible rubber tube 339 which is connected to the air suction regulating valve 340 fastened in position on the outside of the base 150 as shown in Figs. 2, 41 and 42; the rubber tube passing out through an aperture in the side of the body casting to reach the regulating valve. The pipe 341 (Fig. 2) connects the regulating valve with the intake valve of a rotary exhaust pump not shown in the drawings but located inside of the base and having its rotor member secured on the shaft 11. The regulating valve 340 is fitted with a sliding valve stem 342 which has the coil spring 343 hooked on its lower end as shown only in Figs. 41 and 42, the spring being anchored to the pin 344 driven in the side of the base 150. Connected to the top of the sliding valve stem is the adjustable connecting rod 345, the upper end of which is connected to the rocker arm 346 pivotally mounted on the pin 347 screwed into a boss of the bearing flange 51b of the body casting 51. The rocker arm 346 carries the cam roller 348 which contacts with the face of the valve cam 349 mounted on the cam shaft 46 and it is retained in position by the collar 350.

The purpose of this air suction in the band stripper is to separate the bottom band from the stack and hold it in perfect alignment until it is to be transferred to have its gummed end moistened. To assist in the separating of the bottom band from the stack, and to prevent the lowermost bands from bending downward at their centers, I have provided the weighted swinging support 351 which is adjustably supported on the pivot 352 as shown in Figs. 5 and 9. Secured to the bottom of the swinging support is the thin finger 353 which projects slightly under the center of the bottom of the band stack to support it. The adjustable pivot 352 is supported in the slotted end of the arm 354 which is secured to one of the bearing brackets of the wrapper feed W as illustrated in Fig. 9.

Fastened to the upper left hand side of the vertical reciprocator plate 325 by means of the screws 355, is the hook 356. The upper end of this hook engages in a slot cut in the plunger 357, the shank of which is slidably mounted in the cigar band guide 299b as illustrated most clearly in Fig. 13. The plunger is retained in its normal position by the coil spring 358, the upper end of which is anchored on the screw 359. To the lower end of the spring is hooked the button 360, which is pulled up against the shoulder of the plunger by the action of the spring, thereby holding the plunger in position. Located in front of the band stripper, and mounted in such a manner that it can be pivoted about its center and at the same time moved horizontally, is the band carrier 361. (See Figs. 1 and 5 to 9 inclusive.) The construction of the carrier is such as to allow the bands 56 and wrappers 55 to pass beneath it when they are carried forward by the wrapper and band carrier mechanism C toward the wrapping and banding position as shown in Fig. 8. The band carrier 361 is integral with the rod 362, one end of which is pivotally mounted on the hollow shaft 363 carried in the bearing block 364 fastened to the top of the bed plate 10 as shown in Fig. 9.

Secured on the end of the hollow shaft is the air suction connection box 365 which has attached to it one end of the flexible rubber tube 366, the other end of which connects to the air suction regulating valve 340, this connection not being shown in the drawings. The hollow shaft is plugged at the air suction connection box end and it extends into the rod 362 to connect with a series of cross-drilled and properly plugged holes which form the air suction passage 367 of the band carrier as shown in Figs. 5 and 9. The face of the band carrier is fitted with a plate 368 having a plurality of small holes which register with the air suction passage 367. The suction created at these holes picks the band off the band stripper 324 when the vacuum built up by the suction in the holes 337a of the stripper is broken by the regulating valve 340; said transfer of the band is about to take place in Fig. 7. The downward swinging motion of the band carrier, as illustrated in Figs. 6 and 8, is imparted to it by a cam not shown in the drawings, but which is mounted on the cam shaft 46 of Fig. 5, it not being possible to show said cam due to the line on which this section of the machine was taken. The cam actuates a rocker arm, which is also not shown in the drawings, but which is connected to the lower end of the push rod 369 connected to the arm 370 integral with the rod 362 as shown in Fig. 9. The connections of the push rod 369 at both its ends are accomplished by means of universal joints to allow for a horizontal sliding movement which is imparted to the band carrier by the following mechanical parts. The right hand end of the rod 362, referring to Fig. 13, is pivotally mounted on the push rod 371 which is slidably mounted in the bearing 372 integral with the bracket 75. This push rod is hinged to the connecting rod 373 which is connected to the rocker arm 374, having one of its ends extending under the cigar hopper table 1, as shown only on left side of Fig. 1. This end of the rocker arm does not show in the drawings, but it carries a cam roller which contacts with a cam mounted on a cross shaft which has already been referred to herein as not being shown in the drawings, because of its being located under the cigar hopper table. The rocking action of the rocker arm 374, through its connecting rod 373, push rod 371 and the rod 362 causes the band carrier to be moved horizontally. This action is provided to bring the gummed end of the band 56 under the button 360 which supports the plunger 357 as clearly illustrated in Figs. 15, 16 and 17; the purpose of which will be fully described hereinafter.

*Moistening mechanism "M"*

The moistening mechanism comprises mainly the water pot 375 and the moistening tape 376, the center line of which is directly on the center line of the band magazine as illustrated in Fig. 9. The water pot is supported by the pin 377 and prevented from slipping by the clamping bolt 378 (see Fig. 13). The pin 377 is driven in the downwardly extending bracket 379 which is integral with the support 380 for the cigar advancing mechanism A. To hold the water pot in alignment before the clamping bolt 378 is tightened up, I have provided the lug 381 which engages the pin 382.

Referring to Figs. 13 to 18 inclusive, it will be seen that the moistening tape is endless and is threaded around a series of rollers 383, 384 and 385, and around the moistener lever 386 which is pinned on the shaft 387 supported between the flanges 388 integral with the cigar band guide bracket 299. The lever 386 extends through an opening in the guide bracket and its rounded end extends through the slot of the plunger 357. Extending downward at the bottom of the lever, and integral with its sides are the bearing flanges 389 which are spaced far enough apart to allow the tape 376 to pass between them, thereby acting as guides in cooperation with the flanges 390 at the top of the lever to prevent the tape from slipping out of place. The bearing flanges 389 engage the knuckle joint 391 screwed on the upper end of the push rod 392, the lower end of which is tapered and centered in a seat machined in one end of the lever 393 shown partly in full and partly in section in Fig. 13. The end of lever 393 that is broken away is pinned on the shaft 394 shown only in Fig. 5, said shaft being supported in bearings 395, which are integral with the bottom of the wrapper feed support bracket 396 and are also shown in Figs. 41 and 42. Also pinned on this shaft 394, (see Figs. 2 and 5) is the lever 397 which carries the cam roller 398 which contacts with the face of the cam 399 mounted on the cam shaft 46. The cam roller 398 is held in contact with the cam 399 by the coil spring 400 which is hooked to an upwardly extending arm of the lever 393 and anchored to the pin 401 driven in the side of the wrapper feed support bracket 396, which is shown only in Fig. 2. The tapered end of the push rod 392 is retained in its seat in the end of the lever 393 by the coil spring 402 which exerts a clockwise pull upon the lever 403 which is secured upon the extended end of the pin 387 as illustrated in Fig. 9. The purpose of the lever 386 and its cooperating cam 399 is to bring the moistening tape 376 into contact with the gummed surface of the band as illustrated in Fig. 16. Referring again to Figs. 13, 14, 15 and 17, and more in particular to Fig. 13, it will be seen that the roller 383 is flanged to prevent the tape 376 from getting out of alignment, and that the roller is submerged in water and supported on the end of the lever 404 by the pin 405. The lever 404 is pivotally mounted on pin 406, fitted in suitable watertight bearings located in the walls of the water pot 375, and the lever is retained in position on the shaft by a coil spring 407, which is slipped over the pin 406 which presses against the face of the lever and one of the pin bearings as illustrated in Fig. 9. Pressing the lever 404 downward is the spring 408, the coils of which are supported on the hub of the lever. One end of the spring hooks over the lever and its other end is anchored under the pin 409 driven in the rear wall of the water pot. The purpose of this spring is to hold the tape under tension at all times and to cause the intermittent creeping action of the tape which will be fully explained hereinafter. Integral with the lever 404 at its hub is the arm 410, which is provided as a means for raising the roller 383 to facilitate the removal of a damaged tape or the threading of a new one. The tape in passing upward toward the left, is guided by a right angle hook 411, which is held in its adjusted position against the machined face of the advancing mechanism support 380 by the screw 412. The tape passes upward from the hook 411 and between the roller 384 mounted on the pin 413 and the pressure roller 414 carried by the bell-crank 415 pivotally mounted on the pin 416 driven into the advancing mechanism support. Hooked on the outwardly extending arm of the bell-crank is the coil spring 417 which is anchored on the pin 418. The purpose of the squeezing action between the rollers 384 and 414 is to remove any excess of water in the tape that passes the hook 411 and to hold the tape fast at this point when its actual creeping action takes place. From between the rollers 384 and 414, the tape passes between the block 419, having a shank driven into the face of the advancing mechanism support and the gripper jaw 420. The gripper jaw is pivotally mounted on the pin 421, and has the depending arm 422 into which is driven the pin 423 over which is hooked one end of the coil spring 424. The other end of this coil spring is anchored to the pin 425 which is carried by the tape take-up and gripper jaw actuating plate 426 which is also mounted on the pin 421, but in back of the gripper jaw. The take-up and gripper jaw actuating plate 426 is moved upward by the push rod 427 which is connected to the plate by the pin 428. Upon this pin is also mounted the roller 429 which engages the tape and pushes it upward when the gripper jaw closes as illustrated in Figs. 15 and 17. The lower end of the push rod 427 is connected to the lever 430 secured to the hub of rocker arm 431 which is pivotally mounted on an extended portion of the pin 377 to the rear of the bracket 379 as illustrated in Figs. 13 and 36. The rocker arm 431 carries in its bifurcated end the cam roller 432 which engages the face of the cam 433 mounted on the cam shaft 100 as shown most clearly in Fig. 36. Connected to the rocker arm 431, to insure the contact between the cam roller 432 and cam 433, is the coil spring 434 which is shown in Figs. 2 and 4. The lower end of this spring is anchored to the flat steel bracket 435 secured to the end of one of the bearing brackets 97 by means of screws as shown in Fig. 2. The cam and its rocker arm 431 also reciprocate the advancing mechanism A which will be fully described hereinafter. The take-up and gripper jaw actuating plate 426 also carries the pin 436 which engages in the slot 437 cut in depending flange 438 of the gripper jaw 420. This pin and slot provide a means for pulling the gripper jaw downward away from the block 419 against the pull of the coil spring 424 as shown in Fig. 13, and also provides for a continued upward movement of the plate 426 after the gripper jaw has closed as illustrated in Figs. 15 and 17.

*Wrapper feed "W"*

The wrapper feed mechanism is located directly behind the band magazine B and on a direct center line with the wrapping and banding mechanism F and comprises the following mechanical parts. Referring to Figs. 1, 2, 5, 6, 7 and 8, it will be seen that the wrapper feed support 396 is secured to the rear of the body casting 51. Slidably mounted on the support 396, and properly guided to retain it in alignment, is the feed roller bed plate 439, which is securely held in its adjusted position by the clamping bolt 440. This bolt has a flat head which is countersunk in the top of the bed plate as shown most clearly in Fig. 5, and it is prevented from turning by the pin 441 pressed in its head which engages a suitable hole drilled in the plate for this purpose. The shank of the bolt extends downward through a slot 442 machined in the support 396 which allows for a forward or backward adjustment of the bed plate. Slipped over the shank of the bolt is the collar 443 which is forced upward against the machined surface surrounding the slot 442 by the nut 444 to prevent slipping of the bed plate. Supported on its spindle 445 in suitable bearings 446 integral with the rear end of the bed plate 439 is the wooden roller 447, to the ends of which are fastened metallic flanges. These flanges act as guides for the roll of wrapper strip 55S as shown in Fig. 5. The bearings 446 are slotted at their tops to allow the roller 447 to be easily replaced by another roller of similar construction but of different length between its flanges. This change is only made however when a wrapper of wider or narrower width is required, and then a roller having a distance between its flanges of slightly greater width than the wrapper strip is selected to take its place. The roll of wrapper strip 55S also rests upon a rubber covered roller 448 which is divided into two sections which are shown only in Figs. 1 and 9. These rubber sections are secured on the arbor 449 which is rotatably mounted on the eccentric spindle 450 which is supported in the bearings 451 and 452 integral with the front end of the feed roller bed plate 439. The rubber covered roller 448 runs in contact with the metal roller 453, both of which are of the same diameter. The roller 453 is fastened on the shaft 455. This shaft runs in bearings integral with the sides of the feed roller bed plate 439 and the metal roller 453 rotates in a cavity in the bed plate which is located between the bearings for the shaft 455 and the cavity 456 cast in the wrapper feed support bracket 396 as shown in Figs. 5, 6 and 8. The arbor 449 and shaft 455 have securely mounted on them the gears 457, which mesh with one another and are of like pitch diameter which is also equal to the outside diameter of the rubber covered roller 448 and the metal roller 453.

Secured on the left hand end of the eccentric spindle 450, looking at Fig. 1, is the knurled knob 458, which has a cam surface 459 machined on its hub. Engaging this cam surface is the finger 460 which is integral with the trifurcated member 461 which is hinged in the bearings 462 secured to the top surface of the top wrapper guide plate 463. I might mention at this time that the wrapper strip 55S in leaving the roll goes around the wooden roller 447 and passes between the top guide plate 463 and the lower wrapper guide plate 464 where it is gripped between the rubber roller 448 and the metal roller 453. Both of the guide plates are secured to the outer edges of the feed roller bed plate 439. By turning the knurled knob in a counterclockwise direction, the eccentric spindle 450 will raise the arbor 449 and the rubber covered roller 448. This will prevent the rubber covered roller 448 and the metal roller 453 from gripping the wrapper strip to feed it forward, although both rollers would continue to rotate due to the gears 457 remaining in mesh. The continued rotation of the roller 448, however, would rotate the roll of wrapper strip and the roller 447, which would feed off the wrapper strip when not required. To prevent this, I have provided the trifurcated member 461 which will also be raised upward by the turning of the knurled knob 458, the raising of the trifurcated member being accomplished by the cam surface 459 pushing the finger 460 upward and thereby causing the branches of the trifurcated member to raise the roll of wrapper strip out of contact with the rubber covered roller.

The rollers 448 and 453 receive their rotary movement, which is intermittent, from a clutch comprising the driving member 465 and the driven member 466 as shown in Figs. 1, 2 and 9. This clutch is of the common ball and ratchet type which grips when rotated one direction only and runs free when rotated in the opposite direction.

This particular clutch grips when rotated in a counter-clockwise direction and will rotate the rollers 448 and 453, the roll of wrapper strip 55S and the wooden roller 447 in the direction of the arrows shown in Fig. 5 which will feed the wrapper strip forward. The driven member 466 of the clutch is keyed on the shaft 455 and retained in position by the nut 467 as shown in Figs. 2 and 9. This member carries the ratchet and balls which are not shown in the drawings, but which are enclosed in the gripping flange 465a of the clutch driving member 465, which is shown in Figs. 1 and 9. The driven member 466 of the clutch has a step and flange 466a which is provided to retain a brake member 468 in position. This brake is adjustable and applies friction to the step of the driven member; this friction being increased or decreased by turning the spring pressed adjustment screw 469 shown most clearly in Fig. 9. The brake has the upwardly extending arm 470 engaging the pin 471 extending outward from the bearing 452, both of which are provided to prevent the brake from rotating with the driven member 466. The sole purpose of the brake is to prevent the roll of wrapper strip and its feed rollers from overrunning at the end of the wrapper feed stroke. Secured on the driving member 465 of the clutch is the sprocket 472 which is engaged by the roller chain 473 (see Figs. 1 and 2). One end of this chain is anchored to the T-shaped arm 474 secured on top of the wrapper guide plate 462. Between this arm and the sprocket 472, the chain 473 hangs down in the form of a loop which engages the sprocket 475, and from which is pivotally suspended the weight 476. The pitch diameter of the sprocket 472 is equal to that of the sprocket 475. The other end of the chain 473 extends downward and is looped around the sprocket 477 and is anchored to the arm 478 secured to the rearwardly extending bearing flange 51b of the body casting 51. The pitch diameter of this sprocket 477 is equal to the pitch diameters of the sprockets 472 and 475, and these pitch diameters are equal to the outside diameters of the rubber covered roller 448 and the metal roller 453 and the pitch diameter of the gears 457, the purpose of which will be described hereinafter. The sprocket 477 is pivotally mounted on the pin 479 carried in the end of the lever 480 integral with the lever 481, said integral levers being pivotally mounted on the shaft 482 supported at its far end by the bearing bracket 483 fastened to the rear surface of the body casting 51 which is shown in Figs. 2, 41 and 42. Connected to the end of the lever 481 by the pin 484 is the push rod 485, the upper end of which is connected to the eccentric bearing block 486 by the bolt and nut 487. The eccentric bearing block is slidably mounted in a guide milled in the arm 488 which is pinned on the end of the cam shaft 46. The milled ends of the arm 488 are bridged by a block 489, in the center of which is rotatably mounted the eccentric bearing block adjustment screw 490 which is threaded through the center of the eccentric block and has its threaded end supported in a seat located in the rounded end of the guide milled in the arm 488. The eccentric bearing block 486 and its adjustment screw 490 is provided for the purpose of regulating the amount of wrapper strip 55S to be fed out by the rollers 448 and 453. Referring to Fig. 2, which illustrates the wrapper feed mechanism in its neutral position, it will be seen that as the arm 488 swings in a clockwise direction, it will pull the arm 481 upward and swing the arm 480 downward, which pulls the chain 473 downward with it by means of the sprocket 477. The amount of chain pulled downward by the arm 480 will be twice the length of the movement of the arm due to the end of the chain being anchored to the arm 478, and the length of chain pulled down will be equal to the length of wrapper strip fed forward by the mechanism due to the fact that all the pitch diameters of the sprockets and gears, and the outside diameters of the feed rollers are exactly alike. The purpose of the weight 476 is to return the chain taken up by the feeding operation to its normal position as shown, which is accomplished by means of the ball and ratchet clutch without disturbing the position of the rubber covered rollers. A spring could be substituted for the weight, but I prefer to use the weight because it produces an even pull in all positions.

After the wrapper strip 55S has been fed forward the required amount to produce a wrapper 55, the knife 491 (see Figs. 1, 2, 5, 6, 7, 8 and 9), is swung downward to sever the wrapper sheet from the wrapper strip as illustrated in Fig. 8. The knife is loosely mounted on the shaft 492 and is held in position against the lever 493 by a washer and nut 494 which is shown most clearly in Fig. 9. The lever 493 is pinned on the shaft 492 and carries a pin 495 engaging a slot in the knife by which any movement of the lever 493 is imparted to the knife. This method of mounting the knife provides for its being removed easily for resharpening without disturbing any of its operating parts. The cutting edge of the knife cooperates in severing the wrapper sheet 55 from the wrapper strip with the cutting edge of the shear plate 496 which is located at the forward end of the feed roller bed plate 439 and retained in position by the screws 497 as illustrated in Figs. 5 to 8 inclusive. The shaft 492 is pivotly and slidably mounted in the bearing 498 integral with the bearing 452 and the side of the feed roller bed plate 439 as shown only in Figs. 1, 2 and 9. The provision of the sliding action of the shaft 492 is to allow for the point contact shearing action between the knife and the shear plate. The length of the sliding movement of the shaft is very slight, but it is taken care of by a light coil spring 499 located on the rear end of the shaft which is shown only in Figs. 1 and 2. The lever 493 and knife 491 are swung up and down by a cam not shown in the drawings, but which is mounted on the cam shaft 46, shown in Fig. 5. This cam actuates the rocker arm 500 shown in Figs. 2 and 13 which has connected to it the adjustable push rod 501, the upper end of which is connected to the lever 493 (see Fig. 9) by means of a universal joint provided to take care of the swinging and sliding action of the shaft 492. The knife is returned to its normal raised position by the coil spring 502, shown in Fig. 2, which is hooked over a sheet metal finger secured to the top surface of the rocker arm 500, its lower end being anchored to the pin 503 driven in the bearing flange 51b of the body casting 51.

Referring to Figs. 41 and 42, which illustrate more in particular a modified form of the wrapper feed mechanism, it will be readily seen that the adjustable eccentric bearing block 486 and the milled arm 488 have been eliminated and the solid crank arm 488a has been substituted in their place, the shouldered pin 487a has taken the place of the bolt and nut 487, and that the two separate arms 480a and 481a have been substituted for the integral arms 480 and 481 respectively. The action of the crank arm 488a swings the lever 481a upward but this action does not affect the lever 480a until the space 504 between the teeth 505 and 506 cut in the hubs of the levers 480a and 481a respectively is entirely eliminated, then the lever 480a will swing downward and pull the chain 473 which is anchored at this end as already described herein. The coil spring 507 is provided to insure perfect meshing of the sprocket 477 with the chain 473. The position of the lever 480a is governed by the stop block 508 carried by the chain 473 which contacts with the stop 509 carried by the slide bar 510 mounted in the guide bracket 511 secured to the advancing mechanism support 380 by the cap screws 512. The face of the stop block 508 meets the face of the stop 509 at right angles due to my having carried the chain over the sprocket 513 mounted on the shouldered screw pin 514 supported in the end of the feed roller bed plate 439. The weight 476 serves the same purpose as that already described herein and this end of the chain 473 is anchored to the arm 474a supported on the end surface of the feed roller bed plate. The construction of all the parts supported by the feed roller bed plate pertaining to the actual feeding of the wrapper strip are identical in this modified form as those already described herein. The position of the stop 509 is determined by the setting of the guide rail 211 when it is adjusted to the length of the cigar to be wrapped. This is accomplished by the lever 515 carried on the pin 516 supported in a bearing integral with the guide bracket 511, the slide bar 510 and the connecting bar 517 which is fastened to the top of the upright 518 integral with the adjustment extension of the guide rail 211. The connecting bar 517 is slidably mounted in the bearing block 519 integral with the top of the advancing mechanism support 380. The slide bar 510 and the connecting bar 517 slide parallel to one another but in opposite directions and always of equal distance. This is due to both arms of the lever 515 being of equal length. The slide bar 510 is connected to the bottom of the lever 515 by a pin 520 which engages in the slot 521, and the connecting bar 517 is connected to the top of the lever by the pin 522 which engages in the slot 523. These slots 521 and 523 are provided to prevent the bars from binding when an adjustment is made. The length of the wrapper strip 55S fed forward by the feed rollers 448 and 453 is always equal to the length of the cigar to be wrapped plus the length required to form the bellows folded end 55F of the wrapper at each end of the cigar as illustrated in Figs. 32 and 33. Therefore, an adjustment made at the guide rail 211 calls for a corresponding readjustment of the length of the wrapper strip, and if for example the cigar to be wrapped is shorter, the difference in lengths of the cigar will equally have to be deducted from the previous length of the wrapper.

*Carrier for wrapper and band "C"*

The carrier mechanism C for the wrapper and band reciprocates longitudinally to the axis of cigars X and above them as they are fed forward from the cigar hopper feed H as illustrated most clearly in Figs. 1, 3 and 9. This wrapper and band carrier comprises in part, a gripping mechanism which is most clearly illustrated in Figs. 9 to 12 inclusive. This mechanism is supported on the underside of the carrier plate 524 which is shown most clearly in Figs. 9 and 10. This plate has the integral extended finger 525, the end of which is carried downward slightly to act as a guide for the wrapper and band when the carrier takes the position illustrated in Fig. 8. Fastened to the top surface of the carrier plate 524, and having substantially the same shape, is the carrier gripper plate 526 against the underside of which is pressed one edge of the wrapper 55 and band 56 by the gripper pads 527 carried on the ends of the balanced gripper bar 528 as shown in Fig. 10, the wrapper and band being shown in Fig. 9 in dot and dash lines. The balanced gripper bar 528 is pivotly supported in the bifurcated end of the gripper bar lever 529, which is pivotly mounted on a pin 530 driven into the bearing extension 531 integral with the carrier plate 524. The gripper bar 528 and its lever 529 are pushed downward, when released, by the coil spring 532, which is held in position in a seat 533 machined in the top surface of the gripper bar lever 529, and which presses against the underside of the carrier gripper plate 526. The balanced gripper bar 528 and its lever 529 are swung upward into the gripping position by the cam plate 534 secured to the side of and flush with the bottom face of the bolt 535, and the flat spring finger 536 secured in a notched out portion of the gripper bar lever 529 by the screws 537, which is shown most clearly in Figs. 10, 11 and 12. The bolt 535 is slidably mounted in a guide groove machined in the bottom of the carrier plate 524 and is prevented from dropping out of position by the plate 524a fastened to the bottom face of the carrier plate. Linked to the ends of the bolt 535 are the roller chains 538 and 538a. The chain 538 is anchored to the sprocket 539 by the screw 540 and the sprocket is pinned on the shaft 541 mounted in suitable bearings of the carrier support 542 which is slidably mounted on the spline 543 fastened to the front edge of the bed plate 10 as illustrated in Figs. 3, 5, 6 and 8. Located within the carrier support 542, but not shown in the drawings, is a flat spiral spring which is secured at its inner end to the shaft 541 in the usual manner in which springs of this type are secured to the shafts of spring motors. The outer end of the spiral spring is anchored to a spring barrel 544 fitted in the carrier support, the hub of which can be seen in Figs. 1, 3 and 9. This spring barrel has a notched flange, not shown in the drawings, but which is recessed in the side of the carrier support, the notches of which are engaged by the heads of screws to prevent the barrel from turning. By means of a spanner wrench, provision for the engagement of which is also provided in the flange of the barrel, the screws can be unscrewed until their heads disengage the notches. The barrel can then be turned by the spanner wrench to increase or decrease the tension of the spiral spring, and when the suitable tension is obtained, the screws are reseated to hold the barrel in position.

The chain 538a runs in mesh with the small sprocket 545, (see Figs. 5, 6, 8 and 9) which is mounted on the pin 546 carried in the bearing 547 integral with the base of the second carrier support 548. Spanning the gap between the tops of the two carrier supports 542 and 548 and secured in suitable grooves machined in their top surfaces are the two rails 549 and 550 which are shown most clearly in Figs. 3 and 9. These rails engage in suitable grooves machined in the bottom of the carrier plate 524. The plate 524a fastened to the bottom face of the carrier plate to prevent the bolt 535 from dropping out of place also engages the bottom surfaces of the rails 549 and 550 which prevents the carrier plate from being displaced. The base of the carrier support 548 is slidably mounted in a guide groove 551 as shown in Figs. 6 and 8, and the base is also notched to receive the end of the spur 306 (see Fig. 39) integral with the base of the band guide bracket 298 as shown only in the upper right hand corner of Fig. 9. Due to the engagement between the spur 306 and the notch in the base of the support 548, the complete wrapper and band carrier mechanism thus far described will be moved horizontally toward or away from the center line of the wrapping and banding position when the band magazine is adjusted by the rotation of its adjustment screw 304 as already described herein in connection with Figs. 39 and 40. Any movement of the carrier support by the band magazine is imparted to the carrier support 542 by the rails 549 and 550, the cross section of which is sufficient to provide enough strength to cause the support 542 to slide on its spline 543 without distorting the carrier mechanism. Held in position on top of the carrier support 542 by two of the screws which hold the rails 549 and 550 in position, is one end of the wrapper and band rail 552. This rail extends backward along the outside of the gripper bar lever 529 and passes between the band guide brackets 298 and 299 as shown in Figs. 5 and 9. This end of the wrapper and band rail also passes very close to the side of the band stripper 324 as shown in Figs. 14 to 18 inclusive and it is held in position by a screw engaging in the end of the stud 553 secured in the boss 554 integral with the guide bracket 298 as shown in Figs. 5, 6, 8, 9 and 39.

The wrapper and band carrier is moved into its receiving position as illustrated in Fig. 8 by the action of the cam 555 upon the bell crank 556 which are most clearly shown in Fig. 42. The cam is mounted on the cam shaft 100 (see Figs. 2 and 41) and the bell-crank is pivotly mounted on the bearing pin 557 carried in the bearing bracket 97. The upper arm of the bell-crank supports the cam roller 558 and its lower arm adjustably supports the sprocket 559. The roller chain 538b, one end of which is anchored to an anchor bolt 560 fastened in the side of the body casting 51, engages the sprocket 559 and passes through an aperture in the side of the body casting to a sprocket mounted on a shaft which parts are located within the body casting, but which are not shown in the drawings. The chain 538b engages the under side of the sprocket located within the body casting and extends upward, its end being connected to one end of a bar link, which, at its other end is connected to the lower end of the chain 538a. The bar link which is also not shown in the drawings, is provided to take care of the change in direction of the pull of the chains 538a and 538b, and to avoid any interference with several mechanical parts which are located in a direct line with the downwardly extending end of the chain 538a, the change in the direction of the pull of the chains 538a and 538b being from a pull on the chain 538b horizontal to the length of the machine to a pull on the chain 538a which operates at a right angle to the chain 538b.

As already mentioned herein, the wrapper and band carrier is moved into its receiving position illustrated in Fig. 8 by the action of the cam 555 and the bell-crank 556 and the carrier is returned to the wrapping and banding position illustrated in Fig. 6 by the spiral spring located in the barrel 544 mounted in the carrier support 542, which acts against the cam action. In general this is true, but the actual movement of the carrier is accomplished by locking mechanism illustrated in Figs. 10, 11 and 12 which engages the lock pin 561 the shank of which is driven in the bottom of the bolt 535. Figs. 11 and 12 are detail views in which the carrier plate 524, the gripper plate 526 and the plate 524a have been removed for the purpose of more clearly illustrating the locking mechanism. Fig. 11 illustrates what I call the unlocked position, with the gripper pads 527 lowered as shown in Fig. 10, and Fig. 12 illustrates the locked position with the gripper pads pressing the wrapper 55 and the band 56 upward against the gripper plate as illustrated in Fig. 6. I will now describe the action that takes place to unlock the gripping mechanism. When the wrapper and band have been carried into the approximate wrapping and banding position, the carrier mechanism is in its neutral position and remains in this position until the cigar elevator plunger 12 has raised the cigar into the position illustrated in Fig. 4. At this time, the cam 555 and the spiral spring move the carrier mechanism slightly toward the left, referring to Figs. 6 and 9, which brings the end of the carrier plate 524 sharply up against the stop 562 which is secured in position on top of the carrier support 542 by two of the screws which retain the rails 549 and 550 in position. During this movement, the end of the arm 563a of the lever 563 contacts with the downwardly projecting stop 564 which is fastened to the side of the rail 549 as shown in Fig. 9. The contact between the arm 563a and the stop 564 swings the lever 563 on its pivot pin 565 against the action of the spring 566 which engages in a groove in the side of the arm 563a and is supported in the block 567. The pivot pin 565 and the block 567 are carried by the plate 524a secured to the bottom face of the carrier plate 524. When the lever 563 swings the end of its arm 563b moves away from in front of the lock pin 561 allowing the bolt 535 to be moved quickly toward the left by the combined action of the cam 555 and the pull of the spiral spring on the chain 538. The length of this movement of the bolt 535 is limited by the cam 555, and is sufficient to cause the end of the flat spring finger 536, secured in a notched-out portion of the gripper bar lever 529, to slide down the beveled surface of the cam plate 534 which also has been moved toward the left by virtue of its being part of the bolt 535. The action between the cam plate and the spring finger allows the gripper bar lever 529 to swing downward lowering the gripper bar with it until the lip 568 of the gripper bar, which is only shown in Fig. 10, rests upon the shoulder 569 of the finger 525 of the carrier plate. The contact between the lip 568 and the shoulder 569 does not prevent the gripper bar lever 529 from swinging downward but provides a positive means to insure the top surfaces of both the gripper pads 527 being below the top surface of the finger 525 as illustrated in Fig. 10, which is very important when the carrier moves over to receive the wrapper and band, it being readily seen that should either of the pads extend above surface of the finger, the wrapper and band when sliding into position would be wrinkled and destroyed besides jamming up the machine. The amount of the downward swing of the gripper bar lever 529 is governed by the contact between the straight portion of the flat spring 536 and the top of the cam plate 534 as shown in Fig. 10.

When the downward swing of arm 563b of the lever 563 allows the bolt to move as already described herein, the lock pin 561 is withdrawn from engagement with the notch 570 of the tumbler 571, and engages the shoulder 572 of the tumbler as shown in Fig. 11. The tumbler 571 is pivoted on the pivot pin 573 and engages the pivot pin in the slot 574 which is provided to facilitate the placing of the tumbler in position. The hairpin spring 575, one end of which engages a groove in the edge of the tumbler, keeps it in position on the pivot pin and also in contact with the lock pin 561. The hairpin spring is anchored on the anchor pin 576 and is retained in position by the pin 577. The pivot pin 573, the anchor pin 576 and the retainer pin 577 are all carried by the plate 524a secured to the bottom of the carrier plate.

With the wrapper and band carrier locking mechanism in the unlocked position shown in Fig. 11, the action of the cam 555 being transmitted to the chain 538a, pulls the bolt and moves the carrier into the receiving position illustrated in Fig. 8. The moving of the carrier is accomplished by the lock pin 561 engaging the shoulder 572 of the tumbler 571. As the carrier moves toward its receiving position, the wrapper strip 55S is being fed forward as illustrated in Fig. 7; the wrapper strip passing between the guide plates 578 which are supported from the side of the band magazine guide bracket 298. At this time the band stripper plunger is lowered to the position illustrated in Figs. 15, 16 and 17 and the wrapper strip passes over it and between the guide rail 552 and guide 579 which is supported on the front of the band magazine guide bracket 298 as shown in Figs. 6 and 8. At the same time the opposite edge of the wrapper passes between the guides 580 supported on the front of the band magazine guide bracket 299 which are shown in Figs. 9, 13 to 18 inclusive. At the completion of the wrapper strip feed, the band is placed upon the top of the strip by the band carrier 361, and the wrapper and band carrier has completed its movement. This brings the side 581 of the carrier plate 524, (see Fig. 9) up against the stop plate 582 which is secured to the top of the rail 549 by the screws which hold the rail in position in its respective groove in the carrier support 548. This stop prevents any further movement of the carrier, but the cam 555 continues to create a pull on the chain 538a which is transferred to the bolt 535, forcing the lock pin 561 past the shoulder 572 (see Fig. 12) against the pressure of the hairpin spring 575. The cam 555 causes the bolt 535 to move far enough to have the lock pin engage in the notch 570 of the tumbler 571, and also allow the end of the arm 563b of lever 563 to slide up in position in front of the lockpin as illustrated in Fig. 12. The lever 563 is moved into position by its spring 566 and is prevented from moving too far by the stop pin 583 driven in the plate 524a secured to the bottom of the carrier plate. This action locks the bolt and has caused the gripper bar 528 to be raised by the cam plate 534 which was moved forward by the bolt causing the spring finger 536 to swing the gripper bar lever 529 upward. At the movement the gripper takes hold of the wrapper and band, the knife 491 is actuated and the wrapper severed from the wrapper strip and the carrier returns to the wrapping and banding position illustrated in Figs. 6 and 9.

*Advancing mechanism "A" for wrapped and banded cigars*

The advancing mechanism A as illustrated in Figs. 1 to 4, 19, 22, 30 and 34 to 37 is provided for the purpose of advancing the wrapped and banded cigars X1 in intermittent steps to the heat sealing unit S after they have been delivered to it from the wrapping and banding mechanism F as illustrated in Fig. 35. The reciprocating parts that actually do the advancing of the cigars are mounted on the support 380 (see Fig. 36, left hand upper corner) already referred to herein when I described the moistening mechanism M. Integral with the top of the support 380 are the bearings 584 and 584a in which is slidably mounted the shaft 585 (see Fig. 35). Secured on this shaft is the advancing finger support member 586, the rear end of which is bifurcated and slidably engages the rectangular guide bar 587 as illustrated in Fig. 36. The guide bar is secured by means of screws at its extremities to suitable mounting blocks 588 integral with the rear of the bearings 584 and 584a as illustrated in Fig. 13, and it is provided for the purpose of retaining the advancing finger support member in perfect alignment. Located at the front of the advancing finger support member and integral with it are the arms 589 and 590, each having a pair of bearings 589a and 590a respectively (see Fig. 35). In these bearings are mounted the two shafts 591 and 592 as shown in Fig. 36. Pinned on these shafts with one of their ends in contact with the outside of the bearings 589a are similar advancing finger members 593, as shown most clearly in Fig. 1; Figs. 3, 4, 19, 22, 30, 34 and 35 being elevations, show only one of the finger members. Also pinned on the shafts 591 and 592, and located between the bearings 589a and 590a are the advancing finger members 594 and 595 respectively. The member 595, being located between the two rear bearings 589a and 590a on the shaft 592, is only shown in Figs. 36 and 37, and cannot be seen in the above mentioned figures because it is directly behind the member 594. Located with one of their faces in contact with the outside of the bearings 590a are the similar short advancing finger members 596, which are also pinned on the shafts 591 and 592 as shown in Fig. 1. The advancing finger members 593, 594, 595 and 596 have in common the downwardly extending integral fingers 597. These fingers are all evenly spaced and the lengths of the bearings 589a and 590a are equal to the distance between the fingers to maintain this continuity which is most clearly illustrated in Fig. 4. The fingers 597 contact with the sides of the wrapped and banded cigars X1 near their ends as shown in Fig. 36, and when the advancing finger support member 586 is moved toward the right, looking at Fig. 4, each successive cigar is moved up to take the place of the preceding one and the first cigar X1 is deposited upon the heat sealing unit S by the fingers of the short advancing finger members 596 as illustrated in Fig. 22. The advancing finger support member 586 is reciprocated by the action of the cam 433 mounted on the shaft 100 which actuates the rocker arm 431 as already described herein in connection with the moistening mechanism M and which is shown in Fig. 36. Integral with the hub of the rocker arm 431 is the arm 598, the upper end of which is connected to one end of the link 599 as shown in Figs. 1 and 36; the other end of the link being connected to the lugs 600 integral with the under side of the advancing finger support member 586 which is shown only in Fig. 36.

When the advancing finger support member has completed its movement toward the right as shown in Fig. 22, it immediately starts its return stroke toward the left. During a very short portion of the return stroke, the advancing fingers 597 remain in their downwardly extending positions as shown in Figs. 4 and 36. This position of the advancing fingers is retained to break the contact between the faces of the fingers and the sides of the wrapped and banded cigars X1 before the fingers are swung upward into a horizontal position as illustrated in Figs. 30, 35 and 37. The advancing fingers are swung into this position by the action of the cam 601 shown in Fig. 36, mounted on the shaft 100. This cam rocks the rocker arm 602 which has suitably mounted on one of its ends the cam roller 603 shown in dotted lines in Fig. 36 and in full lines in Fig. 2. The other end of the rocker arm is pivotly connected to the adjustable push rod 604 by the pin 605. The cam roller 603 is held in contact with the face of the cam by the coil spring 606, one end of which is hooked over an end of the pin 605 extending outside of the rocker arm 602 as shown in Fig. 36. The lower end of the spring 606 is anchored to a pin 607 driven in the head of the cap screw 608 which is only shown in Fig. 2. The upper end of the push rod 604 is connected to the bell crank 609 which pivots on the pin 610 mounted in a suitable bearing 611 integral with the support 380 for the cigar advancing mechanism. The upper end of the bell crank 609 is in sliding contact with the angle plate 612 secured to the under side of the bar 613. The angle plate 612 is of sufficient length to remain in contact between itself and the upper end of the bell crank when the advancing finger support member 586 is reciprocated, it being readily seen that the bar 613 will move with the advancing finger support member because of its being hinged at its forward end to the lugs 614 integral with the advancing finger member 594 and its slidable connection with the plate 615 fastened to the rear of the bifurcated portion of the advancing member 594 as illustrated in Figs. 13 and 36. The bar 613 is prevented from dropping down at its rear end by resting upon a flattened surface of the rod 616 which is mounted in the bearings 617 and 618 integral with the support 380, which is also shown in Figs. 13 and 36. The short advancing finger members 596 have integral lugs which are identical in position and size with the lugs 614 of the advancing finger member 594. These lugs are connected by the link 619 which is shown most clearly in Figs. 1, 36 and 37. By means of this link 619, any movement given to the advancing finger members on the shaft 591 is imparted to the advancing finger members on the shaft 592 as shown in Fig. 37. To maintain the contact between the upper end of the bell crank 609 and the angle plate 612, I have provided the coil spring 620. One end of this spring is hooked to the pin 621 which connects the link 619 to the short advancing finger member 596 mounted on the shaft 592, and its other end is anchored to the pin 622 driven in the end of the arm 599 of the advancing finger support member 586 as shown in Figs. 1 and 3.

When the wrapped and banded cigars X1 are advanced by the advancing mechanism, they slide upon the plates 623 and 623a which are secured to the top surfaces of the guide rails 211 and 211a as shown in Figs. 19, 36 and 37 respectively.

These plates also retain the slide members 208 and 208a in position in their respective grooves 210 and 210a. To hold the wrapped and banded cigars in position on the plates 623 and 623a after the advancing fingers 597 have been swung upward for their return stroke as illustrated in Figs. 30, 35 and 37, I have provided the floating presser bar 624 which rests upon the banded portion of the cigars. The weight of this bar also prevents the ends of the band from separating while the gum is still in a moist condition. Attached to the top surface of the presser bar 624 and near its ends are the angle brackets 625 and 625a. The upwardly extending portions of these brackets are slotted and engage the shoulders of the pins 626 (see Fig. 36), which allows the bar 624 to float up and down to take care of any variation in the heights of the cigars without subjecting them to any undue pressure outside of its own weight which would injure the cigar, its wrapper or its band. The pin 626 that engages in the slot of the angle bracket 625 is carried in the depending end of the inverted V-shaped lever 627 which is pinned on the rod 616 and in contact with the outside of the bearing 617 integral with the support 380 as shown in Fig. 13. The pin 626 that engages in the slot of the angle bracket 625a is carried in the depending end of inverted V-shaped lever 628. This lever is also pinned on the rod 616 and in contact with the outside of the bearing 618 integral with the support 380 which is also in Fig. 13. The lever 628 has an integral spur 629 projecting from its side (see Fig. 4) has threaded into it the adjustment screw 630. The end of this screw bears on a flat machined on the top of the bearing 584 and prevents the levers 627 and 628 from swinging downward to such an extent that the presser bar 624 would not allow the wrapped and banded cigars XI to be passed under its forward end by the advancing fingers as shown in Fig. 19. The presser bar must be adjusted to accommodate the size of cigar to be wrapped and banded, and the distance between its bottom surface and the top of the plate 623a must be a little less than the height of the cigars when the bar is hanging free. The lever 628 is provided with a handle 631 with which the presser bar 624 may be raised out of contact with the tops of the wrapped and banded cigars, if for any purpose it may be seen fit to remove them from the advancing fingers without allowing them to be advanced to the heat sealing mechanism S. The forward end of the presser bar 624 to which the bracket 625a is secured curved upward to facilitate the passsing of the cigars under this end by the advancing fingers as shown in Fig. 19. Hinged to it and extending beyond this end of the presser bar is the auxiliary presser finger 632 which is shown most clearly in Figs. 1 and 34. This auxiliary presser finger is provided to exert a slight pressure upon the last cigar delivered from the wrapping and banding position into the advancing mechanism as illustrated in Fig. 35, and insures a continuous pressing action during the time the cigar is passed from under the beveled end of the pressure bar 244 which reciprocates with the seam folder plate 207 until the time it passes under the curved up end of the presser bar 624. The beveled end of the pressure bar 244 extends between the end of the bar 624 and the auxiliary presser finger 632 as shown most clearly in Fig. 1. The auxiliary presser finger is held down in its normal position by the flat spring 633 which is secured to the angle bracket 625a (see Figs. 34 and 35.)

Heat sealing mechanism "S"

The heat sealing mechanism comprises mainly the heat sealing member 634 mounted on the air cooled support 635 secured to the bosses 636 of the carriage 637 (see Figs. 4, 19, 35 and 38) which is reciprocated by the rotary action of the eccentric 638 pinned on the end of the cam shaft 100 as shown in Figs. 1, 2 and fully shown in Fig. 3. The heat sealing member 634 is provided at its rear end with the integral beveled end block 639 for sealing the bellows folded end 55F of the wrapper under the end of the cigar as illustrated at the left hand side of Fig. 38. Adjustably mounted on the top or sealing surface of the heat sealing member 634 is the beveled end block 640 which is shown at the right hand side of Fig. 38 and is provided for the same purpose as the integral beveled end block 639. The beveled end block 640 is made adjustable for the accommodation of cigars of various lengths and it is retained in its adjusted position by the screws and washers 641 which pass through slots in the footing of the end block and are screwed into two of the series of evenly spaced tapped holes 642 suitable for the required adjustment which are shown only in Fig. 1. The tapped holes 642 provide only a coarse adjustment of the end block 640 which may, for example, be too large for the length of the cigar to be wrapped and banded, and the slots in the footing of the block are provided for the fine adjustment which is necessary for the proper sealing under of the bellows folded end 55F of the wrapper at this end of the cigar. Machined in the sealing surface of the sealing member 634, and so located to be directly under the sealed ends of the band 56, is the groove 643 as shown in Fig. 38. This groove is provided to prevent the hot sealing surface from contacting with the band which would discolor and therefore ruin any printing on the sealed ends of the band.

Located within the body of the heat sealing member 634 in a manner suitable to their construction are the two similar electrical heating coils 644 and 645 as shown in Fig. 38. These coils are cylindrical in form and are a standard product,—therefore I will not describe their construction, and hereinafter I will refer to the heat sealing member and the coils as the heat sealing unit. The heating coil 644 has the usual electrical lead wires 644a, (Fig. 38) which terminate at the terminals 646 of the terminal block 647 shown in Figs. 4 and 19. This terminal block is supported in position on the threaded end of the stud 648 by the nut 649 which is shown only in the lower left hand corner of Fig. 38. Also secured to the terminals 646, but at the front face of the terminal block 647, are the bus wires 644b which cross under the reciprocating carriage 637 to the terminals 650 of the terminal block 651 as shown in Figs. 4 and 38. This terminal block is secured in position by one of the screws 652 which hold the air cooled support 635 in position on the bosses 636 of the reciprocating carriage. The electrical heating coil 645 also has the usual lead wires 645a which terminate at the terminals 650 of the terminal block 651. Also fastened to the terminals 650 are the bus wires 653 which lead to the terminal block 654 where they connect with the wires of the flexible cable 655 which in turn connects with the main power line through a rheostat not shown in the drawings, for controlling the temperature of heat sealing unit. The terminal block 654 is held in position by one of the screws 652.

The reciprocating carriage 637 is slidably mounted on the rails 656 and 657 which engage in grooves machined in the sides of the carriage for this purpose and which is best shown in Fig. 38. The rail 656 is secured to the downwardly extending bosses 658 and 659 of the bracket 660 by the screws 661 as shown in Fig. 4, and the rail 657 is secured to the downwardly extending bosses 662 and 663 of the bracket 664 by the screws 665 which is shown in Fig. 19. Referring to Fig. 3 it will be seen that the bracket 660 has an integral horizontal shouldered flange 666 which secures it to the top surface of the bed plate 10 by means of the cap screws 667, and the bracket 664 (see Fig. 19) has the vertical flange 668, by means of which it is secured to the end of the bed plate 10 which is not shown and the end of the guide rail 211 by the screws 669. Secured to the top surfaces of the flanges 666 and 668 of the brackets 660 and 664 respectively, and bridging the distance between them, is the bar 670 (see Figs. 1, 3 and 19). This bar supports the angle sections 671 which are fitted to match the ends of the plates 623 and 623a which are fastened to the top surfaces of the guide rails 211 and 211a respectively as shown in Figs. 1 and 4. These angle sections are made of brass, but any other metal which cools quickly can be used. The purpose of these brass angle sections 671 is to prevent heating the plates 623 and 623a when the heat sealing unit is in position to receive a wrapped and banded cigar X1 as illustrated in Fig. 22. It will also be noted that the bar 670 and the angle sections 671 have their front edges undercut to provide a knife edge contact between the angle sections and the side of heat sealing unit; which, it will be readily seen will allow only a very small amount of heat to be transferred from the unit to the angle sections.

As already mentioned herein, the carriage 637 that supports the heat sealing unit receives its reciprocating motion from the rotation of the eccentric 638, and this is accomplished by the following combination of mechanical parts. The crank action of the eccentric is transferred to the lever 672 in the form of a swinging motion by the connecting rod 673. By referring more in particular to Figs. 3 and 4, it will be seen that the connecting rod 673 is pivotly connected to the pin 674 and that its other end is pivotly connected to the lever 672 on the pin 675, which is driven in the boss 676 integral with the rear edge of the lever 672, shown in Figs. 1, 2 and 4. The lever 672 is pinned on the shaft 677 which is suitably journaled in bearings provided near the top edges of the brackets 660 and 664 as shown in Figs. 2, 4 and 19. Also pinned on this shaft 677, but located between the brackets 660 and 664 is the lever 678 (see Figs. 2, 19 and 38), the leverage and position of which is identical with that of the lever 672 although they differ somewhat in shape. With both the levers 672 and 678 secured on the same shaft, any motion delivered to the lever 672 by the eccentric 638 will be transmitted to the lever 678. Pivotly connected to the ends of the levers 672 and 678 are the links 679 and 680 respectively, which are exactly the same length. The forward end of the link 679 is pivotly connected to a boss 681 integral with the bottom of the right hand side of the carriage 637 looking at Fig. 38, and the forward end of the link 680 is connected to the extended shouldered end of the stud 648 carried by the boss 682 integral with the bottom of the left hand side of the carriage which can also be seen by referring to Fig. 38. By connecting both sides of the carriage in this manner, any possibility of it binding on the rails 656 and 657 when it is reciprocated is entirely eliminated and a smoother action is obtained.

Reciprocating with the heat sealing unit, and so arranged to apply a light pressure upon the ends of the wrapped and banded cigars X1 to hold them in position upon the sealing unit, are the two holding fingers 683 which are shown in Figs. 1, 4, 19, 22, 30, 35 and 38. These fingers are pivotly mounted at both sides of the adjustment block 684 on the ends of the pin 685. The adjustment block 684 is retained in its adjusted position against the back of the supporting arm 687 by the clamping action of the washer and screw 686. This screw 686 passes through an adjustment slot 688 machined in the supporting arm which is shown only in Fig. 2. The block 684 is made adjustable so that the fingers 683 may be raised or lowered to accommodate cigars of various thicknesses. The finger supporting arm 687 has a shank, not shown in the drawings, which is driven into a boss forming the top of the bracket 689. This bracket is carried by the carriage 637. It is secured at one point to the carriage by means of the stud 648 and the nut 649 as shown in Fig. 38. It is also secured at another point to the carriage, not shown in the drawings, to prevent it from getting out of alignment, and it is by means of this bracket that the holding fingers 683 are reciprocated with the heat sealing unit. The holding fingers are pressed downward by the light coil springs 690 which are carried in depressions (see Fig. 4) in the upwardly extending stop lugs 691 integral with the hubs of the fingers and which exert their pressure against the lugs 692 integral with the adjustment block 684. To prevent the fingers from swinging down below their normal position, I have provided the stop pins 693 which are driven into the sides of the adjustment block as shown most clearly in Fig. 38, and which contact with the tops of the lugs 691 for this purpose.

*Wrapped, banded and sealed cigar delivery or discharge mechanism "D"*

The delivery or discharge mechanism is provided for the purpose of sliding the wrapped, banded and sealed cigars X2 off the heat sealing unit as illustrated in Fig. 35. This operation is performed by the lever 694 which is slidably mounted on the rod 695 as illustrated in Figs. 1, 4, 19, 22, 30, 35 and 38. The rod 695 is carried at its right hand end by the support 696 secured to the side of the bracket 664, and its left hand end has been bored to fit over the end of the rod 616 which acts as its support at this end, and which is shown only in the upper left hand corner of Fig. 13. Integral with the hub of the lever 694 and extending downward is the short arm 694a at the end of which is mounted the cam roller 697 on the shoulder screw 698 Figs. 22 and 38. The cam roller 697 engages in a cam slot 699 machined in the cam plate bracket 700 shown in Figs. 1 and 38. The cam plate bracket is fastened to the rear of the advancing mechanism support 380 by the screws 701 which is also illustrated in the upper left hand corner of Fig. 13. The cam roller 697 and the cam plate bracket 700 are provided to raise the lever 694 upward as illustrated in Figs. 22 and 30 to allow the heat sealing unit with a wrapped and banded cigar in position to pass under it. The lever 694 is reciprocated by the action of the eccentric 702 shown in Figs. 2, 19 and 22, which rotates in the direction of the arrow and which is on the end of the shaft 703 suitably mounted in bearings machined at the ends of the brackets 660 and 664 as shown in Figs. 2, 4 and 19. Pivotly connected to the outside of the eccentric by means of the pin 704 is the connecting link 705; the opposite end of the link being connected to the arm 706a integral with the lever 706 by means of the pin 707. The lever 706 is pivotly mounted on the end of the stationary shaft 708 which is supported in the ends of the downwardly extending bosses 659 and 663 of the brackets 660 and 664 respectively as shown in Figs. 2, 4 and 19. Pivotly connected to the upper end of the lever 706 is the push rod 709. The other end of this push rod passes loosely through the short arm 694a of the lever 694 and has secured on it at both sides of the short arm, the buffet discs 710, which are shown most clearly in Figs. 19 and 22. These buffet discs do not fit tightly against the sides of the short arm 694a. This play between the discs and the arm, in combination with the play in opening of the arm through which the push rod passes, prevents any binding of the parts at this point when the lever 694 is swung upward as illustrated in Fig. 22, and also prevents any binding due to the action on the push rod by the swinging of the lever 706.

The shaft 703 upon which the eccentric 702 is secured, is rotated by sprocket 711 also secured on the shaft 703, the roller chain 712 and the sprocket 713 secured on the cam shaft 100 as shown in Figs. 2 and 4. The spreader bracket 716 and its idler sprockets 714 are provided for the purpose of diverting the chain upward to the sprocket 711 and to act as a means for taking up any slack which might develop in the chain due to wear.

Secured to the support 696 is the bracket 718 upon which are adjustably mounted the presser bars 719 and 720, as shown most clearly in Fig. 1. The bar 719 is pivotally mounted on the pin 721 and is prevented by a stop, not shown in the drawings, from swinging downward below a point which would prevent the wrapped, banded and sealed cigars X2 from passing under it. The bars 720 are hinged at their forward ends on a small diameter pin 722 (see Figs. 1 and 4) which is driven through the end of the bar 719. This makes the bars 720 free floating at their rear ends, said ends being prevented from dropping down when there are no cigars under them by the turned up hook portions 723 which would engage the pin 721. The pressing action of the bars 719 and 720 is augmented by the light coil spring 724. One end of this spring is carried in a recess in the spring support 725 secured on the pin 721 and located between the thin upturned sides of the bar 719 that form its bearings for the pin. The other end of this coil spring presses against a plate 726 that spans the tops of turned up sides of the bar 719. By referring more in particular to Figs. 1 and 2, it will be seen that the pin 721 that supports the presser bars 719 and 720 is carried in the bottom of the adjustment block 727, said block being held in its adjusted position on the bracket 718 by the clamping action of the washer and screw 728. For a means of adjusting the block 727, I have provided it with the slot 729 which engages the shank of the screw 728; said slot being shown only in Fig. 2. The presser bars 719 and 720 are provided with an adjustable support so that they may be raised or lowered to accommodate cigars of various thicknesses; and they themselves are provided for the purpose of pressing the wrapped, banded and sealed cigars X2 against the surface of the bronze cooling plate 730 after the cigars have been taken off the heat sealing unit by the lever 694 as illustrated in Fig. 35. The cooling plate, with a piece of asbestos 731 under it, is secured by means of screws to finished surfaces at the top of the brackets 660 and 664. The front edge of the cooling plate is undercut to provide a knife edge contact with the side of the heat sealing unit when they are in the position illustrated in Fig. 35. This knife edge contact practically eliminates the transfer of heat from the heat sealing unit to the cooling plate. As already mentioned herein, the cooling plate is constructed of bronze, but it is not limited to this particular metal, as any quick cooling metal or heat resisting material that can be smoothly finished may be used instead.

The wrapped, banded and sealed cigars X2 are moved along intermittently and in contact with one another between the presser bars and the cooling plate by each successive wrapped, banded and sealed cigar deposited between said bars and plate by the lever 694. As the cigars move along, they are guided between the beveled guide rails 732 and 733 which are shown most clearly in Figs. 1 and 4. The inside beveled edges of these guide rails are provided to hold the bellows folded ends 55F of the wrappers under the ends of the cigars in the manner illustrated in Fig. 38 until the sealed wrappers have become cool. The guide rails are secured to the surface of the cooling plate 730; the front rail 733 being provided with the slots 734 and clamping screws 735 so that it can be adjusted to accommodate various lengths of cigars. As the cigars pass off the cooling plate 733 and out from underneath the presser bars 719 and 720, they are ejected on to the delivery table 736 which is fitted tightly against the end of the cooling plate as shown in Figs. 1 and 4. The delivery table is supported at this end and on the ends of the brackets 660 and 664 as shown in Figs. 4 and 19, and it is prevented from moving out of this position by means of the strap irons 737 fastened to its bottom surface. The strap irons 737 are secured to the ends of the brackets 660 and 664 by the countersunk screws 738. The other end of the delivery table which is not shown in the drawings is supported on a common type of support comprising a piece of pipe with a floor flange threaded on each end; one of the flanges being fastened to the bottom of the delivery table and the other being fastened to the floor.

Having thus described my invention in detail, I will now describe its cycle of operation.

Neutral or stop position

Let us consider that the machine has been operating and that the clutch lever 139b shown in Fig. 1 has been moved into its stop position. At the completion of the cycle of operation, the locking pin of the clutch 139 which is controlled by the position of the lever 139b is thrown out of engagement with the driven side 139a of the clutch and the machine ceases to function. This leaves the various groups of cooperating mechanisms already described herein which are necessary for the complete wrapping and banding of the cigar and the heat sealing of the wrapper in the positions illustrated in Figs. 3, 4 and 5, which represent their neutral or stop positions. In these figures it will be noted that a cigar X has been raised approximately halfway upward the wrapping and banding mechanism F and that a wrapper 55 and band 56 have been brought into the wrapping and banding position over the cigar by the wrapper and band carrier mechanism C which still retains its grip upon them. The band stripper 324, referring to Figs. 5 and 13, has stopped in its raised position and is ready to pull down the bottom band of the band stack, with the wrapper feed mechanism W remaining in its idling position. The wrapped and banded cigar advancing mechanism A shown in Figs. 3 and 4 is also in its idling position with its advancing fingers 597 down behind the previously wrapped and banded cigars X1 in readiness to advance them toward the wrapper heat sealing unit S which is shown in its stop position in the middle of its return stroke toward the cigar advancing mechanism, and the lever 694 of the delivery mechanism D, which is provided for sliding the wrapped, banded and sealed cigars X2 off of the heat sealing unit, has stopped in a position slightly advanced toward the cigar advancing mechanism which took place shortly after the lever had slid the wrapped, banded and sealed cigar off of the heat sealing unit as illustrated in Fig. 35.

With the cooperating mechanisms of the machine in their neutral or stop positions, I will now describe the various steps of the wrapping and banding of the cigars, and the heat sealing of the wrappers during one complete cycle of operation after the clutch 139 has been thrown into operation.

*1st wrapping and banding step*

When the clutch 139 takes hold and the machine starts to function, the cigar elevator plunger 12 immediately starts upward again toward the wrapping and banding mechanism. The first part of this movement of the elevator plunger causes the top of the cigar to push the wrapper and band upward against the bottom of the feet 57a and 57b of the presser plunger 57, at which time the wrapper and band carrier mechanism C releases the wrapper and band in the manner already described herein when Figs. 10 and 11 of the drawings were described, but after releasing the wrapper and band, the carrier remains idle. At this time the right hand side folder plate 110 moves down to the position shown in Fig. 19 which brings its bottom edge on a level with the bottom edge of the left hand side folder plate 65. This movement of the right hand side folder plate is a continuation of its downward movement after it has been raised to allow for the delivery of the last wrapped and banded cigar to the advancing mechanism as illustrated in Fig. 35. During this time the band stripper 324 has been moving downward with the bottom band 56 of the band stack held in position on its top surface by means of an air suction which was created at this point by the action of the air suction regulating valve 340, shown in Figs. 2, 41 and 42, and the wrapper feed mechanism W is just starting to feed the wrapper strip 55S forward between the guide plates 578 as shown in Fig. 7. The above mentioned band 56 which has just been taken from the bottom of the band stack, and the wrapper strip being fed forward, are being brought into position for use with the next successive cigar to be wrapped and banded. As the band stripper moves downward, the band carrier 361 is swung in a clockwise direction, bringing its face fitted with the plate 368 downward over the top of the band stripper and band, which is also shown in Fig. 7. At the same time the cigar advancing mechanism W is just starting to move the previously wrapped and banded cigars X1 toward the heat sealing unit S, which is continuing its return stroke toward the advancing mechanism as likewise is the lever 694 of the delivery mechanism D. The heat sealing unit S at this part of the cycle has completed about three quarters of its return stroke and the lever 694 has advanced to approximately two fifths of its movement toward the cigar advancing mechanism and remains in its lowered position shown in Fig. 4.

*2nd wrapping and banding step*

As the machine continues to function, the cigar, with its wrapper and band is moved up into the position illustrated in Figs. 19, 20 and 21; the wrapper and band having been held in position by the feet 57a and 57b of the presser plunger 57 and the fabric tapes 171 and 172. These tapes are provided mainly to prevent the band from slipping on the smooth surface of the wrapper and as the cigar is moved into the position shown in Figs. 19 and 20, the tapes are folded around the sides of the cigar, the extra length of tape necessary to do this being drawn in around the rollers 168 and 173 carried by the band folding finger 164 and the right hand side folding plate 110 respectively; the light coil springs 170 and 176 shown in Fig. 3, which are hooked to the ends of tapes 171 and 172 respectively, being provided for this purpose. Just before the cigar with its wrapper and band reach the position illustrated in Figs. 19, 20 and 21, which I call the wrapping and banding position, the left and right hand side folding plates 65 and 110 respectively are allowed to move toward one another as already described herein with reference to Figs. 39 and 40, the plates being held tightly against the sides of the cigar by the coil spring 118. Referring more in particular to Figs. 9 and 27 to 29 inclusive, it will be seen that I have provided the top edges of the stop and guide plate 13 and the guide plate 14 with the notches 739 and 740 respectively. These notches are provided to prevent the downwardly extending end of the band from catching on the top of the plates as they are bent downward. It will also be noted by referring to Figs. 19, 20 and 21 that the ends of the folded down sides of the wrapper have been curved inward by the beveled surfaces 187 and 187a and the wedges 188 and 188a, which is the first step toward the formation of the bellows fold shown in Fig. 30. During the time the cigar, with its wrapper and band were being raised into the wrapping and banding position, the band 56, (Figs. 8 and 14) was transferred from the top of the band stripper 324 to the downwardly swung face of the band carrier 361.

This band, as already mentioned herein, is to be used with the next successive cigar to be wrapped and banded. This was accomplished by switching the air suction from the band stripper to the band carrier; this switching of the suction being caused by the operation of the air suction regulating valve 340 already referred to herein. To prevent the band from getting out of alignment during the transfer, I have constructed the valve in such a manner that there will be a slight overlap of the suctions at the band stripper and the band carrier before the suction is broken at the band stripper. After the band has been transferred, the band stripper continues its downward movement which brings its top surface below the line of the wrapper strip feed as illustrated in Figs. 8 and 14, and the band carrier swings slightly upward to allow the wrapper strip to pass under the supported band as it is fed forward by the wrapper feed mechanism W. The position of the stripper at this stage of the operation brings the hook 356, which is secured to it as shown in Fig. 13, into contact with the bottom of the slot cut in the plunger 357 as shown in Fig. 14. While the foregoing operations of this second wrapping and banding step were taking place, the cigar advancing mechanism A has continued to advance all the cigars in its control into the position illustrated in Fig. 19, and at the same time the band moistening mechanism, which is controlled by the same cam that controls the advancing mechanism as already described herein, has been brought into operation preparatory to shifting its moistening tape 376. This preparation for shifting the moistening tape is in the upward swing of the tape gripper jaw 420 which presses the tape against the bottom face of the block 419 as illustrated at the left hand side of Fig. 14. The heat sealing unit, up to this point in the cycle of operation, has almost completed its return stroke toward the advancing mechanism as shown in Fig. 19, and the lever 694 of the delivery mechanism has been advanced approximately one half of its movement and has been slightly raised due to its cam roller 697 being acted upon by the cam slot 699 of the cam plate bracket 700.

3rd wrapping and banding step

The continued operation of the machine starts the cigar elevator plunger 12 on its downward half of its stroke, but before its top surface leaves the bottom of the cigar, the rocker arm 154 (see Fig. 3) swings slightly in a clockwise direction. This movement causes the upper end of the pressure shoe 169 to contact with the presser plunger retaining pin 162 which in turn is forced against the face of the presser plunger plate 57. This operation is not shown in the drawings, but it is easily understood that the pressure of the pin 162 against the face of the presser plunger plate will create a binding action which will retain the presser plunger in its raised position, thereby releasing the cigar from the pressure exerted upon it by the plunger coil springs 60. Just as soon as this pressure of the plunger is released, the cigar elevator plunger begins to go down and the cigar with its wrapper and band cannot be displaced because of the pressure already applied to its sides by the side folding plates 65 and 110, as already described herein. With the start of the downward travel of the elevator plunger, the left hand seam folder plate 191 starts to move forward with its top surface in line with the bottom of the cigar, and as it moves inward, its beveled front edge starts to fold the downwardly extending edge of the wrapper under the cigar while the downwardly extending end of the band passes into the slot 192 cut in the front of the fold plate 191, leaving it undisturbed, said slot 192 being shown in Figs. 6 and 21. As the left hand seam folder plate 191 starts to move forward, the band stripper continues to move downward slowly and the hook 356 pulls the plunger 357 down with it, the start of said plunger movement being illustrated in Fig. 15. The band carrier 361 by this time has moved toward the left as illustrated in Fig. 15, said movement of the carrier bringing the gummed end of the band for the next cigar to be banded over the moistening tape and under the button 360 carried by the plunger 357. During this time the moistening mechanism is just starting to take up on the moistening tape 376 which is also illustrated at the left hand side of Fig. 15. This take-up of the tape is accomplished by the upward movement of the roller 429 which pulls the freshly moistened tape up between the gripping rollers 384 and 414. With the tape securely gripped between the block 419 and the gripper jaw 420, the tape which is drawn up by the roller 429 is obtained by shortening its length between the gripping rollers and the rollers 383 and 385. This action pulls the lever 404 upward against the action of its spring 408 (see Fig. 13); the purpose of which will be more fully described hereinafter in connection with the shift of the moistening tape. While these operations were taking place, the wrapper feed mechanism W has continued to feed the wrapper strip 55S forward under the band supported by the band carrier 361 as shown in Fig. 15 and the wrapper and band carrier mechanism C, which has remained idle during the second wrapping and banding step, is just starting to move toward the wrapper and band feed mechanisms. The cigar advancing mechanism A is continuing its movement toward the heat sealing unit S and the first cigar XI is just about starting to slide upon the heat sealing unit S, which has completed its return stroke and is standing idle to receive said cigar. The lever 694 of the delivery mechanism D has advanced to approximately three quarters of its movement toward the cigar advancing mechanism and it has been raised to practically its full extent.

4th wrapping and banding step

With the cigar, wrapper and band held in position by the side folding plates 65 and 110, and the presser plunger 57 remaining in its locked position, the left hand seam plate 191 completes its forward movement as illustrated in Fig. 22, which completely folds the left hand edge of the wrapper under the cigar and continues to leave the downwardly extending left hand end of the band 56 undisturbed. Attention is called to Fig. 27 for reference only, as this figure illustrates more clearly the above mentioned seam folder plate action. During the very last stages of the left hand seam folder plate movement, the right hand seam folder plate 201 starts to move forward, and by the time it reaches the position illustrated in Fig. 22, the wrapper end folding jaws 253 and 254 which move with it have been opened to approximately their full extent. The band stripper 324 continues its downward movement until it takes the position illustrated in Fig. 16. This brings the button 360 carried by the plunger 357 into contact with the top of the band supported by the band carrier 361 which is idling at this time. Immediately after the button 360 contacts with the band, the moistener lever 386 is swung upward. This brings the moistening tape 376 into contact with the gummed surface of the band. The wrapper feed mechanism during this time has continued to feed the wrapper strip forward and has completed approximately one half of its movement. This brings the forwardly moving end of the wrapper strip into a position where its edge that is to be gripped by the wrapper and band carrier C is about to enter between the extended finger 525 of the carrier plate 524 and the gripper plate 526 of the wrapper and band carrier, which is at this time continuing its movement toward the wrapper stop. The cigar advancing mechanism on the other hand has placed the first wrapped and banded cigar X1 under its control upon the heat sealing unit S, as illustrated in Fig. 22, upon which it is held in position by the light pressure of the holding fingers 683, which, as already described herein, reciprocate with the heat sealing unit for this purpose. The lever 694 at this time has reached the end of its movement and has been raised to its full extent to allow the wrapped and banded cigar on the heat sealing unit to pass under it.

5th wrapping and banding step

As the machine enters this stage of its cycle of operation, the presser plunger 57 remains in its locked position with the side folding plates 65 and 110 pressing against the sides of the cigar as already described herein. Referring to Fig. 27 which illustrates the most important operations of this wrapping and band step, it will be seen that the left hand seam folder plate 191 has been standing idle, but it is just about to start its return stroke to allow the forwardly moving right hand seam folder plate 254 to advance. As shown in Fig. 27, the right hand seam folder has advanced just far enough to start folding the right hand edge of the wrapper under the cigar, but this movement has not disturbed the downwardly extending right hand end of the band because it has passed into the slot 296 cut in the folder plate for this purpose. The wrapper end folding jaws 253 and 254 having advanced with the seam folder plate are now open to their full extent. The band stripper is just starting upward again as shown in Fig. 17, and has caused the hook 356 to allow the plunger 357 to rise, thereby breaking the contact between the button 360 and the band which took place immediately after the moistener lever 386 and the moistening tape have been lowered. Referring to the left hand side of Fig. 17 it will be seen that the roller 429 has been raised to its full extent and has drawn up enough freshly moistened tape between the gripping rollers 384 and 414 to replace that which has just been in contact with the gummed surface of the band as illustrated in Fig. 16. The wrapper feed mechanism W has fed forward by this time about three quarters of the amount of wrapper strip 55S required for a wrapper, the edge of said strip that is to be gripped by the wrapper and band carrier having entered between the finger 525 and the gripper plate 526. The wrapper and band carrier is continuing its movement toward the wrapper feed and the band magazine, and has completed approximately one half of its stroke. The cigar advancing mechanism A remains idle during this part of the cycle of operation with its advancing fingers 597 remaining in their downwardly extending positions as shown in Figs. 19 and 22. The heat sealing unit at this time has just started to move toward the delivery end of the machine and the lever 694 remains idle in its raised position as the wrapped and banded cigar carried by the heat sealing unit starts to pass under it.

6th wrapping and banding step

Referring more in particular to Fig. 28, it will be seen that, as the machine continues to function, the left hand seam folder plate 191 has been moving back toward its normal position with the right hand seam folder plate 207 continuing its forward movement to complete the folding under of the right hand edge of the wrapper. This completes the folding of the wrapper around the cigar and the wrapper end folding jaws 253 and 254 which have been moving forward with the right hand seam folder plate are just starting to pass over and under the ends of the wrapper which extend beyond the ends of the cigar as shown in Fig. 21. Just before the seam folder plates 191 and 207 have reached the position illustrated in Fig. 28, the band folding finger 164 starts to move forward as illustrated in said figure. This movement has caused the roller 168 to press the fabric tape 171 against the ungummed end of the band which starts to bend it upward under the cigar. The forward movement of the band folding finger is obtained by a counter-clockwise movement of the rocker arm 154, shown in Figs. 3 and 29, to the lower end of which it is pivotally connected. This movement of the rocker arm also releases the presser plunger 57 which was locked in position by the pressure shoe 160 supported on the upper end of the rocker and the presser plunger retaining pin 162 which has been described herein, but the downward pull of the presser plunger springs 63 cannot dislodge the partly wrapped and banded cigar because the side folding plates 65 and 110 are still pressing against it, and they in turn are aided in retaining the cigar in position by the right hand seam folder plate 207 which has passed partly underneath it. During this time the band stripper has moved upward and is at rest with its top surface slightly below the line of the wrapper strip feed as shown in Fig. 18, and the moistening mechanism is idling in the position illustrated in Fig. 17. At this time the band carrier member 361 starts to move toward the right with the moistened band in preparation to taking the position illustrated in Fig. 18. The wrapper feed mechanism W has almost completed the forward feed of the wrapper strip 55S, and the wrapper and band carrier C which is continuing its movement toward the wrapper feed and the band magazine has by this time completed approximately three quarters of its movement. The cigar advancing mechanism A continues to remain idle, as described in the fifth wrapping and banding step, and the heat sealing unit S with the wrapped and banded cigar carried by it, is just starting to pass under the elevated and idle lever 694 of the delivery mechanism D.

7th wrapping and banding step

With the side folder plates 65 and 110 continuing to press against the sides of the partly wrapped and banded cigar, and the presser plunger exerting its pressure on its top surface, the left and right hand seam folder plates 191 and 207 respectively have taken the position illustrated in Fig. 29. The left hand seam folder as shown has returned to its normal position and the right hand seam folder has completed one half of its forward movement as likewise have the wrapper end folding jaws 253 and 254. During the time the seam folders were moving into the position shown in Fig. 29, the band folding finger 164 completed its forward movement which has turned the ungummed end of the band upward tightly against the already folded wrapper; the folding finger having entered the slot 296 cut in the right hand seam folder for this purpose besides allowing the gummed end of the band to remain undisturbed up to this time as shown. While this part of the band folding was taking place, the band stripper 324, referring to Fig. 18, has remained idle while the band carrier 361 has brought the moistened band into position over the wrapper strip in preparation to their being gripped by the gripping members of the wrapper and band carrier C which has practically completed its movement at this time. The forward feed of the wrapper strip has just been completed and its feed mechanism is idle. The wrapped and banded cigar advancing mechanism at this time has been moved slightly toward the wrapping and banding position and its advancing fingers 597 are just starting to swing upward toward their position shown in Figs. 30 and 37. The heat sealing unit with its wrapped and banded cigar is continuing its movement toward the delivery mechanism and has just about passed under the lever 694.

8th wrapping and banding step

Referring more in particular to Figs. 30 and 31, it will be seen that the band folding finger 164 has returned to its normal position. This return movement of the finger started immediately after it reached the position illustrated in Fig. 29 and the right hand seam folder plate 207 followed along with it to complete its forward movement. As shown in Fig. 31, the left hand seam folder plate 191 has moved back past its normal position to allow the right hand seam folder to advance. Comparing the position of the right hand seam folder in Figs. 29 and 31 it will be readily seen that as the folder continued to move forward, the band folding edge 297, which is the rear of the slot 296, came into contact with the downwardly extending gummed end of the band and bent it upward against the ungummed end which was placed in position by the folding finger. The pressure of the folder plate 207 securely seals the two ends of the band together; the gummed end of this band having been moistened while the previous cigar was being wrapped and banded. As the right hand seam folder plate 207 completed its forward movement, so did the wrapper end folding jaws 253 and 254 due to their reciprocating movement being controlled by the folder plate operating mechanism. Immediately upon completing their forward movement, the jaws start to close upon the ends of the wrapper. The biting edge 267 of the lower jaw 254 and the bottom edge of the blade 276 of the upper jaw 253 press against the bottom and top surfaces of the ends of the wrapper, and as they continue to move toward one another, bringing these surfaces with them, the side surfaces of the wrapper collapse inwardly as shown in Fig. 30, because of their having been started in this direction by the bellows fold starting wedges 188 and 188a and the beveled surfaces 187 and 187a as already described herein and illustrated in Figs. 20 and 21. During this part of the wrapping and banding operation, the cigar elevator plunger 12 has been continually going down, and just as the wrapper end folding jaws start to operate, it has reached its lowermost position as shown in Fig. 30 and the next successive cigar X to be wrapped and banded is brought into position over the elevator plunger and against the stop and guide plate 13 by the cigar hopper belt feed H as described herein. The band stripper 324 and the band carrier 361 remain in the same positions they acquired during the seventh wrapping and banding step. The wrapper and band carrier C has at this time completed its movement toward the wrapper feed and the band magazine, as illustrated in Fig. 8, and its gripper pads 527 (see Fig. 10) have been moved up to grip the edge of the fed out portion of the wrapper strip and the ungummed end of the band as described herein when reference was made to Figs. 10, 11 and 12. Immediately after the wrapper and band carrier firmly grips the wrapper and band, the air suction is broken at the band carrier 361 by the operation of the air suction regulating valve 340 to release the band at this point. At the same time the knife 491 is swung downward and severs the wrapper strip as illustrated in Fig. 8, the cut off portion representing a wrapper of the required length to wrap a cigar of the size being fed into the machine. During the above operations, the advancing fingers 597 of the cigar advancing mechanism A have completed their upward swing as illustrated in Figs. 30 and 37; while the rest of said mechanism remains idle. The heat sealing unit, which is continuing to move toward the delivery mechanism has carried the wrapped and banded cigar under the lever 694 which is just about to start its return stroke to fall in behind the cigar carried by the heat sealing unit which will be described hereinafter.

9th wrapping and banding step

As the machine enters this portion of its cycle of operation, the left and right hand seam folder plates and the band folder finger remain at rest while the wrapper end folding jaws continue to close and complete the bellows fold of the wrapper ends. When the jaws are completely closed as illustrated in Figs. 32 and 33, the bellows folded ends 55S of the wrapper are bent downward by the blades 276 of the upper jaws 253 and over the folding blades 277 of the lower jaws 254; the biting edges 267 of both jaws, one of said edges being the top edge of the folding blades 277, squeeze the folded ends of the wrapper tightly between them at the point at which they are bent downward to set the fold as illustrated most clearly in Fig. 33. It is well to mention at this time that the pressure bar 244, during the fourth to eighth wrapping and banding steps has been moved backward until its front end now rests upon the wrapped and banded cigar X1 as shown in Figs. 32 and 34. The purpose of this pressure bar has already been mentioned herein and its movement is controlled by the movement of the right hand seam folder plate 207. During the time the wrapper end folding jaws were closing to form the bellows fold at the ends of the wrapper, the cigar elevator plunger, band stripper, band carrier, wrapper feed, wrapper and band carrier and the cigar advancing mechanism were standing idle, but the heat sealing unit has continued its movement and has completed approximately three quarters of its stroke toward the delivery mechanism. The lever 694, of the delivery mechanism, in the meantime has completed approximately one half of its return stroke and has been swung downward by its cam plate 700 to a point equal to that illustrated in Fig. 19.

10th wrapping and banding step

With the wrapper and band completely folded around the cigar, the left and right hand side folder plates 65 and 110 respectively are spread apart slightly by their operating mechanism as already described herein. This movement releases the pressure on the sides of the cigar, which is not necessary at this time to hold it in position due to the wrapper end folding jaws retaining their grip upon the folded ends of the wrapper, and the pressure bar 244 holding the cigar firmly upon the right hand seam folder plate 207 which remains at rest in the advanced position it acquired at the completion of the banding operation, as shown in Fig. 31; the left hand seam folder plate, the band folder finger and the cigar elevator also remaining at rest. As the side folder plates complete their spreading movement, the right hand folder 110 starts to move upward as likewise does the presser plunger 57, and as they reach the positions illustrated in Fig. 34, the wrapper end folding jaws and the right hand seam folder plate are just about to start moving toward the cigar advancing mechanism which has already started its return movement toward the wrapping and banding mechanism with its advancing fingers remaining in their upwardly swung position to clear the wrapped and banded cigar X1 which it has been advancing toward the heat sealing unit, and to clear the wrapped and banded cigar X1 which is in the act of being removed from the wrapping and banding position as illustrated in Fig. 34. During this time the band stripper and the band carrier have been remaining idle, and the wrapper and band carrier which has just received a wrapper and band for the cigar X resting over the cigar elevator plunger 12, as shown in Fig. 34, is starting to move toward the front of the machine to convey said wrapper and band into the wrapping and banding position. The heat sealing unit, which is continuing its movement toward the delivery mechanism has almost completed this part of its stroke and the lever 694 has been swung down to its lowermost position as shown in Fig. 38 with its depending face moved up close to the side of the wrapped and banded cigar X1 carried on the heat sealing unit.

11th wrapping and banding step

As the continued operation of the machine enters this part of its cycle, which is the last actual wrapping and banding step, the cigar elevator plunger 12 moves upward into its normal or stop position with the next cigar X to be wrapped and banded resting on its top surface as illustrated in Fig. 35. During this upward movement of the elevator plunger, the stop and guide plate 13 and the guide plate 14 have been spread apart and the cigar retaining finger 52 has been brought down upon the next cigar X to fold upon the elevator plunger; the purpose of which has already been described herein. The right hand side folder plate 110 which started to rise as described in the previous wrapping and banding step, has completed its upward movement and has taken the position shown in Fig. 35, while the presser plunger 57 remains in the same raised position shown in Fig. 34. As the right hand side folder plate moved upward, the right hand seam folder plate 207 and the wrapper end folding jaws have completed their movement toward the cigar advancing mechanism with the pressure bar 244 moving up with them and continuing its pressure upon the top of the cigar as shown in Fig. 35 to retain the wrapped and banded cigar in position due to the wrapper end folding jaws opening up a few thousandths of an inch to allow the advancing mechanism to easily slide the folded down ends 55F of the wrapper from between the jaws as shown in Fig. 19. When this action of the right hand folder plate started, the left hand folder plate followed it from the position shown in Fig. 34 until it reached its normal position shown in Fig. 35; the band folding finger having been in its normal or stop position therefore remained idle. During this time the cigar advancing mechanism has completed its movement toward the wrapping and banding position and its advancing fingers 597 are starting to swing downward again behind the advanced cigars X1 and the cigar just removed from the wrapping and banding position, which is also shown in Fig. 35. Just before the wrapped and banded cigar was removed from the wrapping and banding position, the heat sealing unit completed its movement toward the delivery mechanism and the lever 694 has completed its return stroke which slid the wrapped, banded and sealed cigar X2 off of the heat sealing unit on to the cooling plate 730 and under the pressure bars 719 and 720; forcing the previously wrapped, banded and sealed cigars X2 ahead of it toward the delivery table 736. With the return movement of the advancing mechanism, the shift of the moistening tape took place and this was accomplished in the following manner. As already described herein, the roller 429 (see Fig. 13) is moved up and down by the same cam that operates the cigar advancing mechanism and when it is moved up into the position illustrated in Fig. 17 during the advancing stroke of the advancing mechanism, it pulls the freshly moistened tape up between the gripping rollers 384 and 414, which has also been described herein. Referring to Fig. 17, let us consider that the roller 429 is moving downward. This action will create a slack in that portion of the moistening tape held between the gripping rollers 384 and 414, and the block 419 and the gripper jaw 420; the strength of the spring 408 (see Fig. 13), which pulls the lever 404 downward, not being strong enough to overcome the pressure exerted upon the rollers 384 and 414 by the spring 417. As the roller 429 continues to move downward, the pin 436 carried by the gripper jaw actuating plate 426 moves down in the slot 437 cut in the depending flange 438 of the gripper jaw until it reaches the bottom of said slot as illustrated in Fig. 14, at which time its continued movement will swing the gripper jaw downward against the pull of its spring 424 to release the moistening tape. With the release of the tape at this point, the spring 408 swings the lever 404 downward, said movement slipping the loose tape around the end of the moistening lever 386 thereby bringing a fresh portion of the tape in position to moisten the gummed end of the next band to be stripped from the bottom of the band stack. During this shift of the moistening tape, the band stripper 324 has again started to move upward and has completed approximately three-quarters of its movement and the band carrier 361 is being swung in a counter-clockwise direction toward its normal or stop position as shown in Figs. 5 and 6. The drive of the wrapper feed mechanism is returning to its normal position, the weight 476 moving down toward the position shown in Fig. 2, while the wrapper and band carrier mechanism has completed approximately three-fifths of its movement toward the front of the machine with the new wrapper and band to be used with the next cigar X to be wrapped and banded which is being raised as shown in Fig. 35.

With the actual wrapping and banding steps completed, the remaining portion of the cycle of operation brings the various mechanisms which have not already completed their strokes back to their normal or stop positions which are fully described in the first paragraph of this description of operation, headed "Neutral or stop position", and which are illustrated in Figs. 4, 5, 6 and 13.

In accordance with the provisions of the patent statutes, I have described my invention, but I desire it understood that it is not confined to the particular form shown and described, the same being merely illustrative, and that the invention can be carried out in other ways without departing from the spirit of my invention, and therefore, I claim broadly the right to employ all equivalent instrumentalities coming within the scope of the appended claims and by means of which, objects of my invention are attained and new results accomplished, as it is obvious that the particular embodiments herein shown and described are only some of many that can be employed to attain these objects and accomplish these results.

Having now described my invention, what I claim, and desire to secure by Letters Patent, is:

1. A combined cigar wrapping and banding machine, comprising a wrapping material supply means, a band supply means, co-ordinate mechanism for applying the wrapping material and band to a cigar, and clamping means to hold said cigar stationary and in the same place while both the wrapping and banding operations are performed.

2. In a combined cigar wrapping and banding machine, means for moving a cigar to a position where it is to be wrapped and banded, a wrapping material supply means, a band supply means, co-ordinate mechanism for applying the wrapping material and securing the band by adhesive about said cigar, means for moving and advancing said wrapped and banded cigar to a heat sealing position where the wrapper seam and ends are sealed independently of the band by the direct application of an electric heating element, and means for moving said cigar to the delivery or discharge end of the machine for packing.

3. In a combined cigar wrapping and banding machine, means for automatically delivering a cigar to a wrapping and banding position, means to wrap and band said cigar, the complete wrapping and closing of the band of said cigar being performed at the same place, means for automatically removing and advancing said wrapped and banded cigar to a heat-sealing position, where the wrapper is heat-sealed independently of the band, and means for moving said cigar from the last named position to the delivery or discharge end of the machine for packing.

4. In a combined cigar wrapping and banding machine, a mechanism for completely wrapping and banding a cigar and closing the wrapper ends in a single stationary position, means for moving toward feeding position a row of cigars, means for moving the cigars forward in the same edgewise disposition, with the same side up with an intermittent movement so that the rest periods between the forward movements of the cigars are equal to one complete cycle of operation necessary to complete the wrapping and banding of a cigar by the machine.

5. In a combined cigar wrapping and banding machine, a mechanism for completely wrapping and banding a cigar and closing the wrapper ends in a single stationary position, means for moving toward feeding position a row of cigars, means for moving the cigars forward in the same edgewise disposition, with the same side up with an intermittent movement so that the rest periods between the forward movements of the cigars are equal to one complete cycle of operation necessary to complete the wrapping and banding of a cigar by the machine, and means for moving said cigars singularly and in continuous procession from feeding position to wrapping and banding position.

6. In a combined cigar wrapping and banding machine, a mechanism for completely wrapping and banding a cigar and closing the wrapper ends in a single stationary position, means for moving toward feeding position a row of cigars, means for moving the cigars forward in the same edgewise disposition, with the same side up with an intermittent movement so that the rest periods between the forward movements of the cigars are equal to one complete cycle of operation necessary to complete the wrapping and banding of a cigar by the machine, means for moving said cigars singularly and in continuous procession from feeding position to wrapping and banding position, and means for moving and advancing said cigars in the same order and edgewise disposition from the wrapping and banding position to the delivery or discharge end of the machine for packing.

7. In a combined cigar wrapping and banding machine, a mechanism for completely wrapping and banding a cigar and closing the wrapper ends in a single stationary position, means for moving toward feeding position a row of cigars, means for moving the cigars forward in the same edgewise disposition, with the same side up with an intermittent movement so that the rest periods between the forward movements of the cigars are equal to one complete cycle of operation necessary to complete the wrapping and banding of a cigar by the machine, and means for actuating said cigars one at a time and in the same order and edgewise disposition from feeding position to wrapping and banding and discharge positions respectively.

8. In a combined cigar wrapping and banding machine for partly fusible wrappers, means for moving toward feeding position a row of cigars, means for moving the cigars forward with an intermittent movement so that the rest periods between the forward movements of the cigars are equal to one complete cycle of operation necessary to complete the wrapping and banding of a cigar by the machine, means for moving of said cigars in the same edgewise disposition to each other from feeding position to a single stationary wrapping and banding position, means for moving and advancing said cigar singularly from this wrapping and banding position to a heat-sealing position, a heat-sealing unit adapted to directly heat and partly fuse, by an electric heating element the overlapping edges of the wrapper together, and means for moving and advancing said cigars singularly from the heat-sealing position to the delivery or discharge end of the machine for packing.

9. In a machine of the character described, adjustable centering means for moving cigars to a stationary position where said cigars will be singularly wrapped and banded, adjustable means for supplying individual wrapping sheets for each cigar from a roll to a conveyor, said individual wrapping sheets being of proper width and length to accommodate the particular size of cigar to be wrapped and being fed from said roll in synchronism with the rate of the cigar feed and wrapping operation, a band supply means, working in adjustable synchronism with the wrapper supplying means, means for applying the individual wrapping sheet and band to a cigar, both wrapping and banding operations being performed at the same place, and means for moving said wrapped and banded cigar to the delivery or discharge end of the machine for packing.

10. In a machine of the character described, means for moving cigars to a stationary position where said cigars will be singularly wrapped and banded, means for supplying individual wrapping sheets for each cigar from a roll to a reciprocatory conveyor, a band supply magazine, moistening means, said band supply magazine being mounted above the rectilinear course of travel of said wrapping material, automatic means for stripping a band from said magazine to place it upon said wrapper material after the gummed end of the band has been moistened, a conveyor for gripping the wrapper and band, said conveyor being automatically adjustable to accommodate the widths of wrapper strip and length of bands for various shapes and sizes of cigars, co-ordinate mechanism for applying the wrapping material and band to a cigar, and means for moving said cigar to the delivery or discharge end of the machine for packing.

11. In a combined cigar wrapping and banding machine, a mechanism for completely wrapping and banding a cigar and closing the wrapper ends in a single stationary position, means for moving toward feeding position a row of cigars, means for moving the cigars forward in the same edgewise disposition, with the same side up with an intermittent movement so that the rest periods between the forward movements of the cigars are equal to one complete cycle of operation necessary to complete the wrapping and banding of a cigar for the machine, means for moving said cigars singularly from feeding position to wrapping and banding position, and a combined wrapping and banding mechanism which will at the same position perform the dual function of applying a wrapper and band around a cigar.

12. In a combined cigar wrapping and banding machine, a mechanism for completely wrapping and banding a cigar and closing the wrapper ends in a single stationary position, means for moving toward feeding position a row of cigars, means for moving the cigars forward in the same edgewise disposition, with the same side up with an intermittent movement so that the rest periods between the forward movements of the cigars are equal to one complete cycle of operation necessary to complete the wrapping and banding of a cigar for the machine, means for moving said cigars singularly from feeding position to wrapping and banding position, a combined wrapping and banding mechanism which will at the same position perform the dual function of applying a wrapper and band around a cigar, and means for moving said wrapped and banded cigars in continuous procession and the same order and edgewise disposition from the wrapping and banding position to the delivery end of the machine for packing.

13. In a combined cigar wrapping and banding machine, a wrapper supply means, an adjustable band magazine, means automatically adjusted to guide cigars into a wrapping and banding position, means automatically adjustable in combination with the cigar guide means for folding a wrapper and a band around the cigar, both of said means being simultaneously adjusted when the band magazine is adjusted to accommodate the length of band required for the particular cigar to be banded.

14. In a combined cigar wrapping and banding machine, a wrapper supply means, an adjustable band magazine, means automatically adjusted to guide cigars into a wrapping and banding position, means automatically adjustable in combination with the cigar guide means for folding a wrapper and a band around the cigar, both of said means being simultaneously adjusted when the band magazine is adjusted to accommodate the length of band required for the particular cigar to be banded, and a combined wrapping and banding mechanism which will at the same position perform the dual function of applying a wrapper and a band around a cigar.

15. In a combined cigar wrapping and banding machine, a wrapper supply means, an adjustable band magazine, means automatically adjusted to guide cigars into a wrapping and banding position, means automatically adjustable in combination with the cigar guide means for folding a wrapper and a band around the cigar, both of said means being simultaneously adjusted when the band magazine is adjusted to accommodate the length of band required for the particular cigar to be banded, a combined wrapping and banding mechanism which will at the same position perform the dual function of applying a wrapper and band around a cigar, and means for moving said wrapped and banded cigars singularly from the wrapping and banding position to the delivery end of the machine for packing.

16. In a combined straight course cigar wrapping and banding machine, means for automatically delivering a cigar to a wrapping and banding position, means to supply wrapping material from a roll, means to sever a portion of said wrapping material, means to automatically feed said severed portion of the wrapping material to said wrapping position, means to automatically strip a band from a magazine, adapted to hold bands, and convey it to a banding position, being substantially identical with said wrapping position, means to hold the severed portion of the wrapping material and band in alignment, moistening means adapted to moisten one end of the band, means to apply said wrapping material and band around the cigar, clamping means to hold said cigar stationary and in the same place while both the wrapping and banding operations are performed, means to fold the ends of the wrapper, and automatic means for moving the cigar after wrapping and banding in a straight course to the discharge end of the machine for packing.

17. In a combined straight course cigar wrapping and banding machine, means for moving toward feeding position a row of cigars, means for moving the cigars forward in the same edgewise disposition, with the same side up with an intermittent movement so that the rest periods between the forward movements of the cigars are equal to one complete cycle of wrapping and banding operation, means for automatically delivering a cigar to a stationary wrapping and banding position, means to supply wrapping material from a roll, means to sever a portion of said wrapping material, means to automatically feed said severed portion of the wrapping material to said wrapping position, means to automatically strip a band from a magazine, adapted to hold bands, and convey it to a banding position being substantially identical with said wrapping position, means to hold the severed portion of the wrapping material and band in alignment, moistening means adapted to moisten one end of the band, means to apply said wrapping material and band around the cigar, clamping means to hold said cigar stationary and in the same place while both the wrapping and banding operations are performed, means to fold the ends of the wrapper, and automatic means for moving the cigar after wrapping and banding in a straight course to the discharge end of the machine for packing.

18. A combined cigar wrapping and banding machine, comprising a wrapping material supply means, a band supply means, means for automatically delivering a cigar to a stationary wrapping and banding position, means to apply the wrapper and band simultaneously around the cigar, means to fold the ends of the wrapper and clamping means to hold said cigar stationary and in the same place, while both the wrapping and banding operations are performed.

19. A combined cigar wrapping and banding machine, comprising a wrapping material supply means, a band supply means, means for automatically delivering a cigar to a stationary wrapping and banding postion, means to apply the wrapper and band simultaneously around the cigar, means to fold the ends of the wrapper, clamping means to hold said cigar stationary and in the same place, while both the wrapping and banding operations are performed, and means for moving said cigar from said position to the discharge end of the machine for packing all its parts describing a rectilinear course.

20. In a combined cigar wrapping and banding machine, means for moving towards feeding position a row of cigars, means for actuating said cigars one at a time from the feeding position to a stationary banding and wrapping position, a band magazine, a stripper mechanism to remove a band from the band magazine, a wrapper strip feed, adapted to feed from a roll a carrier for the wrapper and band, mechanism for moistening one end of the band, means to wrap and band a cigar, means for folding the ends of the wrapper, said wrapping, banding and folding being performed on the stationary cigar at the same place, means for advancing the banded, wrapped and folded cigar to a sealing position, heat sealing mechanism to seal the wrapper on the longitudinal edge, a wrapper cooling device and means for discharging the said wrapped, banded and sealed cigar.

21. In a machine of the character described, a co-ordinate wrapping and banding mechanism automatically adjustable to accommodate cigars of various shapes and sizes, having means automatically and cooperatively connected with said mechanism for centering the bands in relation to the axis of said cigars and aligning them crossaxially to said cigars.

22. In a cigar wrapping machine of the kind described, guiding means for moving cigars in lateral succession toward a wrapping position, said guiding means being manually and permanently adjustable according to the length of cigars, means to supply a length of wrapper sufficient for the latter from a roll of wrapping material, and means for automatically controlling the length of the wrapper feed by the manual adjustment of the cigar guiding means.

23. In a cigar wrapping and banding machine of the character described, the combination with a wrapper supply means, an adjustable band magazine and cigar guiding means for moving a cigar into a wrapping and banding position, said means being manually and permanently adjustable according to the length and the width of the cigar; of automatic means to simultaneously adjust the band magazine to accommodate the length of band required and to control the length of the wrapper feed from the wrapper supply means, when the cigar guiding means are adjusted.

24. In a combined cigar wrapping and banding machine, adapted to wrap cigars in transparent regenerated cellulose, means for automatically delivering a cigar in a rectilinear course to a wrapping and banding position, a wrapper feed conveyor, located at right angles to said course and adjustably aligned with the working center line of the wrapping and banding mechanism and adapted to feed a series of wrapper lengths from a roll to the wrapping and banding position, a band supply device, adjustably arranged in juxtaposition to the feed course of the wrapper conveyor and adapted to intermittently deliver a cigar band across the separate wrapper lengths fed by said conveyor toward the wrapping position, so that each wrapper length arrives simultaneously with a band suitably aligned on top of it.

25. In a machine of the character described, adapted to wrap cigars in transparent regenerated cellulose, means for moving a cigar to a stationary wrapping and banding position, adjustable guides for centering the disposition of the cigars during this movement longitudinally and laterally in relation to this ultimate position, a wrapping material supply means, a band supply means, located laterally to said ultimate position and adapted to feed a wrapper and band over and across said cigar, means for centering the wrapping material and the band in relation to the axis of said cigar, means for aligning said band cross axially to said cigar and said wrapper and coordinate mechanism for applying the wrapping material and band simultaneously to said cigar.

26. In a wrapping machine of the character described, means for conveying a cigar into a stationary wrapping position, means, adjustable in relation to the size of cigar to fold a wrapper around this cigar, and a device to bellowfold the overhanging edges of the wrapper while the cigar remains in the same place and disposition and auxiliary means for centering this bellowfolding device in relation to the axis of the cigar to accommodate different sizes.

27. In a combined cigar wrapping and banding machine, means for automatically delivering a cigar to a wrapping and banding mechanism, wrapper feeding means, aligned with said mechanism and adapted to feed a continuous series of wrappers towards it, a band supply device, adapted to feed cigar bands from a stack intermittently upon and across said series of wrappers, one band to each wrapper, said band supply device comprising two cooperatively connected suction elements, one element arranged to strip a band from the stack and the second element adapted to strip it in turn from the first element and transfer it upon the wrappers, and vacuum controlling means, adapted to activate and inactivate said suction elements in such a way that the sucking contact of the second element with the band commences a fraction of a second before the sucking effect of the first element has ended.

28. In a combined wrapping and banding machine, comprising means for supplying a continuous strip of wrapping material, means to sever the wrapping material, a band magazine, automatic means for stripping a band from said magazine, means to move said severed portion of wrapping material and band in a rectilinear course to a wrapping and banding station, automatic means for moving a cigar to said wrapping and banding station, means to hold the wrapper and band in alignment, moistening means, adapted to moisten one end of the band, means to apply the wrapping material and band around the cigar and clamping means to hold said cigar stationary and in the same place while both the wrapping and banding operations are performed.

29. In a combined wrapping and banding machine, comprising means for supplying a continuous strip of wrapping material, adjustable means to sever the wrapping material, a band magazine, containing a stack of bands, automatic means for stripping a band from said magazine, means to move said severed portion of wrapping material and band in a rectilinear course to a wrapping and banding station, automatic means for moving a cigar to said wrapping and banding station, means to hold the wrapper and band in alignment, moistening means adapted to moisten one end of the band, means to apply the wrapping material and band around the cigar, clamping means to hold said cigar stationary and in the same place while both the wrapping and banding operations are performed and means for advancing the wrapped and banded cigar in a rectilinear course to the delivery end of the machine for packing, substantially as shown and described.

FRANCIS X. MALOCSAY.